United States Patent [19]
Endoh et al.

[11] Patent Number: 5,896,358
[45] Date of Patent: Apr. 20, 1999

[54] AUDIO SYSTEM WHICH NOT ONLY ENABLES THE APPLICATION OF THE SURROUND SYSTEM STANDARD TO SPECIAL PLAYBACK USES BUT ALSO EASILY MAINTAINS COMPATIBILITY WITH A SURROUND SYSTEM

[75] Inventors: Kenjiro Endoh, Tokyo, Japan; Craig Campbell Todd, San Francisco, Calif.

[73] Assignees: Kabushiki Kaisha Toshiba, Kawasaki, Japan; Dolby Laboratories, San Francisco, Calif.

[21] Appl. No.: 08/910,255

[22] Filed: Aug. 13, 1997

Related U.S. Application Data

[63] Continuation of application No. 08/688,762, Jul. 31, 1996, abandoned.

[30] Foreign Application Priority Data

Aug. 2, 1995 [JP] Japan .................................. 7-197797

[51] Int. Cl.$^6$ .................................................. G11B 7/00
[52] U.S. Cl. .............................. 369/89; 369/48; 369/49; 369/275.3
[58] Field of Search .................................. 381/17, 18, 19, 381/22, 23, 1, 61, 119; 434/307 A, 318; 84/610, 626, 634, 601; 369/89, 90, 47, 48, 49, 50, 54, 58, 59, 275.3

[56] References Cited

U.S. PATENT DOCUMENTS

| | | |
|---|---|---|
| 4,583,132 | 4/1986 | Nakano . |
| 5,177,798 | 1/1993 | Ohsawa .................... 381/18 |
| 5,400,433 | 3/1995 | Davis et al. . |
| 5,428,184 | 6/1995 | Park . |

FOREIGN PATENT DOCUMENTS

| | | |
|---|---|---|
| 498617 | 8/1992 | European Pat. Off. . |
| 0 626 689 A2 | 11/1994 | European Pat. Off. . |
| 677842 | 10/1995 | European Pat. Off. . |
| 93923665 | 8/1996 | European Pat. Off. . |
| 7130102 | 5/1995 | Japan . |
| 7176175 | 7/1995 | Japan . |
| WO 88/08190 | 10/1988 | WIPO . |
| WO 91/19407 | 12/1991 | WIPO . |

OTHER PUBLICATIONS

"Digital Audio and Ancillary Data Services for an Advanced Television Service" Document T3/186,U.S. Advanced Television Systems commitee, Technology Group on Distribution, 3 Feb. 1992, pp. 1–12.

Patent Abstracts of Japan, Publication No. 5-234257, Date of Publication of Application—Sep. 10, 1993.

(List continued on next page.)

*Primary Examiner*—Muhammad N. Edun
*Attorney, Agent, or Firm*—Pillsbury Madison & Sutro LLP

[57] ABSTRACT

When an audio stream signal is transmitted, the bit stream information for determining the surround mode and special-use mode, including karaoke use, is sensed from the signal at a mode sensor. After the surround mode has been sensed, the audio data is converted by a decoder into a front left, front center, and front right main audio signals and a back left and back right surround audio signals in the surround mode, which are converted into analog signals and outputted to the corresponding speakers. When the special-use mode has been sensed, by using the central main audio signal of the front left, front center, and front right main audio signals and back left and back right surround audio signals converted at the decoder, a normally used first-type accompanying sound selectively made unused, for example, guide melody, is generated. In addition, by using the back left and back right surround audio signals, a normally unused second-type accompanying sound selectively used, for example, vocals, is generated. The first- and second-type accompanying sounds, together with the front left and front right main audio signals, are reproduced selectively. Consequently, a system that transmits surround sound using a plurality of channels can maintain compatibility with a surround system easily, when the plurality of channels are applied to special use, such as karaoke, not being restricted to surround use.

19 Claims, 37 Drawing Sheets

OTHER PUBLICATIONS

Patent Abstracts of Japan, Publication No. 6–44686, Date of Publication of Application—Feb. 18, 1994.

Patent Abstracts of Japan, Publication No. 07221717 A, Date of Publication of Application—Aug. 18, 1995.

Patent Abstracts of Japan, Publication No. 08065169 A, Date of Publication of Application—Aug. 3, 1996.

Patent Abstracts of Japan, Publication No. 08077711 A, Date of Publication of Application—Mar. 22, 1996.

Patent Abstracts of Japan, Publication No. Hei 8–123488, Date of Publication of Application—May 17, 1996.

ITU–R Recommendations BS.775–1, Multichannel Stereophonic Sound System With and Without Accompanying Picture, 1993; 1994 BS Series Vol.; pp. 257–266.

FIG. 9

| VMGI MAT | | (Description Order) |
|---|---|---|
| | | Content |
| VMG_ID | | Video Manager Identifier |
| VMGI_SZ | | Size of Video Manager Information |
| VERN | | Version Number of DVD Video Specification |
| VMG_CAT | | Video Manager Category |
| VLMS_ID | | Volume Set Identifier |
| VTS_Ns | | Number of Video Title Set |
| PVR_ID | | Provider Unique ID |
| VMGI_MAT_EA | | End Address of VMGI_MAT |
| VMGM_VOBS_SA | | Video Manager Menu Video Object Set Start Address |
| TT_SRPT_SA | | Start Address of VTS_SRPT |
| VMGM_PGCI_UT_SA | | Start Address of VMGM_PGCI_UT |
| VTS_ATRT_SA | | Start Address of VTS_ATRT |
| VMGM_V_ATR | | Video Attribute of VMGM |
| VMGM_AST_Ns | | Number of Audio Stream of VMGM |
| VMGM_AST_ATR | | Audio Stream Attribute of VMGM |
| VMGM_SPST_Ns | | Number of Sub-picture Stream of VMGM |
| VMGM_SPSTP_ATR | | Sub-picture Stream Attribute of VMGM |

FIG. 10

| TT_SRPTI | (Description Order) |
|---|---|
| | Content |
| EN_PGC_Ns | Number of Entry PGC |
| TT_SRPT_EA | End Address of TT_SRPT |

| TT_SRP | (Description Order) |
|---|---|
| | Content |
| VTSN | Video Title Set Number |
| PGCN | Program Chain Number |
| VTS_SA | Start Address of Video Title Set |

| VMGM_PGCI_UTI | |
|---|---|
| | Contents |
| VMGM_LU_Ns | Number of Video Maneger Menu Language Units |
| VMGM_PGCI_UT_EA | End Address of VMGM_PGCI_UT |

| VMGM_LU_SRP | |
|---|---|
| | Content |
| VMGM_LCD | Video Manager Menu Language Code |
| VMGM_LU_SA | Start Address of VMGM_LU |

| VMGM_LUI | |
|---|---|
| | Contents |
| VMGM_PGCI_Ns | Number of VMGM_PGCIs |
| VMGM_LUI_EA | End Address of VMGM_LUI |

| VMGM_PGCI_SRP | |
|---|---|
| | Contents |
| VMGM_PGC_CAT | VMGM_PGC Category |
| VMGM_PGCI_SA | Start Address of VMGM_PGCI |

VTS_ATRTI

| | Contents |
|---|---|
| VTSM_Ns | Number of VTSs |
| VTS_ATRT_EA | End Address of VTSM_ATRT |

VTS_ATR_SRP

| | Contents |
|---|---|
| (1) VTS_ATR_SA | Start Address of VTS_ATR |

VTS_ATR

| | Contents |
|---|---|
| VTS_ATR_EA | End Address of VTS_ATR |
| VTS_CAT | Video Title Set Category |
| VTS_ATRI | Video Title Set Attribute Information |

| VTSI_MAT | Contents |
|---|---|
| VTS_ID | VTS Identifier |
| VTSI_SZ | Size of the VTSI |
| VERN | Version Number of DVD Video Specification |
| VTS_CAT | VTS Category |
| VTSI_MAT_EA | End Address of VTSI_MAT |
| VTSM_VOBS_SA | Start Address of VTSM_VOBS |
| VTSTT_VOBS_SA | Start Address of VTSTT_VOB |
| VTS_PTT_SRPT_SA | Start Sddress of VTS_PTT_SRPT |
| VTS_PGCIT_SA | Start Address of VTS_PGCIT |
| VTSM_PGCI_UT_SA | Start Address of VTSM_PGCI_UT |
| VTS_TMAPT_SA | Start Address of VTS_TMAPT |
| VTS_C_ADT_SA | Start Address of Cell Address Table |
| VTS_VOBU_ADMAP_SA | Start Address of VOBU Address Map |
| VTSM_V_ATR | Video Attribute of VTSM |
| VTSM_AST_Ns | Number of Audio Streams of VTSM |
| VSTM_AST_ATR | Audio Stream Attribute of VTSM |
| VTSM_SPST_Ns | Number of Sub-Picture Streams of VTSM |
| VTSM_SPST_ATR | Sub-Picture Stream Attribute of VTSM |
| VTS_V_ATR | Video Attribute of VTS |
| VTS_AST_Ns | Number of Audio Stream of VTS |
| VTS_AST_ATR | Audio Atribute Attribute of VTS |
| VTS_SPST_Ns | Number of Sub-Picture Steams of VTS |
| VTS_SPST_ATR | Sub-Picture Stream Attribute of VTS |
| VTS_MU_AST_ATR | Multichannel Audio Atream Attribute of VTS |

FIG. 26

| b63 | b62 | b61 | b60 | b59 | b58 | b57 | b56 |
|---|---|---|---|---|---|---|---|
| Audio Coding Mode | | | Reserved(0) or Multichannel Extension | Audio Type | | Application ID | |
| b55 | b54 | b53 | b52 | b51 | b50 | b49 | b48 |
| Quantization | | fs | | Reserved(0) | Number of Audio Channels | | |
| b47 | b46 | b45 | b44 | b43 | b42 | b41 | b40 |
| Reserved(0) or Specific Code (Upper Bits) | | | | | | | |
| b39 | b38 | b37 | b36 | b35 | b34 | b33 | b32 |
| Reserved(0) or Specific Code (Lower Bits) | | | | | | | |
| b31 | b30 | b29 | b28 | b27 | b26 | b25 | b24 |
| Reserved(0) or Reserved(0) for Specific Code | | | | | | | |
| b23 | b22 | b21 | b20 | b19 | b18 | b17 | b16 |
| Reserved(0) | | | | | | | |
| b15 | b14 | b13 | b12 | b11 | b10 | b9 | b8 |
| Reserved(0) | | | | | | | |
| b7 | b6 | b5 | b4 | b3 | b2 | b1 | b0 |
| Reserved(0) or Application Information | | | | | | | |

VTS_PGCIT_I (Description Order)

| | Content |
|---|---|
| VTS_PGC_Ns | Number of VTS_PGCs |
| VTS_PGCIT_EA | End Address of |

FIG. 30

VTS_PGCIT_SRP (Description Order)

| | Content |
|---|---|
| VTS_PGC_CAT | Video Title Set PGC category |
| VTS_PGCI_SA | Start Address of VTS_PGC |

FIG. 31

VTS_PGCI

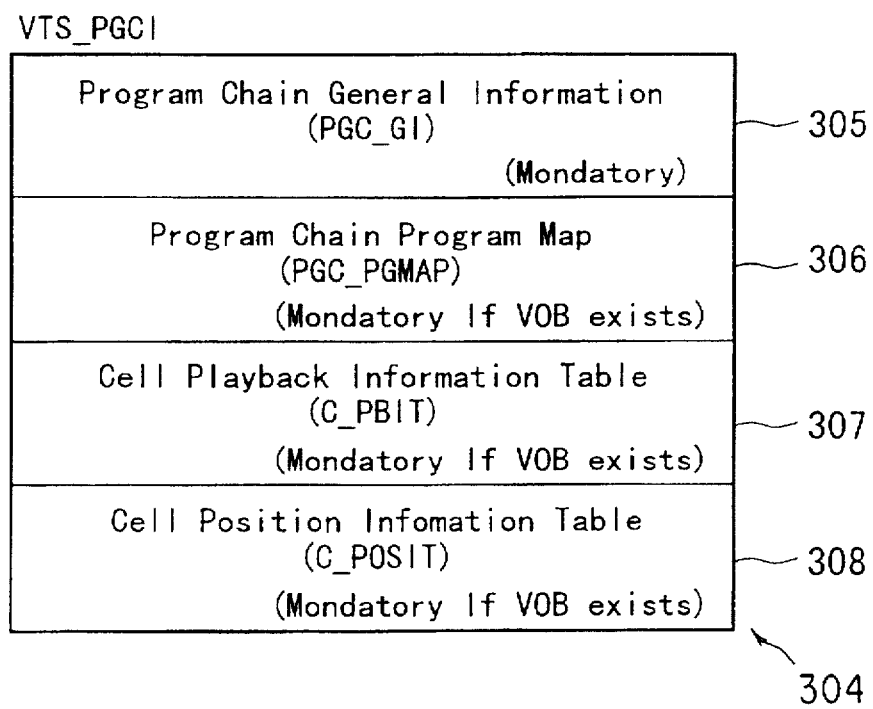

- Program Chain General Information (PGC_GI) (Mondatory) — 305
- Program Chain Program Map (PGC_PGMAP) (Mondatory If VOB exists) — 306
- Cell Playback Information Table (C_PBIT) (Mondatory If VOB exists) — 307
- Cell Position Infomation Table (C_POSIT) (Mondatory If VOB exists) — 308

304

PGC_GI

| | (Description Order) |
|---|---|
| | Content |
| PGCI_CAT | PGC Category |
| PGC_CNT | PGC Content |
| PGC_PB_TIME | PGC Playback Time |
| PGC_SPST_CTL | PGC-Sub-picutre Stream Control |
| PGC_AST_CTL | PGC Audio Stream Control |
| PGC_SP_PLT | PGC Sub-picture Palette |
| PGC_PGMAP_SA | Start Address of PGC_PGMAP |
| C_PBIT_SA | Start Address of C_PBIT |
| C_POSIT_SA | Start Address of C_POSIT |

FIG. 32

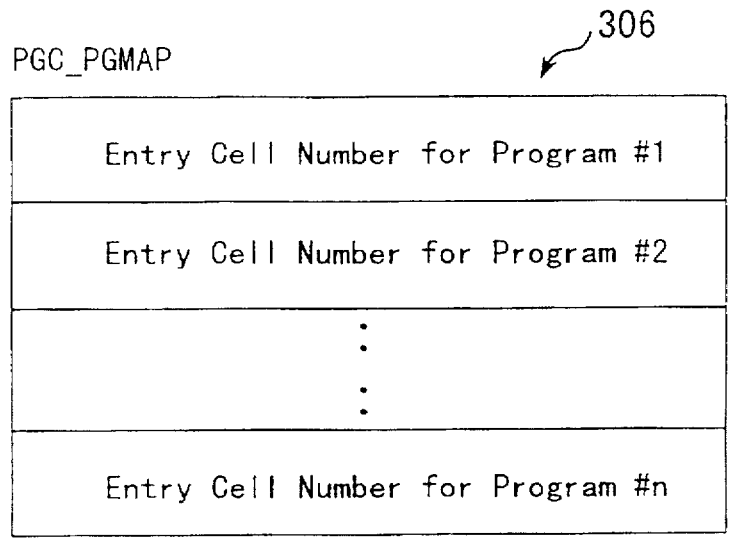

FIG. 33

Entry cell number

| | Content |
|---|---|
| ECELLN | Entry Cell Number |

FIG. 34

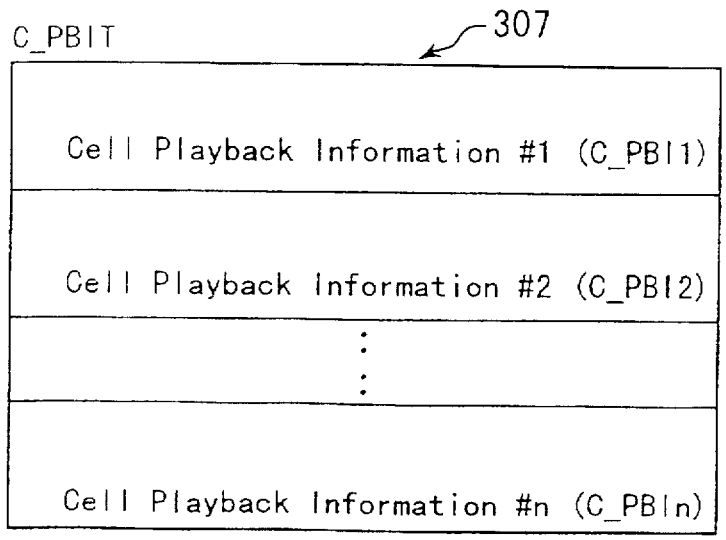
FIG. 35
| C_PBI | |
|---|---|
| | Content |
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
FIG. 36
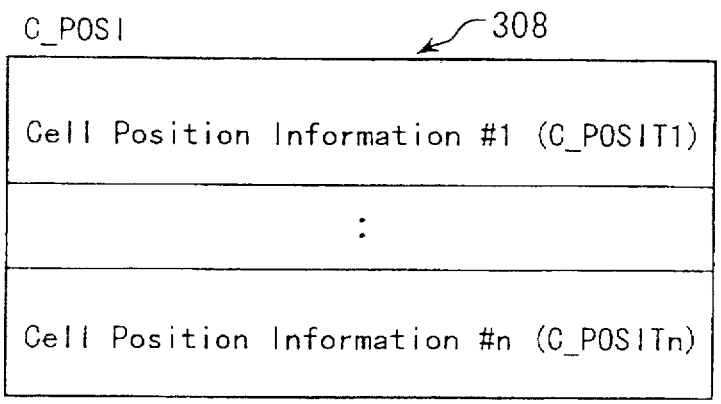
FIG. 37
| C_POSI | |
|---|---|
| | Content |
| C_VOB_IDN | VOB ID Number of Cell |
| C_IDN | Cell ID Number of the Cell |
FIG. 38

VTSM_PGCI_UTI

|  | Contents |
|---|---|
| VTSM_LU_Ns | Number of Video Title Set Menu Language Units |
| VTSM_PGCI_UT_EA | End Address of VTSM_PGCI_UT |

VTSM_LU_SRP

|  | Contents |
|---|---|
| VTSM_LCD | Video Title Set Menu Language Code |
| VTSM_LU_SA | Start Address of VTSM_LU |

| VTSM_LUI | |
|---|---|
| | Contents |
| VTSM_PGC_Ns | Number of VTSM_PGCs |
| VTSM_LU_EA | End Address of VTSM_LU |

| VTSM_PGCI_SRP | |
|---|---|
| | Contents |
| VTSM_PGC_CAT | VTSM_PGC Category |
| VTSM_PGC_SA | Start Address of VTSM_PGCI |

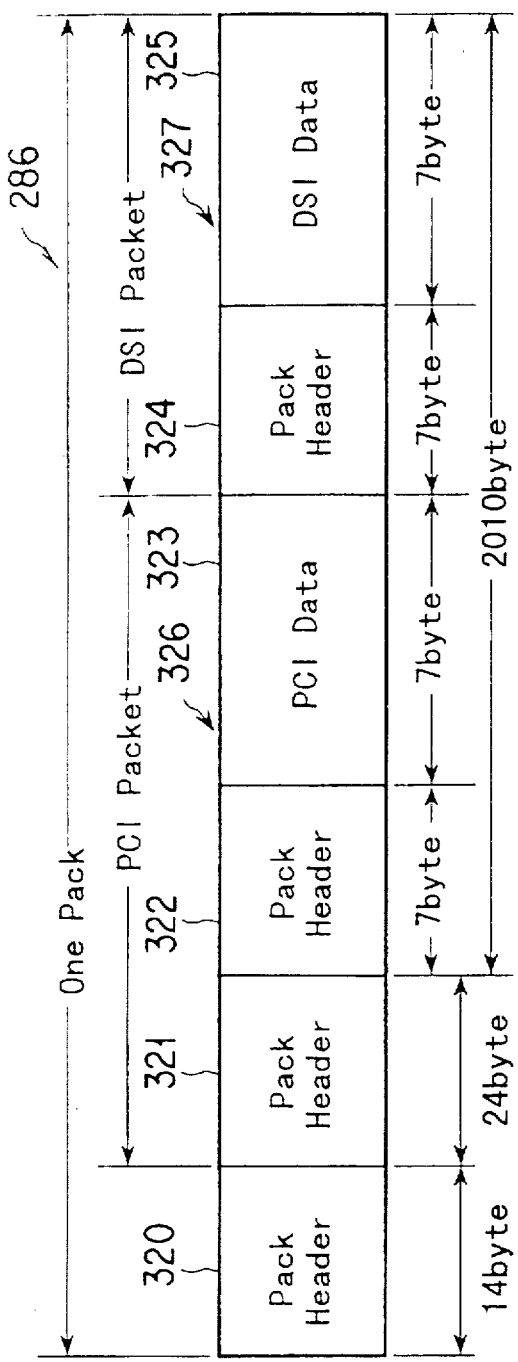
F I G. 45
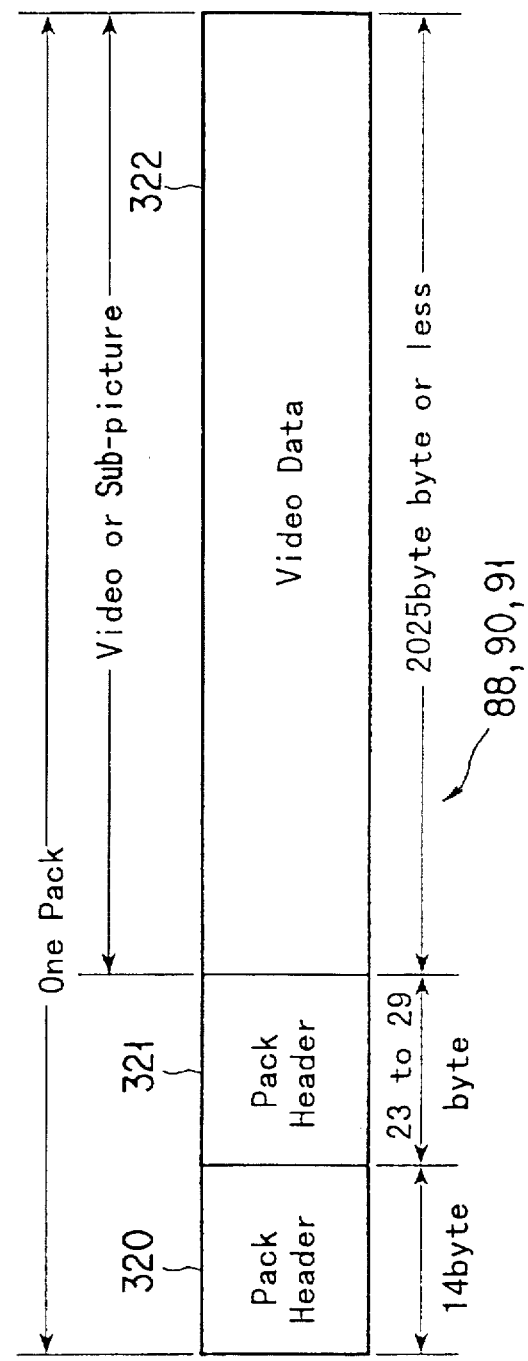
F I G. 46

FIG. 47

| PCI | |
|---|---|
| | Content |
| PCI_GI | PCI General Information |
| NSMLS_ANGLI | Angle Information |

FIG. 48

| PCI_GI | |
|---|---|
| | Content |
| NV_PCK_LBN | LBN of NV Pack |
| VOBU_CAT | Category of VOBU |
| VOBU_S_PTM | Start PTM of VOBU |
| VOBU_E_PTM | End PTM of VOBU |

FIG. 49

| DSI | |
|---|---|
| | Content |
| DSI_GI | DSI General Information |
| SML_PBI | Seamless Playback Information |
| SML_AGLI | Angle Information |
| NV_PCK_ADI | Navigation Pack Address Information |
| SYNCI | Synchronus Playback information |

FIG. 50

| DSI_GI | |
|---|---|
| | Content |
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

FIG. 51

| SYNCI | |
|---|---|
| | Content |
| A_SYNCA 0 to 7 | Target Audio Pack Address |
| SP_SYNCA 0 to 31 | VOBU Start Address of Target SP |

```
OLDIES NO. 10
(HIT SONG COLLECTIONS IN 1960'S)

1. HIT SONG COLLECTIONS (BY SINGERS)
   (a) BEATLES HIT SONGS
   (b) ELVIS PRESLEY HIT SONGS

2. KARAOKE HIT SONG COLLECTIONS (BY SINGERS)
   (a) BEATLES KARAOKE HIT SONGS
   (b) ELVIS PRESLEY KARAOKE HIT SONGS
```

FIG. 58

```
ELVIS PRESLEY KARAOKE HIT SONGS
(HIT SONGS IN 1960'S)

```
EVIS PRESLEY KARAOKE
   1.     ○○○○○
   SELECTION OF LYRIC LINES (SUB-PICTURE)

A.  ENGLISH
   B.  JAPANESS
   3.  GERMAN
   4.  FRENCH
```

FIG. 61

☒ SURROUND MODE   ☐ KARAOKE MODE

| CONTENTS | DEFAULT |
|---|---|
| ○ L | |
| ○ C | ◁ USED |
| ○ R | |
| ○ LS | ◁ USED |
| ○ RS | ◁ USED |

FIG. 63A

☐ SURROUND MODE   ☒ KARAOKE MODE

| CONTENTS | DEFAULT | USER SELECTABLE ITEM |
|---|---|---|
| ○ L | | |
| ○ A1 | ◁ USED | ◇ UNUSED |
| ○ R | | |
| ○ A1-1 | ◁ UNUSED | ◇ USED |
| ○ A2-2 | ◁ UNUSED | ◇ USED |

FIG. 63B

| POSITION | | U1 | U2 | U3 | U4 | U5 | U6 |
|---|---|---|---|---|---|---|---|
| 1 | DEFAULT | 0.707 | 0.707 | 0.000 | 0.000 | 0.000 | 0.000 |
| 2 | OPTION | 0.707 | 0.707 | 0.500 | 0.866 | 0.000 | 0.000 |
| 3 | | 0.707 | 0.707 | 0.000 | 0.000 | 0.866 | 0.500 |
| 4 | | 0.707 | 0.707 | 0.500 | 0.866 | 0.866 | 0.500 |

AUDIO SYSTEM WHICH NOT ONLY ENABLES THE APPLICATION OF THE SURROUND SYSTEM STANDARD TO SPECIAL PLAYBACK USES BUT ALSO EASILY MAINTAINS COMPATIBILITY WITH A SURROUND SYSTEM

This is a continuation of application Ser. No. 08/688,762, filed on Jul. 21, 1996, which was abandoned upon the filing hereof.

BACKGROUND OF THE INVENTION

1. Field of the Invention

This invention relates to an audio system, its reproducing apparatus, and its recording medium, and more particularly to an audio system that easily maintains compatibility with a surround system when in a system that transmits or records (hereinafter, transmits) surround audio using a plurality of transmission channels, the plurality of channels are used for special purposes, (e.g. such as karaoke), which are not limited to surround, a reproducing apparatus for reproducing audio signals from the system, and a recording medium made according to an allocating method complying with the standard for surround.

2. Description of the Related Art

A conventional surround system, for example, a Dolby surround system AC-3 proposed by Dolby Laboratories, is such that when 5-channel surround audio signals are recorded on a recording medium, such as an optical disk the audio signals are reproduced by a reproducing apparatus compatible with the surround system at three speakers in front of the listener and two speakers behind the same listener. Such conventional systems use this speaker arrangement to form a sound field around the listener giving the feeling of being at a live performance. In addition, the surround system can reproduce audio signals suitable for a 2-channel audio system. The 2-channel audio system converts 5-channel audio signals into 2-channel audio signals using a process known as down-mixing. Based on the 2-channel audio signals, stereo sound is reproduced at the two speakers positioned in front of the listener.

Conventional systems that provide surround reproduction and stereo reproduction of the 5-channel surround audio signals are shown in FIGS. 1A and 1B, respectively. In surround reproduction, 5-channel audio input signals L, C, R, LS, and RS are transmitted to speakers 8L, 8C, 8R, 8LS, and 8RS at the front left, the front center, and the front right, the back left and the back right, respectively, as shown in FIG. 1A. The respective speakers reproduce sound based on the signal input thereto. As described above, in the reproducing system with 5-channel speakers, the sound volume can be adjusted channel by channel. In addition, reproduction can be stopped in any or all channels.

On the other hand, in stereo reproduction, the five input signals L, C, R, LS, and RS undergo down-mixing at a down mixer Dmix. During down-mixing, the input signals are converted into 2-channel audio output signals Lo and Ro, which are then supplied to the front left and front right speakers 8L and 8R. Each of the two speakers 8L and 8R reproduce sound based on the signal input thereto. The down mixer Dmix includes a circuit that down-mixes 5-channel audio input signals L, C, R, LS, and RS as described hereinafter.

The 2-channel audio output signals Lo and Ro, which are obtained by down-mixing and supplied to the front left and front right speakers 8L and 8R, are normally expressed as:

$$Lo = L + 0.7C + 0.7LS$$

$$Ro = R + 0.7C + 0.7RS$$

When 5-channel audio signals are converted into 2-channel audio signals, simple down-mixing may provide unnatural 2-channel reproduction depending on the nature of the 5-channel audio signals. For instance, there may be a case where absence of the surround-channel audio signals LS and RS results in natural reproduction. For this reason, the conventional down mixer Dmix uses a circuit controlled by a control signal Cont to selectively turn on and off the addition of the surround channel audio signals LS and RS, as shown in FIG. 2. To prevent a sense of incongruity from being introduced into the sound field in reproduction, the control signal Cont is not manipulatable by the user. As a rule, the user cannot enter the control signal Cont into the down mixer arbitrarily. Generally, the control signal is determined on the transmission side or the recording side and recorded on an optical disk or a like recording medium. When down-mixing is performed, the audio signals transmitted via a plurality of transmitting channels are reproduced at output channels, where the number of output channels is smaller than the number of transmitting channels. During conventional down-mixing the user cannot change the conversion coefficients including the mixing ratio.

In recent years, in Japan and many other foreign countries, karaoke systems have become very popular, where the user himself or herself sings with background music. Although various karaoke systems have been proposed and those with various functions have been developed, a multi-functional karaoke system that can sufficiently comply with the demands of users has not yet been realized. Similarly, there have been various special demands in systems such as karaoke, for example, when of special reproduction uses, such as a rendering of a particular musical instrument may be reproduced in addition to karaoke.

In systems such as karaoke, to comply with the demands of the users appropriately, it has been necessary to prepare as many audio programs as there are demands and to pre-record data for each audio program on a recording medium. Such systems are problematic since they require a tremendous recording capacity. To reduce memory requirements, a surround sound system has been considered. However, since conventional surround sound systems have not taken into account special applications including karaoke, it is difficult to simply apply such special applications to a surround sound system. Thus, in conventional surround sound systems used for special applications such as karaoke, some improvements are needed. Specifically, when down-mixing is conducted, the audio signals transmitted via a plurality of channels are reproduced at a number of output channels fever than the number of transmission channels. Because the user cannot change the conversion coefficients including the mixing radio once conventional down-mixing is effected, it is necessary to allocate channels, taking into consideration how to handle both those audio signals normally reproduced and those audio signals not normally reproduced. As described above, to provide special applications including karaoke which comply with the various demands of the users, it is necessary to combine a conventional surround sound system with a special system (i.e., a karaoke system) and it is necessary to consider the compatibility between them.

SUMMARY OF THE INVENTION

An object of the present invention is to provide an audio system that easily maintains compatibility with a surround sound system when in a special system that transmits surround audio using a plurality of transmission channels which are used for special uses, such as karaoke, and which are not limited to surround sound. The present invention also has an object to provide a method of reproducing audio signals from the system, a recording medium used with the system, and a method of recording data on the recording medium.

According to the present invention, there is provided an audio system comprising: transmitting means for transmitting one of first and second audio data, the first audio data including a first code information items for determining a surround mode and first and second main audio signals and first sub-audio signal, and second audio data including a second code information items for determining a special-use mode and third and fourth main audio signals and a second sub-audio signal, the fourth main audio signal including a normally available accompanying sound and the second sub-audio signal including one of normally available and normally unavailable accompanying sounds; means for sensing the first and second code information items; means for outputting one of the first and second audio data; and means for allowing the first and second main audio signals or the first and second main audio signals and the first sub-audio signal to output from the outputting means in response to the sensing of the first code information item, and setting the outputting means in a selective setting mode in response to the sensing of the second code information, in which the third main audio signal is outputted from the output means, the fourth main audio signal is normally set in an available mode and is outputted from the output means, and the second sub-audio signal is normally set in an unavailable mode and is prevented from being outputted from the outputting means or the second sub-audio signal is normally set in the available mode and the second sub-audio signal is outputted.

Furthermore, according to the present invention, there is provided an audio system comprising: front left, front center, front right, back left and back right speakers; transmitting means, having front left, front center, front right main audio channels and back left and back right surround audio channels, for transmitting audio information that includes a first and second code information items for determining a surround mode and a special-use mode, and audio data which includes first, second and third main audio contents corresponding to the front left, front center, and front right main audio channels corresponding to the front left, front center, and front right speakers, and first and second sub-audio contents corresponding to surround audio channels corresponding to the back left and back right speakers; means for sensing the first and second code information items; conversion means for, in response to the sensing of the first code information item, converting the first, second and third main audio contents into a first front left, first front center, and first front right main audio signals and the first and second sub-audio contents into a first back left and first back right surround audio signals in the surround mode; and generating means for generating a second front left, second front center, and second front right main audio signals from the first, second and third main audio contents, and generating a second back left and second back right surround audio signals from the first and second sub-audio contents in the special-use mode in response to the sensing of the second code information item, the generating means including means for selectively setting the first, second and third selection modes, and means for allowing second main audio contents to be converted into the second center audio signal as a first type accompanying sound in response to the set of the first selection mode and preventing the second main audio contents from being converted into the second center audio signal in response to no set of first selection mode, and allowing at least one of the first and second sub-audio contents to be converted into first and/or second sub-audio signals as a second type accompanying sound in response to the set of the second mode or third mode, or preventing at least one of the first and second sub-audio contents from being converted into first and/or second sub-audio signals in response to the set of the second mode or third mode.

Furthermore, according to the present invention, there is provided a recording medium comprising: a data area in which an array in which a first and second code information items for determining a surround mode and a special-use mode and audio data corresponding to two or more main audio channel contents and at least one sub-audio channel content have been stored, and type information indicating that the type of the array is of audio data and management information including playback information determining the order in which each unit data item in the array is to be reproduced, have been recorded.

Still furthermore, according to the present invention, there is provided a recording method comprising the steps of: creating an array in which a first and second code information items for determining a surround mode and a special-use mode and audio data corresponding to two or more main audio channel contents and at least one sub-audio channel content have been stored; creating type information indicating that the type of the array is of audio data and management information including playback information determining the order in which each unit data item in the array is to be reproduced; and recording the created first and second code information items, audio data, type information, and management information in a data area on a recording medium.

Still furthermore, according to the present invention, there is provided a method of transmitting and reproducing audio information including first and second code information items for determining a surround mode and a special-use mode and audio data corresponding to two or more main audio channel contents and at least one sub-audio channel content, the audio reproducing method comprising the steps of: sensing the first and second code information items; converting the audio data into two or more main audio signals and at least one sub-audio signal in the surround mode in response to the sensing of the first code information item; converting the audio data into main audio signals and sub-audio signals in the special-use mode in response to the sensing of the second code information item and generating not only a normally available first-type accompanying sound selectively made unavailable, by using at least one of the main audio signals for special use, but also a selectively available second-type accompanying sound normally unavailable by using at least one of the sub-audio signals; and selecting the reproduction of the first- and second-type accompanying sounds.

Still furthermore, according to the present invention, there is provided an audio method of transmitting or recording audio using a plurality of transmission channels, the audio method comprising the steps of: providing a surround mode and a special mode; transmitting a flag signal indicating one of the modes; providing two or more front channels that transmit audio signals to be outputted from front speakers and one or more surround channels that transmit surround signals in the surround mode; and transmitting main signals via at least one of the front channels, transmitting a selectively unavailable first accompanying sound via at least one of the rest of the front channels, and transmitting a second accompanying sound selectively used or selectively made unavailable via at least one of the surround channels, in the special mode.

Still furthermore, according to the present invention, there is provided an audio method comprising the steps of: providing a maximum of five transmission channels; determining front channels to be channels that transmit a left audio signal and a right audio signal to be outputted from a front left speaker and a front right speaker, respectively, and a central audio signal to be outputted from a front center speaker, and determining surround channels to be channels that transmit a left surround audio signal and right surround audio signal to be outputted from a back left speaker and a back right speaker, respectively, in a surround mode; and transmitting main signals via the channels that transmit the left audio signal and right audio signal, transmitting a selectively unused first accompanying sound via the channel that transmits the central audio signal, and transmitting a selectively used second accompanying sound using the surround channel, in the special mode.

With the multichannel audio system of the present invention, in addition to main audio data items and sub-audio data items that are divided into a plurality of channels on a recording medium, data indicating whether the audio data items are for use in the surround mode or for special use, such as karaoke, are written on the recording medium. The description of the mode, together with the audio data, is transmitted to the reproduction side where surround reproduction is carried out in the surround mode on the basis of the surround standard.

When the audio data is for special use, a normally used first-type accompanying sound selectively made unused is generated by using at least one of the main audio signals for special use, and a second-type accompanying sound for which whether it is selectively used and normally unused or selectively unused and normally used has been specified, is generated by using at least one of the sub-audio signals. As a result, it is possible to reproduce the transmitted audio data according to the choice the user has selected. Additionally, the first- and second-type accompanying sounds can be selected by the user. According to the selection, the audio data items can be mixed. Consequently, in the special-use mode, it is possible to reproduce audio in various representation forms according to the demands of the user.

Additional objects and advantages of the invention will be set forth in the description which follows, and in part will be obvious from the description, or may be learned by practice of the invention, or may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 shows an example of the structure of the video object set (VOBS) of FIG. 8;

FIG. 10 shows the parameters in the volume manager information management table (VMGI_MAT) in the video manger (VMG) of FIG. 7 and the description thereof;

FIG. 26 shows the parameters in the video title set information management table (VTSI_MAT) for the video title set information (VTSI) of FIG. 25 and the description thereof;

FIG. 27 is a bit map table of the audio stream attributes (VTS_AST_ATR) described in the table (VTSI_MAT) of FIG. 26;

FIG. 29 shows the parameters for pieces of information (VTS_PGCITI) in the video title set program chain information table (VTS_PGCIT) of FIG. 28 and the description thereof;

FIG. 30 shows the parameters for search pointers (VTS_PGCIT_SRP) of the video title set program chain information table (VTS_PGCIT) of FIG. 28 and the description thereof;

FIG. 31 shows the structure of the program chain information (VTS_PGCI) for the video title set corresponding to a program chain in the video title set program chain information table (VTS_PGCIT) of FIG. 28;

FIG. 32 shows the parameters for pieces of general information (PGC_GI) on a program chain in the program chain information (VTS_PGCI) of FIG. 31;

FIG. 33 shows the structure of a program chain map (PGC_PGMAP) in the program chain information (VTS_PGCI) of FIG. 31;

FIG. 34 shows the parameters for the entry cell numbers (ECELLN) of the programs written in the program chain map (PGC_PGMAP) of FIG. 33 and the description thereof;

FIG. 35 shows the structure of a cell playback information table (C_PBIT) in the program chain information (VTS_PGCI) of FIG. 31;

FIG. 36 shows the parameters for pieces of cell playback information (C_PBI) in the cell playback information table (C_PBIT) of FIG. 35 and the description thereof;

FIG. 37 shows the structure of cell position information (C_POSI) in the program chain information (VTS_PGCI) of FIG. 31;

FIG. 38 shows the parameters for the cell position information (C_POSI) of FIG. 37 and the description thereof;

FIG. 45 shows the structure of the navigation pack of FIG. 9;

FIG. 46 shows the structure of the video, audio, or sub-picture pack of FIG. 9;

FIG. 47 shows the parameters for presentation control information (PCI) in the navigation pack of FIG. 45 and the description thereof;

FIG. 48 shows the parameters for general information (PCI_GI) in the presentation control information (PCI) of FIG. 47 and the description thereof;

FIG. 49 shows the parameters for disk search information (DSI) in the navigation pack of FIG. 45 and the description thereof;

FIG. 50 shows the parameters for DSI general information (DSI_GI) in the disk search information (DSI) of FIG. 49 and the description thereof;

FIG. 51 shows the parameters for synchronous playback information (SYNCI) on the video object (VOB) OF FIG. 50 and the description thereof;

FIG. 58 shows an example of the video manager menu;

FIG. 60 shows an example of the video title set menu;

FIG. 61 shows another example of the video title set menu;

FIGS. 63A and 63B show examples of the mode information appearing on the display unit of FIG. 3;

DETAILED DESCRIPTION OF THE PREFERRED EMBODIMENTS

Hereinafter, referring to the accompanying drawings, embodiments of an audio system of the present invention, its reproducing method, its recording medium, and a method of recording data on its recording medium will be explained.

Figure 3:
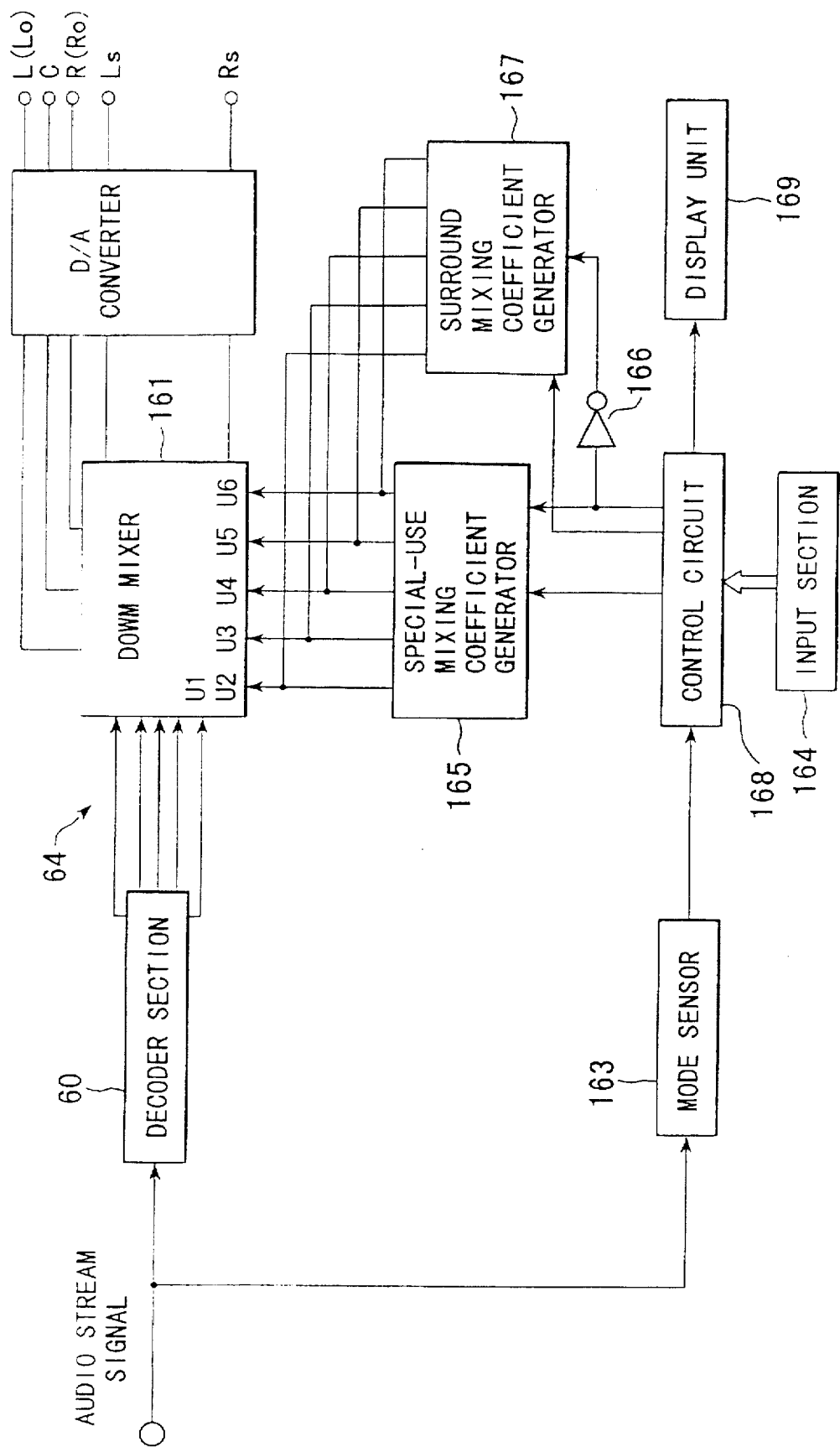
FIG. 3 is a functional block diagram of a reproduction route that realizes a surround playback mode and a special-use playback mode according to an embodiment of the present invention.

FIG. 3 is a functional block diagram of a reproducing system where a special use function, such as karaoke, is added to a surround system according to an embodiment of the present invention.

Figure 4:
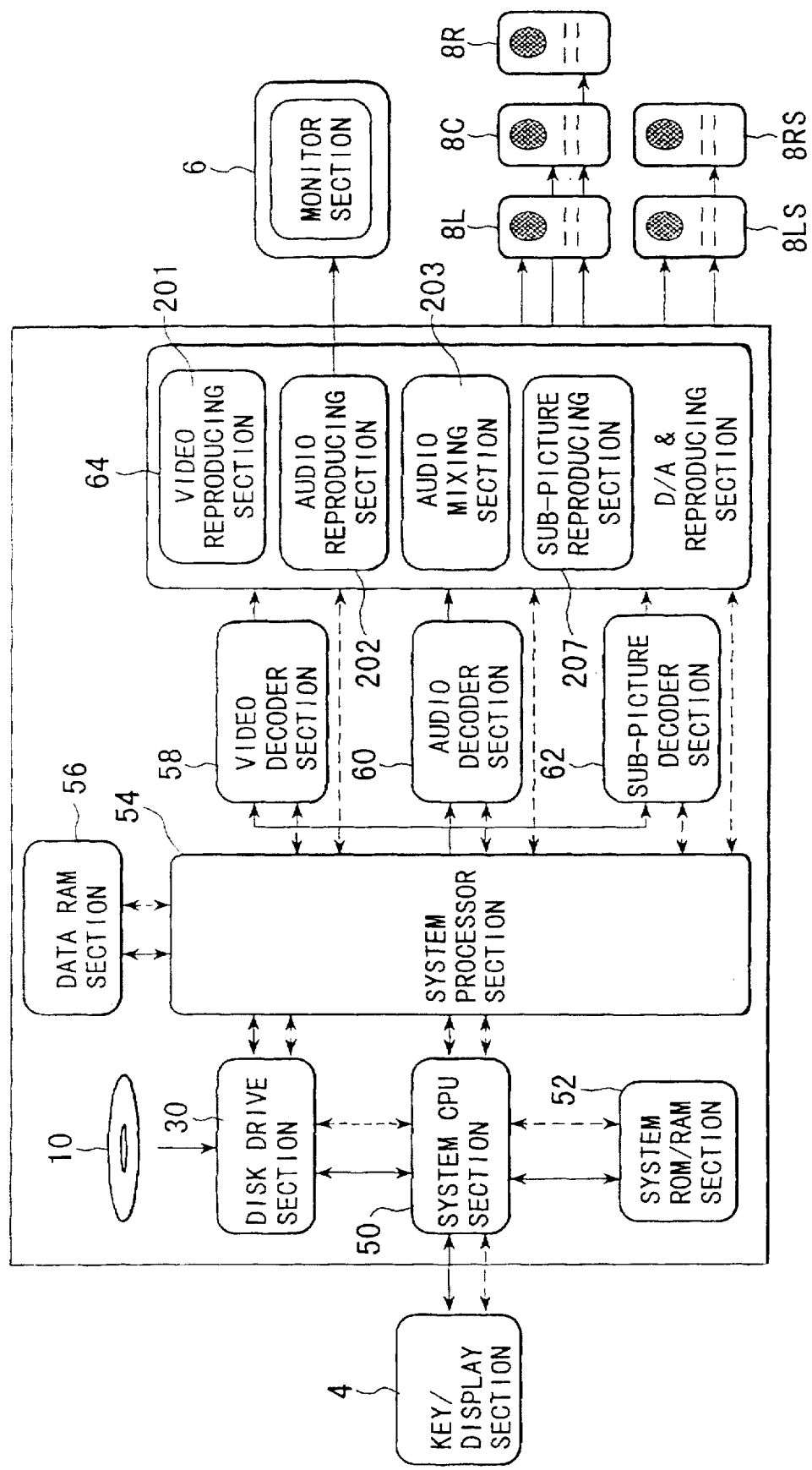
FIG. 4 is a block diagram showing the schematic construction of an optical disk apparatus according to one embodiment of this invention.

The reproducing system of FIG. 3 constitutes part of an optical disk system that reproduces data from an optical disk 10, or other recording medium, as shown in FIG. 4. The system of FIG. 3 corresponds to a part of an audio decoder section 60 and a part of a D/A and reproducing section 64 in FIG. 4. The circuit of the reproducing system of FIG. 3 is constructed by, for example, using a Dolby surround system AC-3 proposed by Dolby Laboratories. Recorded on the optical disk 10 serving as a recording medium are: audio data in which 5-channel audio signals are encoded, bit stream information data indicating the attributes of the audio data, among other data as will be explained later. The audio data and bit stream information data are inputted as audio stream signals as shown in FIG. 3. The audio data in the audio stream signals are decoded at a decoder section 60 and outputted to a down mixer 161.

The bit stream information data in the inputted audio stream signal is supplied to a mode sensor 163, which judges whether the mode is a surround mode or a special playback mode, such (as karaoke as described later). If it is the surround mode, the audio data will not be subjected to a down-mixing process at the down mixer 161, but will instead be converted into analog audio signals by a D/A converter that are outputted in the form of the corresponding 5-channel audio signals L, C, R, LS, and RS. The audio signals L, C, R, LS, and RS are amplified at an amplifier (not shown). The amplifier supplies the amplified signals to 5-channel speakers 8L, 8C, 8R, 8LS, and 8RS, respectively, which perform surround reproduction. Even in the surround mode, when the reproduction is provided with only two 2-channel speakers 8L and 8R, a signal indicating a 2-channel system is entered from an input section 164 into a control circuit 168. Upon receipt of such a signal, control circuit 168 supplies a default mixing signal indicating that a down-mixing process should be carried, and that the down-mixing process should not be based on coefficients generated by a special-use mixing coefficient generator 165 but that it should be based on coefficients generated by a surround mixing coefficient generator 167 via an inverter 166. In response to the default mixing signal, the special-use mixing coefficient generator 165 is disabled and the surround mixing coefficient signal generator 167 is enabled.

Moreover, when a signal indicating a 2-channel system is entered from an input section 164, the control circuit 168 supplies to the surround mixing coefficient generator 167 a control signal related to a first specific mixing coefficient predetermined on the transmission side and written in a bit stream information data. In response the surround mixing coefficient generator 167 supplies to the down mixer 161 a first mixing signal corresponding to a predetermined mixing ratio. Thus, the down mixer 161 effects the default mixing of the 5-channel audio signals and outputs the following 2-channel audio output signals Lo and Ro, which are supplied to a front left speaker 8L and a front right speaker 8R, respectively:

$$Lo=L+0.7C+0.7LS$$

$$Ro=R+0.7C+0.7RS$$

In the case of a sound source that provides a sense of incongruity after such a down-mixing process, the bit stream information data is sensed at the mode sensor 163. In response to the sense signal from the mode sensor 163, the control circuit 163 supplies to the surround mixing coefficient generator 167 a bit signal related to a second specific mixing coefficient written in the bit stream information data together with the default mixing signal. In response to the bit signal related to the second mixing coefficient, the surround mixing coefficient generator 167 supplies a second specific mixing coefficient to the down mixer 161. Then, the down mixer 161 maintains the audio level of the surround channels at a zero level, allocates the audio signal of center channel C to 2-channel audio signals, and outputs them as following 2-channel audio signals Lo and Ro.

$$Lo=L+0.7C+0*LS$$

$$Ro=R+0.7C+0*RS$$

These 2-channel audio output signals Lo and Ro are supplied to the front left speaker 8L and front right speaker 8R, respectively, via an amplifier (not shown).

After the mode sensor 163 has sensed the bit stream information data and found that the mode is the special playback mode, such as karaoke, the control circuit inverts the default mixing signal, enables the special-use mixing coefficient generator 167 and disables the surround mixing coefficient signal generator 167. In the state, a display unit 169 displays that the playback mode is the special playback mode, (for example, a karaoke mode), under the control of the control circuit 168. Additionally, the choices selectable in the special mode appear on the display unit 169. After a choice on the display unit 169 has been selected from the input section 164, the special-use mixing coefficient generator 165 generates a special-use mixing signal corresponding to the selected choice. According to the mixing signal, the down mixer 161 mixes the 5-channel audio signals and outputs 2-channel audio signals for special use or 5-channel audio signals.

The special-use mode has the following variations, for example. In such a special-use mode, beside orchestra audio signal there are audio signals normally to be reproduced and audio signals normally not to be reproduced.

(a) Karaoke use

Audio signals normally to be reproduced include guide melody and surround signals. Audio signals normally not to be reproduced include vocals and various sounds for practice. In general, guide melody is reproduced together with orchestral accompaniment (e.g. karaoke) which serve as a guide when the user sings. Thus, following the guide melody, a user can sing a song even if they do not know the song correctly. If the user has confidence in singing a song, he or she can sing that song without reproducing the guide melody, using the same accompaniment as a professional singer. The surround signal is normally reproduced to provide accompaniment with rich tones, such as those found in a concert hall.

On the other hand, vocals should not be reproduced when the user enjoys karaoke because they are totally unnecessary. When practicing singing a song, however, the user may sing while listening to the vocals. The vocals may be mixed at a small ratio to enable the user to sing to the guide melody. Although practice rhythm count sound or metronome sound can be recorded, it goes without saying that the vocals normally should not be reproduced.

(b) Music programs usable in karaoke

Audio signals normally to be reproduced are vocal signals. Audio signals normally not to be reproduced include various sounds for practice. In contrast with item (a), it can be considered that the vocals are usually reproduced to provide normal music programs.

(c) Musical instrument practicing programs

For example, when practicing on a piano in a piano concerto, it is best to learn how to compose music by reproducing both of orchestra sound and piano sound. After having finished the practice based on the reproduced sound, the user can enjoy playing the piano concerto, while reproducing only the orchestra sound.

In this case, audio signals normally to be reproduced are piano signals. Audio signals normally not to be reproduced include various sounds for practice.

An embodiment of an optical disk apparatus to which the present invention is applied, and physical and logical formats of the optical disk, will be explained in detail by reference to FIGS. 4 to 56, with the intention of describing in further detail an actual reproducing operation in the special-use playback mode.

In the optical disk apparatus shown in FIG. 4, when the user operates the key/display section 4 corresponding to the input section 164 and the display unit 169 shown in FIG. 3, the recorded data is reproduced from an optical disk 10. The recorded data contains video data, sub-picture data and audio data which are converted into video signals and audio signals. The monitor section 6 displays images according to the audio signals and the speaker section 8 generates sound according to the audio signals.

Figure 2:
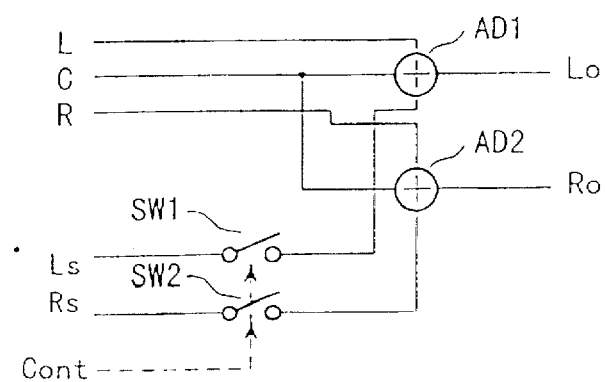
FIG. 2 is a block diagram to help explain down-mixing in a conventional system.
Figure 5:
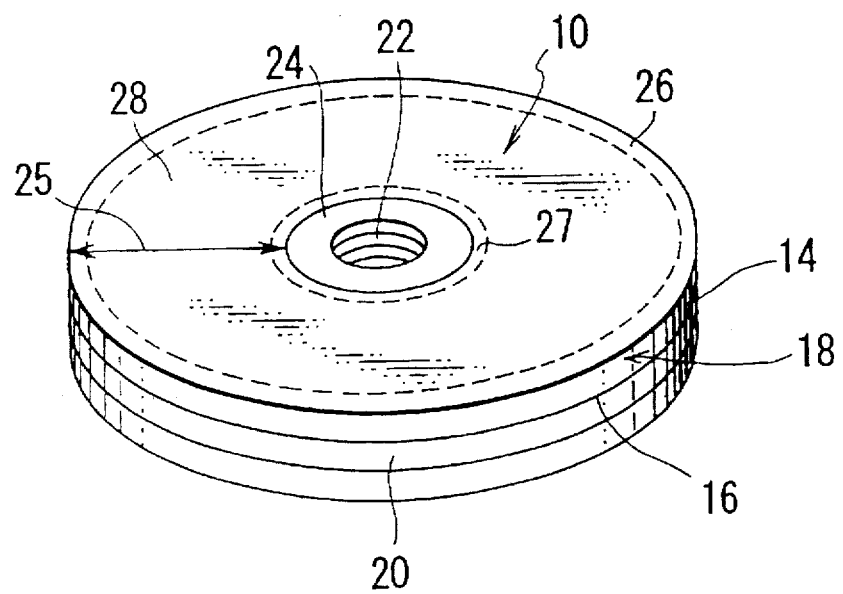
FIG. 5 is a perspective view schematically showing the structure of an optical disk to be loaded on the disk drive section shown in FIG. 4.

The optical disk 10 has been available with various structures. For instance, one type of the optical disk 10 is a read-only disk on which data is recorded at a high density, as shown in FIG. 5. The optical disk 10, as shown in FIG. 5, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On both sides of the periphery of the center hole 22, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it remains clamped to the clamping areas 24.

As shown in FIG. 5, the optical disk 10 has an information area 25 around the peripheral edges of the clamping area 24 information can be recorded on the informaiton area. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which playback data, video data, sub-picture data and audio data are recorded in the form of pits (that is, in the form of changes in the physical state) as explained later. With the read-only optical disk 10, a train of pits is previously formed on the transparent substrate 14 by a stamper, a reflecting layer is formed by evaporation on the surface of the transparent substrate 14 where the pit train has been formed, and the reflecting layer serves as the recording layer 16. On the read-only optical disk 10, no groove is normally provided as a track and the pit train on the surface of the transparent substrate 14 serves as a track.

The optical disk apparatus 12, as shown in FIG. 4, further comprises a disk drive section 30, a system CPU section 50, a system ROM/RAM section 52, a system processor section 54, a data RAM section 56, a video decoder 58, an audio decoder section 60, a sub-picture decoder section 62, and a D/A and data reproducing section 64.

Figure 6:
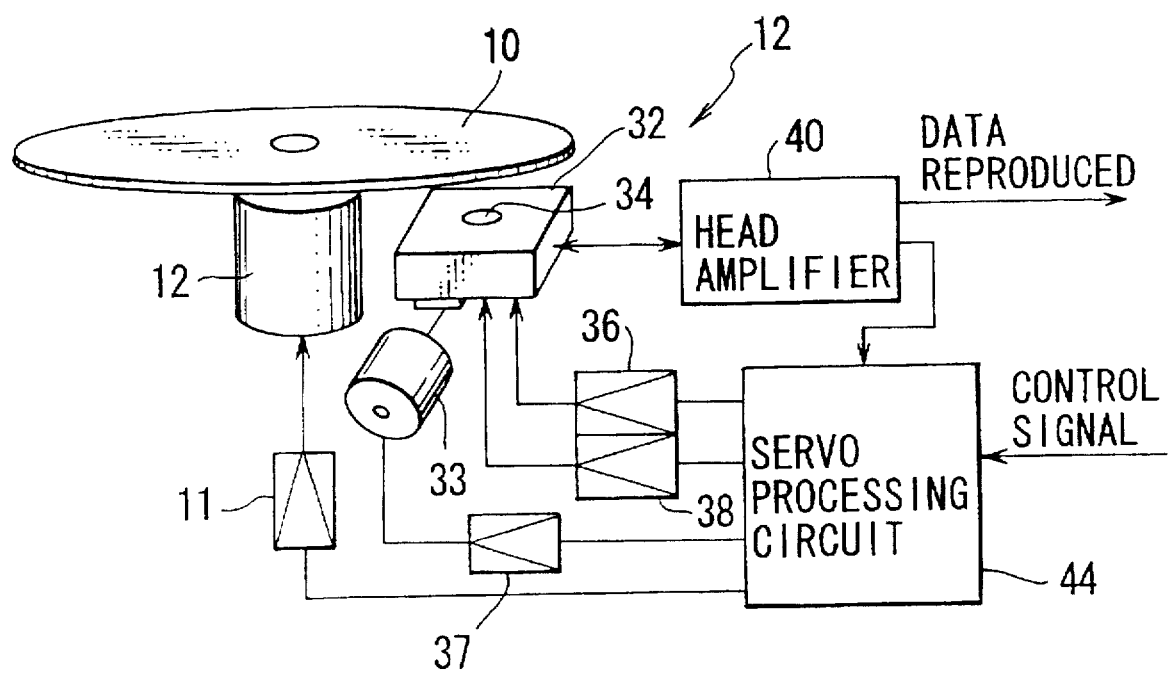
FIG. 6 is a block diagram showing in detail the mechanism portion of a disk drive section shown in FIG. 4.

As shown in FIG. 6, the disk drive section 30 contains a motor driving circuit 11, a spindle motor 12, an optical head 32 (i.e., an optical pickup), a feed motor 33, a focus circuit 36, a feed motor driving circuit 37 a tracking circuit 38 a head amplifier 40 and a servo processing circuit 44. The optical disk 10 is placed on the spindle motor 12 driven by the motor driving circuit 11 and is rotated by the spindle motor 12. The optical head 32 which projects a laser beam on the optical disk 10 is located under the optical disk 10. The optical head 32 is placed on a guide mechanism (not shown). The feed motor driving circuit 37 is provided to supply a driving signal to the feed motor 33. The feed motor 33 is driven by the driving signal. The feed motor 33 moves the optical head 23 in and out radially over the optical disk 10. The optical head 32 is provided with an object lens 34 positioned so as to face the optical disk 10. The object lens 34 is moved according to the driving signal supplied from the focus circuit 36 so as to move along its optical axis.

To reproduce the data from the aforementioned optical disk 10, the optical head 32 projects a laser beam on the optical disk 10 via the object lens 34. The object lens 34 is traversed minutely over the optical disk 10 according to the driving signal supplied from the tracking circuit 38. Furthermore, the object lens 34 is moved minutely along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal. The electrical signal is supplied from the optical head 32 to the servo processing circuit 44 via the head amplifier 40. From the electric signal, the servo processing circuit 44 produces a focus signal, a tracking signal, and a motor control signal. The servo processing circuit 44 supplies these signals to the focus circuit 36, tracking circuit 38, and motor driving circuit 11, respectively.

Therefore, the object lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to trace the pit train at a constant linear speed.

Figure 1A:
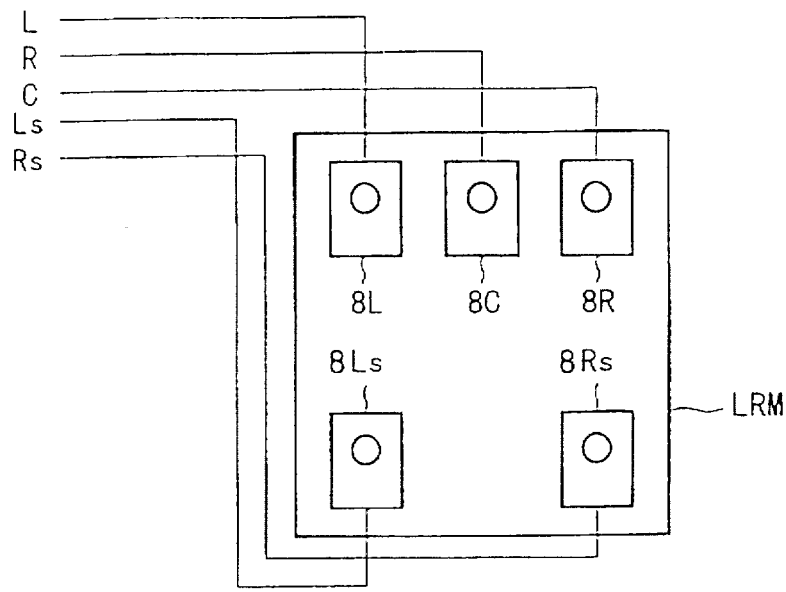
FIG. 1A is a block diagram of a conventional surround system.
Figure 1B:
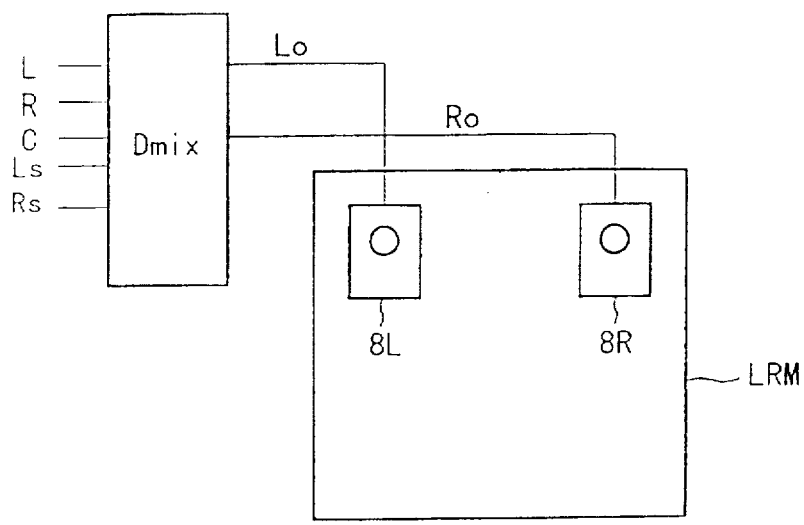
FIG. 1B is a block diagram of an example of down-mixing in a conventional surround system.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to traverse over the optical disk 10. Then, the optical head 32 accesses a specific sector formed at the recording layer 16 of the optical disk 10. The playback data is reproduced from the specific sector by the optical head 32, which then supplies it to the head amplifier 40. The head amplifier 40 amplifies the reproduced data, which is outputted at the disk drive section 30.

The reproduced data is stored in the data RAM section 56 by the system processor section 54 under the supervision of the system CPU section 50 controlled by the programs stored in the system ROM/RAM section 52. The stored reproduced data is processed at the system processor section 54, which sorts the data into video data audio data, and sub-picture data. These three sorted data are supplied to the video decoder section 58, audio decoder section 60, and sub-picture decoder section 62, respectively, and are decoded at the respective decoders. The D/A and data-reproducing section 64 converts the decoded video data, audio data and sub-picture data into an analog video signal, an analog audio signal, and an analog sub-picture signal. Once the date is converted, section 64 supplies the resulting video signal to the monitor 6 and the resulting audio signal to the speaker 8. Then, on the basis of the video signal and sup-picture signal, images are displayed on the monitor section 6 and, according to the audio signal, sound is simultaneously reproduced at the speaker section 8.

Next, the structure of the logic format of the optical disk shown in FIG. 5 is explained. Further, the operation of the optical disk apparatus shown in FIG. 4 is explained in detail later together with the logic formats of the optical disk 10.

Figure 7:
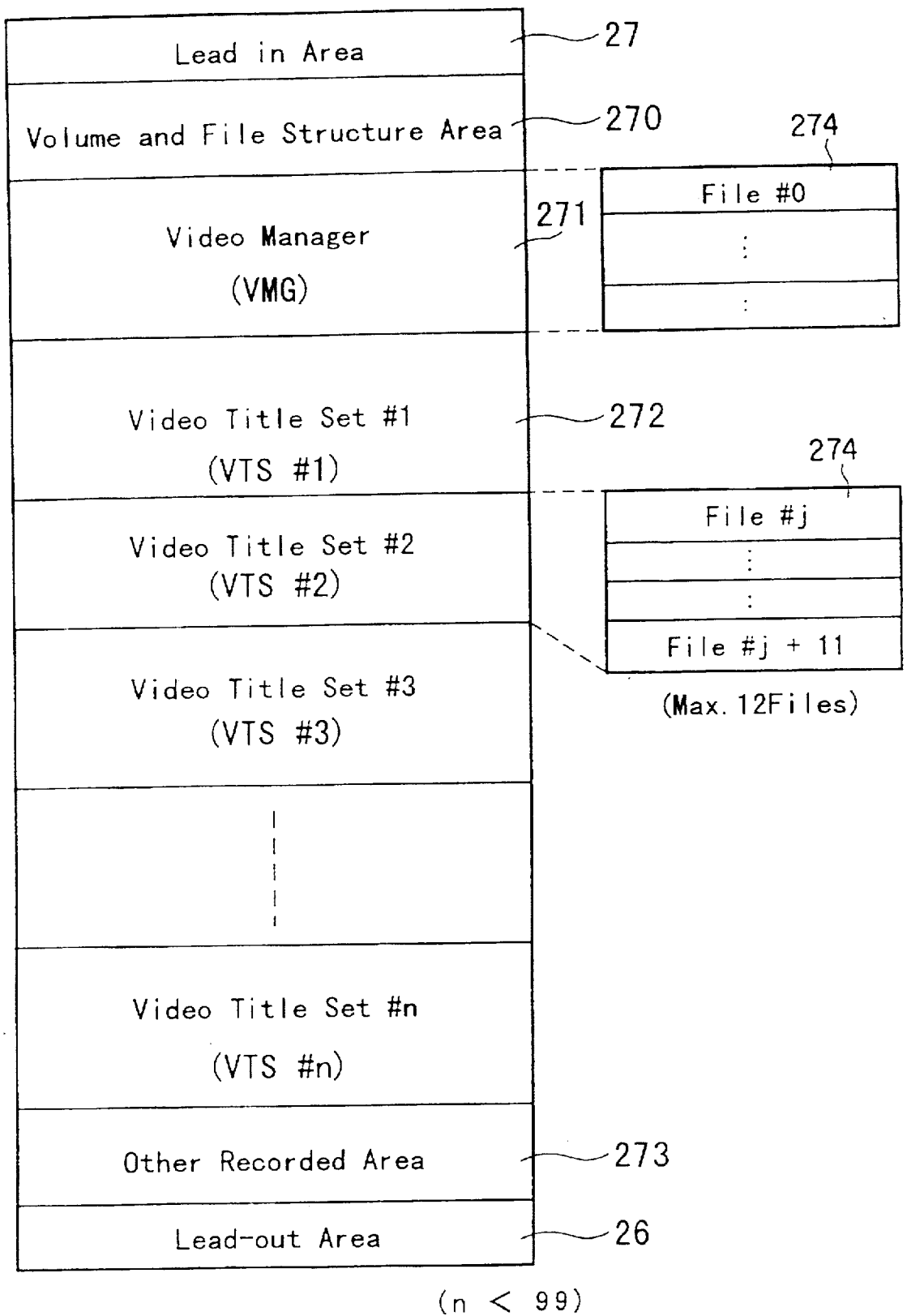
FIG. 7 shows the structure of a logic format of an optical disk associated with an improved one of the initial version of the logic format of the optical disk of FIG. 5.

As shown in FIG. 7, the data recording area 28 between the lead-in area 27 and the lead-out area 26 on the optical disk of FIG. 5 has a volume and file structure. The structure has been determined in conformity to specific logic format standards, such as micro UDF or ISO 9660. The data recording area 28 is physically divided into a plurality of sectors as described earlier. These physical sectors are assigned serial numbers. In the following explanation, a logical address means a logical sector number (LSN) as determined in micro UDF or ISO 9660. Like a physical sector, a logical sector contains 2048 bytes. The numbers (LSN) of logical sectors are assigned consecutively in ascending order as the physical sector number increments.

Figures 15, 16, 17:
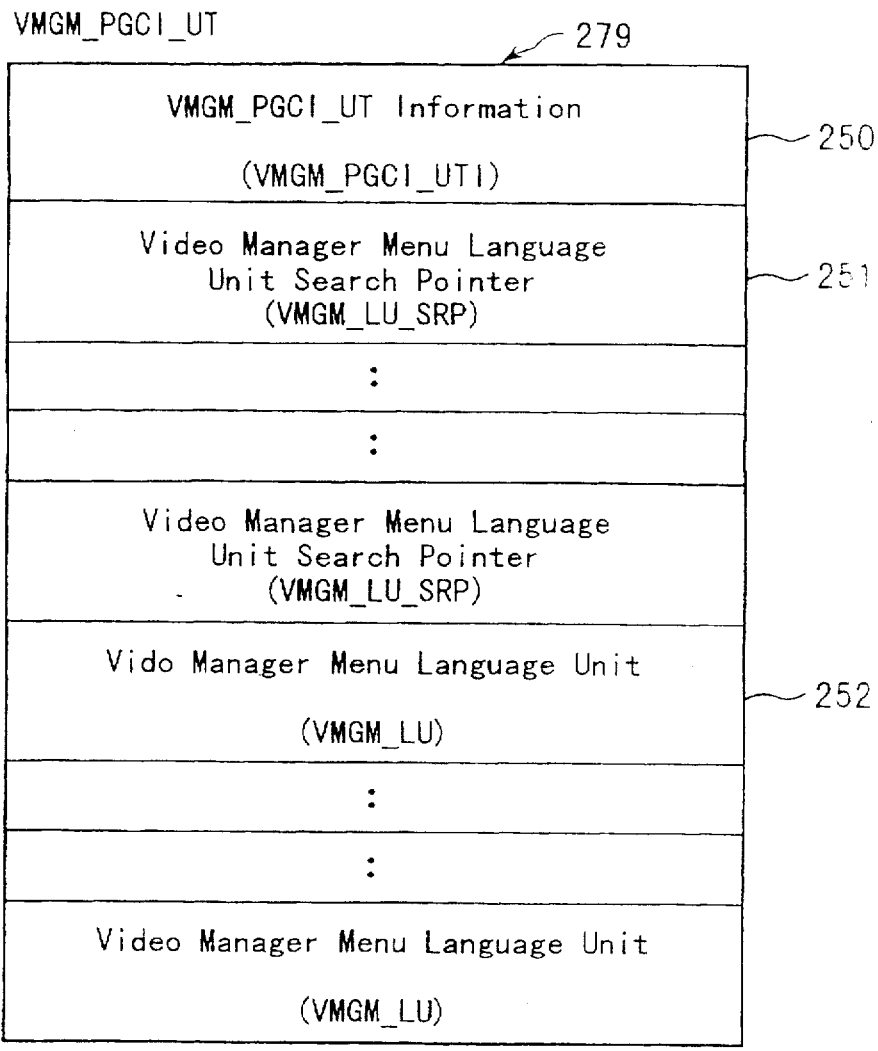
FIG. 15 shows the structure of a video manager menu PGCI unit table (VMGM_PGCI_UT) shown in FIG. 8.
FIG. 16 shows the contents and parameters of the VMGM_PGCI unit table information shown in FIG. 15.
FIG. 17 shows the contents and parameters of video manager menu language unit search pointer shown in FIG. 15.

As shown in FIG. 15, the volume and file structure is a hierarchic structure and contains a volume and file structure area 270, a video manager (VMG) 271, at least one video title set (VTS) 272, and other recorded areas 273. These areas are partitioned at the boundaries between logical sectors. As with a conventional CD, a logical sector is defined as a set of 2048 bytes. Similarly, a logical block is defined as a set of 2048 bytes. Therefore, a single logical sector is defined as a single logical block.

The file structure area 270 corresponds to a management area determined in micro UDF or ISO 9660. According to the description in the management area, the video manager 271 is stored in the system ROM/RAM section 52. As explained with reference to FIG. 8, the information used to manage video title sets is written in the video manager 271, which is composed of a plurality of files 274, starting with file #0. In each video title set (VTS) 272, compressed video data, compressed audio data, compressed sub-picture data, and the playback information about these data items are stored as explained later. Each video title set is composed of a plurality of files 274. The number of video title sets 272 is limited to 99 maximum. Furthermore, the number of files 274 (from File #j to File #j+9) constituting each video title set is determined to be 10 maximum. These files are also partitioned at the boundaries between logical sectors.

In the other recorded areas 273, the information capable of using the aforementioned video title sets 272 is recorded. The other recorded areas 273 are not necessarily provided.

In the karaoke optical disk 10, karaoke incorporating a moving picture, (that is, video, audio and sub-picture data, and containing lyric lines displayed as a sub-picture together with the accompaniment) are stored in video title sets 272 as video object sets 282 to be reproduced, as will be explained later. Therefore, in the case of karaoke, title sets 272 can be provided as the video title sets 272 classified by generations, by singers, or by genres. The relation between the classification of karaoke and the format is explained later in detail.

Figure 8:
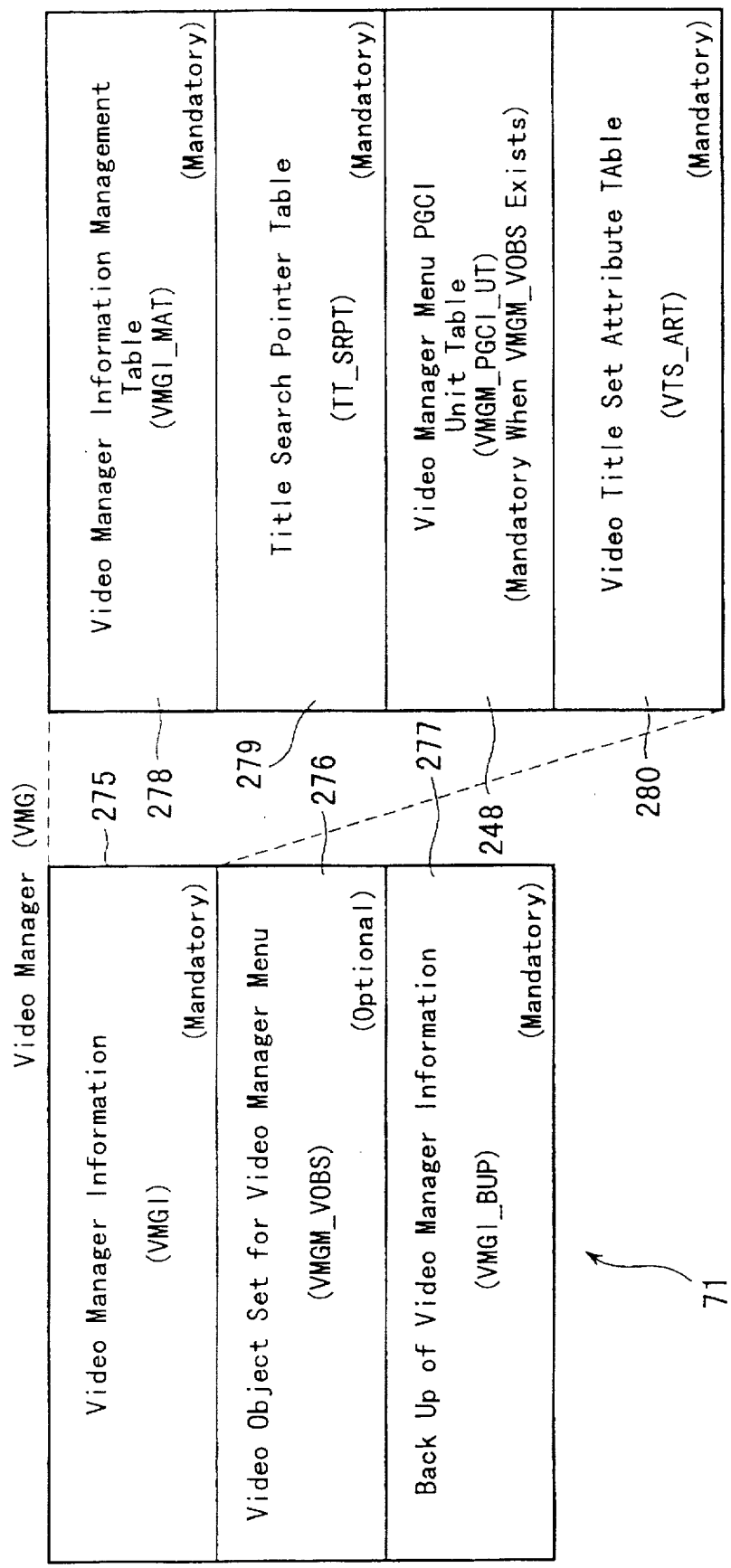
FIG. 8 shows the structure of the video manager of FIG. 7.

As shown in FIG. 8, the video manager 271 contains at least three items each corresponding to individual files 274. Specifically, the video manager 271 is made up of video manager information (VMGI) 275, a video object set (VMGM_VOBS) 276 for video manager menu, and backup (VMGI_BUP) 277 of video manager information. Here, the volume manager information (VMGI) 275 and the backup (VMGI_BUP) 277 of video manager information are indispensable items, and the video object set (VMGM_VOBS) 276 for video manager menu is an optional item. Stored in the video object set (VMGM_VOBS) 276 for VMGM are the video data, audio data, and sub-picture data for a menu of the volumes of the optical disk managed by the video manager 271.

Like video reproduction which will be explained later, the volume name of the optical disk and the explanation of audio and sub-picture accompanied by the display of the volume name are displayed by the video object set (VMGM_VOBS) 276 for VMGM and selectable items are displayed by the sub-picture. For example, information indicating that the optical disk contains karaoke data relating to collections of hit songs of a certain generation (e.g.) the volume names of collections of pops hit songs in the 1960's and images of the singers who produced hit songs in the 1960's) are reproduced using video data within the video object set (VMGM_VOBS) 276 for VMGM. Furthermore an introduction of the hit song is reproduced with audio, and the name of the hit song is displayed by the sub-picture. Still further, the names of the singers who produced hit songs in the 1960's are displayed as selectable items and an inquiry about selection of one of the singers is made.

Here, the structure of a video object set (VOBS) 82 will be described with reference to FIG. 9. FIG. 9 shows an example of a video object set (VOBS) 82. The video object set (VOBS) 282 comes in three types 276, 295, 296 for two menus and a title. Specifically, in the video object set (VOBS) 282, a video title set (VTS) 272 contains a video object set (VTSM_VOBS) 295 for a menu of video title sets and a video object set (VTSTT_VOBS) 296 for the titles of at least one video title set, as explained later. Each video object 282 set has the same structure except that their uses differ.

As shown in FIG. 9, a video object set (VOBS) 282 is defined as a set of one or more video objects (VOB). The video objects 283 in a video object set (VOBS) 282 are used for the same application. A video object set (VOBS) 282 for menus is usually made up of a single video object (VOB) 283 and stores the data used to display a plurality of menu screens. In contrast, a video object set (VTSTT_VOBS) 282 for title sets is usually composed of a plurality of video objects (VOB) 283.

The video object (VOB) 283 corresponds to video data of a collection of hit songs of a certain singer in a case wherein karaoke data in the collection of the hit songs in the 1960's is taken as an example. Further, menu data of the titles of the songs of the singer is stored in the menu video object set (VTSM_VOBS) 295 of the video title set 272 and the specific title of the song can be specified according to the display of the menu.

An identification number (IDN#j) is assigned to a video object (VOB) 283. By the identification number, the video object (VOB) 283 can be identified. A single video object (VOB) 283 is made up of one or more cells 284. Although a usual video stream is made up of a plurality of cells, a menu video stream or a video object (VOB) 283 may be composed of one cell 284. A cell is likewise assigned an identification number (C_IDN#j). By the identification number (C_IDN#j), the cell 284 is identified.

As shown in FIG. 9, each cell 284 is composed of one or more video object units (VOBU) 285, normally a plurality of video object units (VOBU) 285. Here, a video object unit (VOBU) 285 is defined as a pack train having a single navigation pack (NV pack) 286 at its head. Specifically, a video object unit (VOBU) 285 is defined as a set of all the packs recorded, starting at a navigation pack 286 to immediately in front of the next navigation pack. The playback time of the video object unit (VOBU) corresponds to the playback time of the video data made up of one or more GOPs contained in the video object unit (VOBU). The playback time is determined to be 0.4 or more second and less than one second. In the MPEG standard, a single GOP is determined to be normally 0.5 second long and be compressed screen data for reproducing about 15 screens during that duration.

When a video object unit includes Karaoke video data as shown in FIG. 9, more than one GOP composed of video packs (V packs) 288, a sub-picture pack (SP pack) 290 and an audio pack (A pack) 291, all determined in the MPEG standard, are arranged to produce a video data stream. Regardless of the number of GOPs, a video object unit (VOBU) 283 is determined on the basis of the playback time of a GOP. The video object always has a navigation pack (NV pack) 286 at its head. Even when the playback data consists only of audio and/or sub-picture data, it will be constructed using the video object unit as a unit. Specifically, even if a video object unit VOBU is constructed only of audio packs, the audio packs to be reproduced within the playback time of the video object unit to which the audio data belongs will be stored in the video object unit, as with the video object of video data.

The video manager 271 will be explained with reference to FIG. 8. The video management information 275 placed at the head of the video manager 271 contains information on the video manager itself, the information used to search for titles, the information used to reproduce the video manager menu, and the information used to manage the video title sets (VTS) 272 such as the attribute information on video titles. The video management information contains four tables 278, 279, 280, 281 in the order shown in FIG. 8. Each of these tables 278, 279, 280 is aligned with the boundaries between logical sectors. A first table, a volume manger information management table (VMGI_MAT) 278, is a mandatory table, recording the size of the video manager 271, the start address of each piece of the information in the video manger 271, and the start address of and the attribute information about the video object set (VMGM_VOBS) 276 for a video manager menu. The attribute information includes the video attribute information, the audio attribute information and the sub-picture attribute information. According to these pieces of attribute information, the modes of the decoders 58, 60, 62 are changed, thereby enabling the video object set (VMGM_VOBS) 276 to be reproduced in a suitable mode.

Further, a start address of the video title set contained in the volume of the optical disk 10 which can be selected according to the entry of a title number from the key operating and displaying section 4 of the apparatus is described in the title search pointer table (TT_SRPT) 279, is the second table of the video manager 271. The video manager menu PGCI unit table (VMGM_PGCI_UT) 248, which is the third table of the video manager 271, is provided as a mandatory item when the video object (VMGM_VOB) 276 for video manager menu is present. In the video object (VMGM_VOB) 276 for video manager menu, program chains corresponding to various languages are provided and information relating to the program chains for menu corresponding to the respective languages is described.

In a fourth table of the video manager 271, a video title set attribute table (VTS_ATRT) 280, the attribute information determined in the video title set (VTS) 272 in the volumes of the optical disk is written. Specifically, in this table, the following items are written as attribute information: the number of video title sets (VTS) 272, video title set (VTS) 272 numbers, video attributes such as a video data compression scheme, audio stream attributes such as an audio coding mode, and sub-picture attributes such as the type of sub-picture display.

The details of the contents of the volume management information management table (VMGI_MAT) 278, video manager menu PGCI unit table (VMGM_PGCI_UT) 248, title search pointer table (TT_SRPT) 279, and video title set attribute table (VTS_ATRT) 280 will be described with reference to FIGS. 10 to 32.

As shown in FIG. 10, written in the volume management information management table (VMGI_MAT) 278 are an identifier (VMG ID) for the video manager 271, the size of video management information (VMGI_SZ) in the number of logical blocks (a single logical block contains 2048 bytes, as explained earlier), the version number (VERN) related to the standard for the optical disk commonly known as a digital versatile disk (digital multipurpose disk, hereinafter, referred to as a DVD), and the category (VMG_CAT) of the video manger 271.

In the category (VMG_CAT) of the video manager 271, a flag indicating whether or not the DVD video directory inhibits copying is written. Further written in the table (VMGI_MAT) 278 are a volume set identifier (VLMS_ID), the number of video title sets (VTS_Ns), the identifier for a provider supplying the data to be recorded on the disk (PVR_ID), the start address (VMGM_VOBS_SA) of the video object set (VMGM_VOBS) 276 for a video manager menu, the end address (VMGI_MAT_EA) of a volume manager information management table (VMGI_MAT) 278, and the start address (TT_SRPT_SA) of a title search pointer table (TT_SRPT) 279. If the video object set (VMGM_VOBS) 295 for the VMG menu is absent, "00000000h" will be written in its start address (VMGM_VOBS_SA). The end address (VMGI_MAT_EA) of VMGI_MAT 278 and the start address (TT_SRPT_SA) of TT_SRPT 279 are represented by the number of logical blocks, relative to the first logical block.

Furthermore, in the table 278, the start address (VMGM_PGCI_UT_SA) of the video manager menu PGCI unit table (VMGM_PGCI_UT) 248 and the start address (VTS_ATRT_SA) of the attribute table (VTS_ATRT) of video title sets 272 (VTS) are represented by a number of bytes relative to the first byte in the VMGI manager table (VMGI_MAT) 71. The video attribute (VMGM_V_ATR) of the video manager menu (VMGM) video object set 276 is written in the table 278 as well. Further written in the table 278 are the number (VMGM_AST_Ns) of audio streams in the video manager menu (VMGM), the attributes (VMGM_AST_ATR) of audio streams in the video manager menu (VMGM), the number (VMGM_SPST_Ns) of sub-picture streams in the video manager menu (VMGM), and the attributes (VMGM_SPST_ATR) of sub-picture streams in the video manager menu (VMGM). If the video manager menu (VMGM) is absent, "0000000h" will be written in the video manager menu PGI unit table (VMGM_PGCI_UT).

Figures 11, 12, 13:
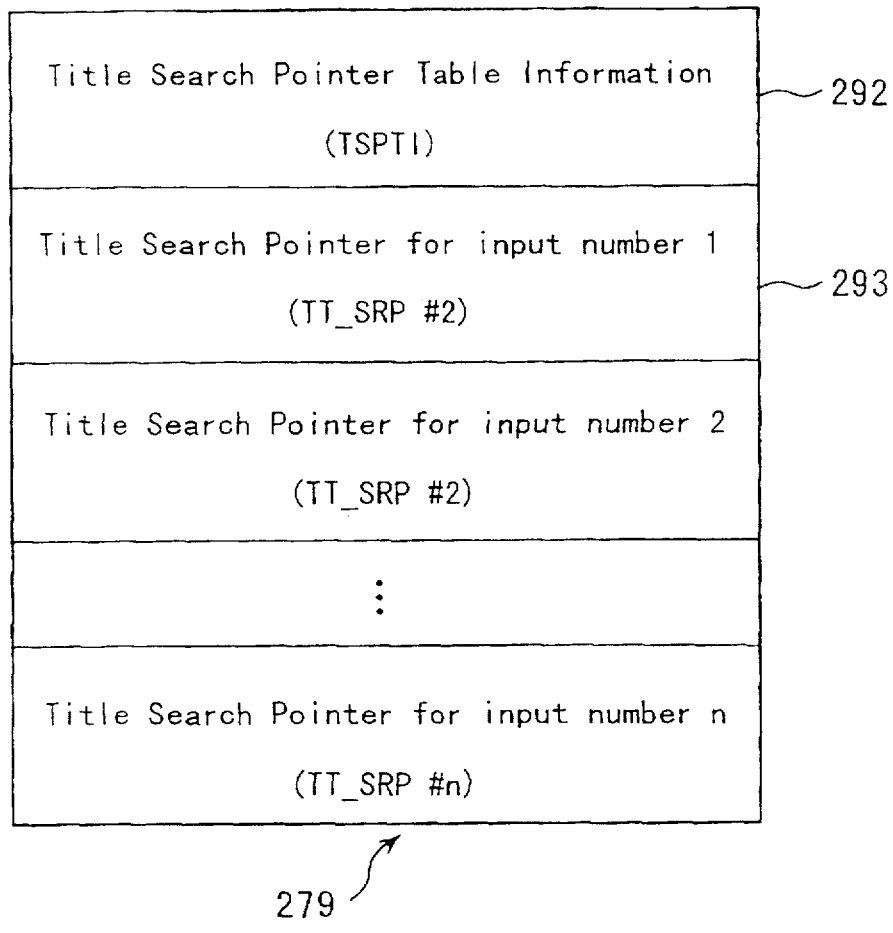
FIG. 11 shows the structure of the title search pointer table (TT_SRPT) in the video manger information (VMGI) of FIG. 8.
FIG. 12 shows the parameters for title search pointer table information (TT_SRPT1) in the title search pointer table (TT_SRPT) of FIG. 11.
FIG. 13 shows the parameters for the title search pointers (TT_SRP) corresponding to the entry numbers of the title search pointer table (TT_SRPT) of FIG. 11 and the description thereof.

Explanation of the structure shown in FIG. 8 will be resumed. As shown in FIG. 11, in the title search pointer table (TT_SRPT) 279 of FIG. 8, as shown in FIG. 11, the title search pointer table information (TSPTI) is first written and then a necessary number of title search pointers (TT_SRP) for input numbers 1 to n (n< or =99) are written consecutively. When only the playback data for a single title is stored in a volume of the optical disk (for example, only the video data for a single title), only a single title search pointer (TT_SRP) 293 is written in the table (TT_SRPT) 279.

The title search pointer table information (TSPTI) 292 contains the number of entry program chains (EN_PGC_Ns) and the end address (TT_SRPT_EA) of the title search pointer (TT_SRP) 293, as shown in FIG. 12. The address (TT_SRPT_EA) is represented by the number of bytes, relative to the first byte in the title search pointer table (TT_SRPT) 279. Furthermore, as shown in FIG. 13, each title search pointer (TT_SRP) contains the video title set number (VTSN), the program chain number (PGCN), and the start address (VTS_SA) of the video title set 272.

The contents of the title search pointer (TT_SRP) 293 specifies a video title set (VTS) 272 to be reproduced and a program chain (PGC), as well as a location in which the video title set 272 is to be stored. The start address (VTS_SA) of the video title set 272 is represented by the number of logical blocks in connection with the title set specified by the video title set number (VTSN).

Figure 14:
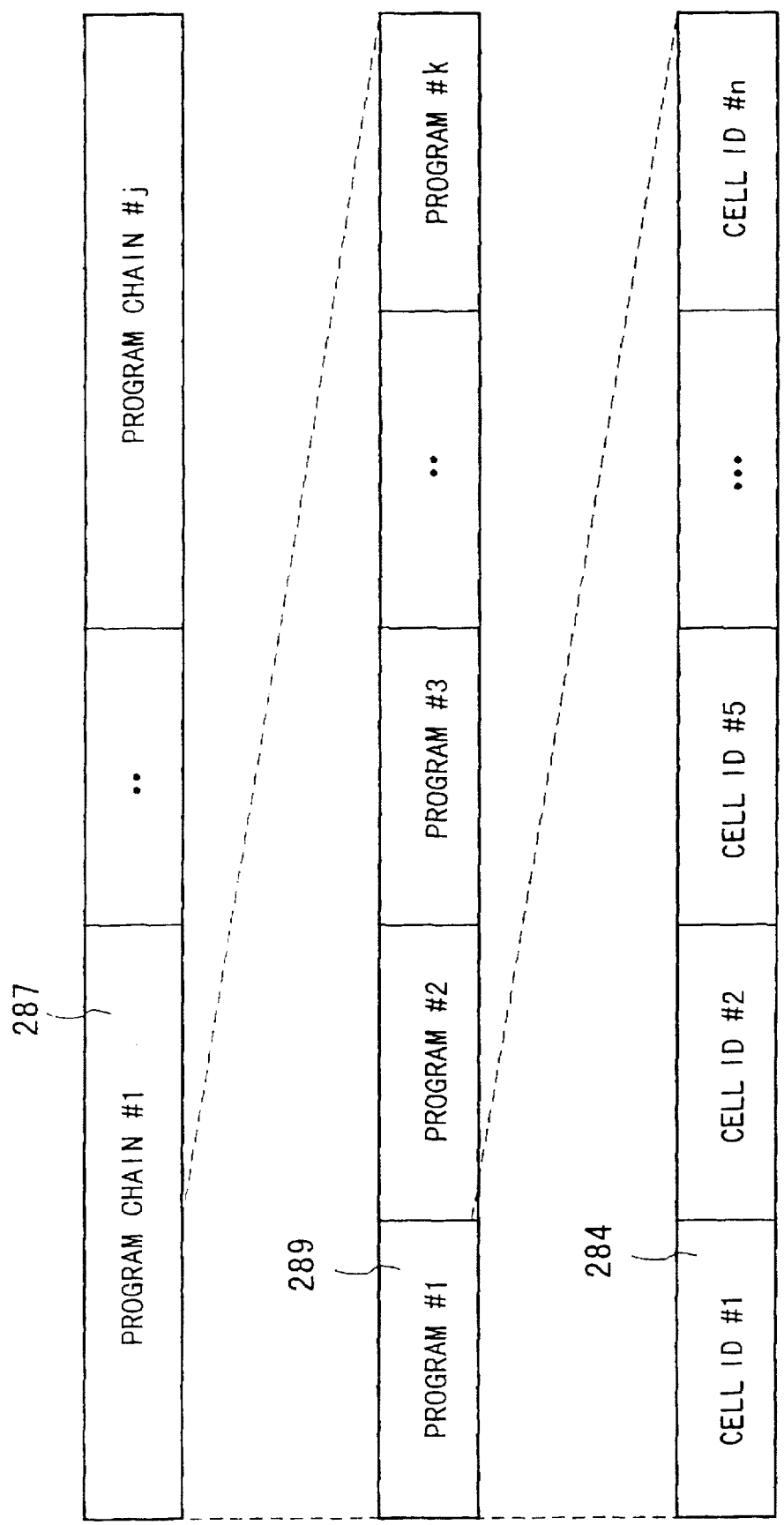
FIG. 14 is an explanatory diagram to help explain the structure of a program chain stored in a file.

Here, a program chain 287 is defined as a set of programs 289 that reproduce the story of a title, as shown in FIG. 14. In the case of a program chain for a menu, still picture programs or moving picture programs are reproduced one after another to complete a menu for a single title. In the case of a program chain for a title set, a program chain corresponds to a chapter in a story consisting of programs and the movie of a single title is completed by reproducing program chains consecutively. As shown in FIG. 14, each program 289 is defined as a set of aforementioned cells 284 arranged in the order in which they are to be reproduced. In the case of karaoke, if the title set 272 is a collection of hit songs in the 1960's, the program chain 287 is a set of titles of songs of a certain singer in the 1960's, that is, a collection of the programs 289 like the case of the video object 283. Therefore, a collection of hit songs in the 1960's can be specified by specifying the title set 272, a collection of karaoke songs of a certain singer in the 1960's can be specified by specifying the program chain 287, and the title of a concrete song can be specified by specifying the program 289.

In the video manager menu PGCI unit table (VMGM_PGCI_UT) 280 shown in FIG. 8, video manager menu PGCI unit table information (VMGM_PGCI_UTI) 250 is first described as shown in FIG. 15, then video manager menu language unit search pointers (VMGM_LU_SRP) 251 of a necessary number n corresponding to the number n of languages are successively described, and the video manager menu language unit (VMGM_LU) 252 searched for by the search pointer is described. In this case, it is supposed that the menu defined by the video manager menu language unit (VMGM_LU) must contain only one PGC.

Figures 18, 19, 20:
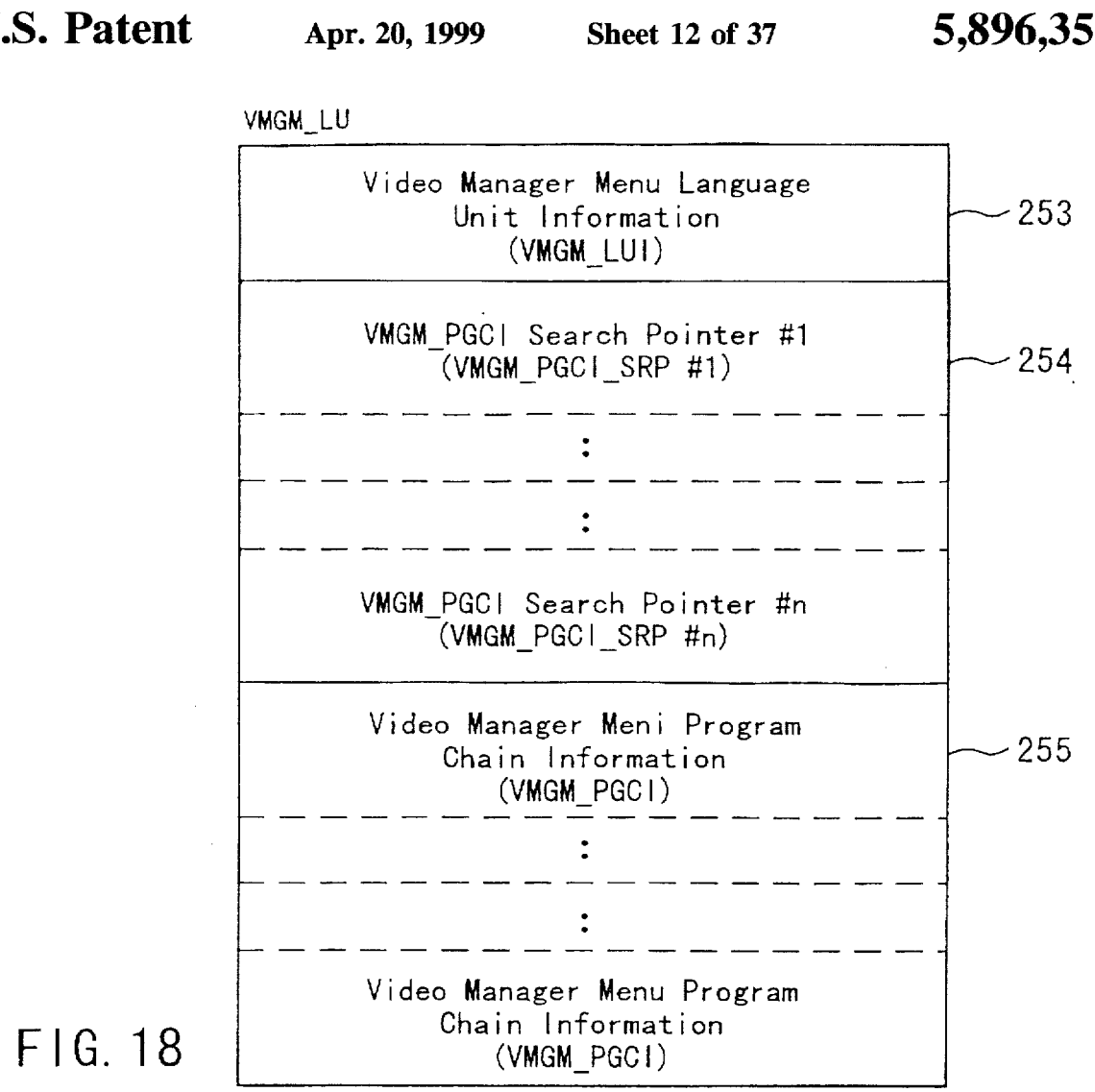
FIG. 18 shows the structure of a video manager menu language unit shown in FIG. 15.
FIG. 19 shows the contents and parameters of video manager menu language unit information shown in FIG. 18.
FIG. 20 shows the contents and parameters of video manager menu program chain information shown in FIG. 18.

In the video manager menu PGCI unit table information (VMGM_PGCI_UTI) 250, the number (VMGM_LU_Ns) of VMGM language units (VMGM_LU) and the end address (VMGM_PGCI_UT_EA) of the VMGM_PGCI unit table (VMGM_PGCI_UT) 280 are described as shown in FIG. 16. In each of n video manager menu language unit search pointers (VMGM_LU_SRP) 251 prepared for respective languages, the language code (VMGM_LCD) of the video manager menu and the start address (VMGM_LU_SA) of the language unit (VMGM_LU) of the video manager menu (VMGM) are described as shown in FIG. 18. The end address (VMGM_PGCI_UT_EA) of the VMGM_PGCI_UT 280 and the start address (VMGM_LU_SA) of the VMGM_LU 252 are described by use of the logical block number from the head byte of the VMGM_PGCI unit table (VMGM_PGCI_UT) 280.

In each of n VMGM language units (VMGM_LU) 252 prepared for the respective languages, the video manager menu language unit information (VMGM_LUI) 253 and VMGM_PGCI search pointers (VMGM_PGCI_SRP) of a number corresponding to the number of menu program chains are provided as shown in FIG. 17, and VMGM_PGC information items (VMGM_PGCI) 255 searched for by the search pointer and corresponding in number to the program chains for menu are provided.

In each language unit information (VMGM_LUI) 253, the number (VMGM_PGCI_Ns) of VMGM_PGCIs and the end address (VMGM_LUI_EA) of the language unit information (VMGM_LUI) are described as shown in FIG. 19. Further, in each VMGM_PGCI search pointer (VMGM_PGCI_SRP), the VMGM_PGC category (VMGM_PGC_CAT) and the start address (VMGM_PGCI_SA) of VMGM_PGCI are described as shown in FIG. 20. The end address (VMGM_LUI_EA) of VMGM_LUI and the start address (VMGM_PGCI_SA) of VMGM_PGCI are described by use of the relative logical block number from the head byte of VMGMLU. As the VMGM_PGC category (VMGM_PGC_CAT), information indicating that the program chain is an entry program chain or title menu is described.

Figures 21, 22, 23, 24:
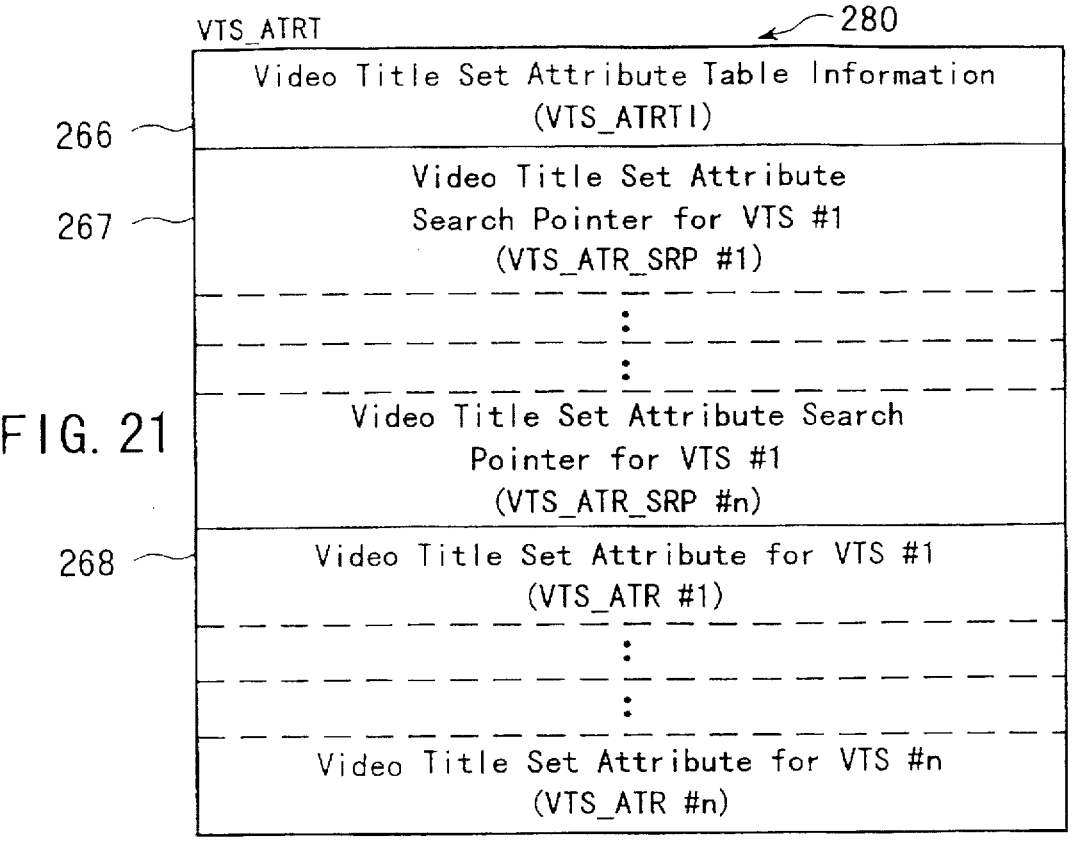
FIG. 21 shows the structure of a video title set attribute table shown in FIG. 8.
FIG. 22 shows the contents and parameters of video title set attribute table information shown in FIG. 21.
FIG. 23 shows the contents and parameters of video title set attribute search pointer shown in FIG. 21.
FIG. 24 shows the contents and parameters of video title set attribute shown in FIG. 21.

As shown in FIG. 21, the video title set attribute table (VTS_ATRT) 280 describing the attribute information on the video title set (VTS) 272 contains video title set attribute table information (VTS_ATRTI) 266, n video title set attribute search pointers (VTS_ATR_SRP) 267, and n video title set attributes (VTS_ARTR) 268, which are arranged in that order. The video title set attribute table information (VTS_ATRTI) 266 contains information on the table 280. In the video title set attribute search pointers (VTS_ATR_SRP) 267, description is made in the order corresponding to the title sets #1 to #n and similarly description is made of the pointers for searching for the video title set attributes (VTS_ATR) 268 written in the order corresponding to the title sets #1 to #n. In each of the video title set attributes (VTS_ATR) 268, the attribute of the corresponding title set (VTS) is written.

More specifically, the video title set attribute table information (VTS_ATRTI) 266 contains a parameter (VTS_Ns) for the number of video titles and a parameter (VTS_ATRT_EA) for the end address of the video title set attribute table (VTS_ART) 280 as shown in FIG. 22. As shown in FIG. 23, in each video title set attribute search pointer (VTS_ATR_SRP) 267, a parameter (VTS_ATR_SA) for the start address of the corresponding video title set attribute (VTS_ATR) 268 is written. As shown in FIG. 24, the video title set attribute (VTS_ATR) 268 contains a parameter (VTS_ATR_EA) for the end address of the video title set attribute (VTS_ATR) 268, a parameter (VTS_CAT) for the category of the corresponding video title set, and a parameter (VTS ATRI) for attribute information on the corresponding video title set. Because the attribute information on the video title set contains the same contents of the attribute information on the video title set written in the video title set information management table (VTS_MAT), which will be explained later with reference to FIGS. 23 and 24, explanation of it will be omitted.

Now, the structure of the logic format of the video title set (VTS) 272 shown in FIG. 7 will be explained with reference to FIG. 25. In each video title set (VTS) 272, four items 294, 295, 296, 297 are written in the order shown in FIG. 25. Each video title set (VTS) 272 is made up of one or more video titles having common attributes. The video title set information (VTSI) contains the management information on the video titles 272, including information on playback of the video object set 296, information on playback of the title set menu (VTSM), and attribute information on the video object sets 272.

Each video title set (VTS) 272 includes the backup 297 of the video title set information (VTSI) 294. Between the video title set information (VTSI) 294 and the backup (VTSI_BUP) of the information, a video object set (VTSM_VOBS) 295 for video title set menus and a video object set (VTSTT_VOBS) 296 for video title set titles are arranged. Both of the video object sets (VTSM_VOBS and VTSTT_VOBS) have the structure shown in FIG. 17, as explained earlier.

The video title set information (VTSI) 294, the backup (VTSI_BUP) 297 of the information, and the video object set (VTSTT_VOBS) 296 for video title set titles are items indispensable to the video title sets 272. The video object set (VTSM_VOBS) 295 for video title set menus is an option provided as the need arises.

Figure 25:
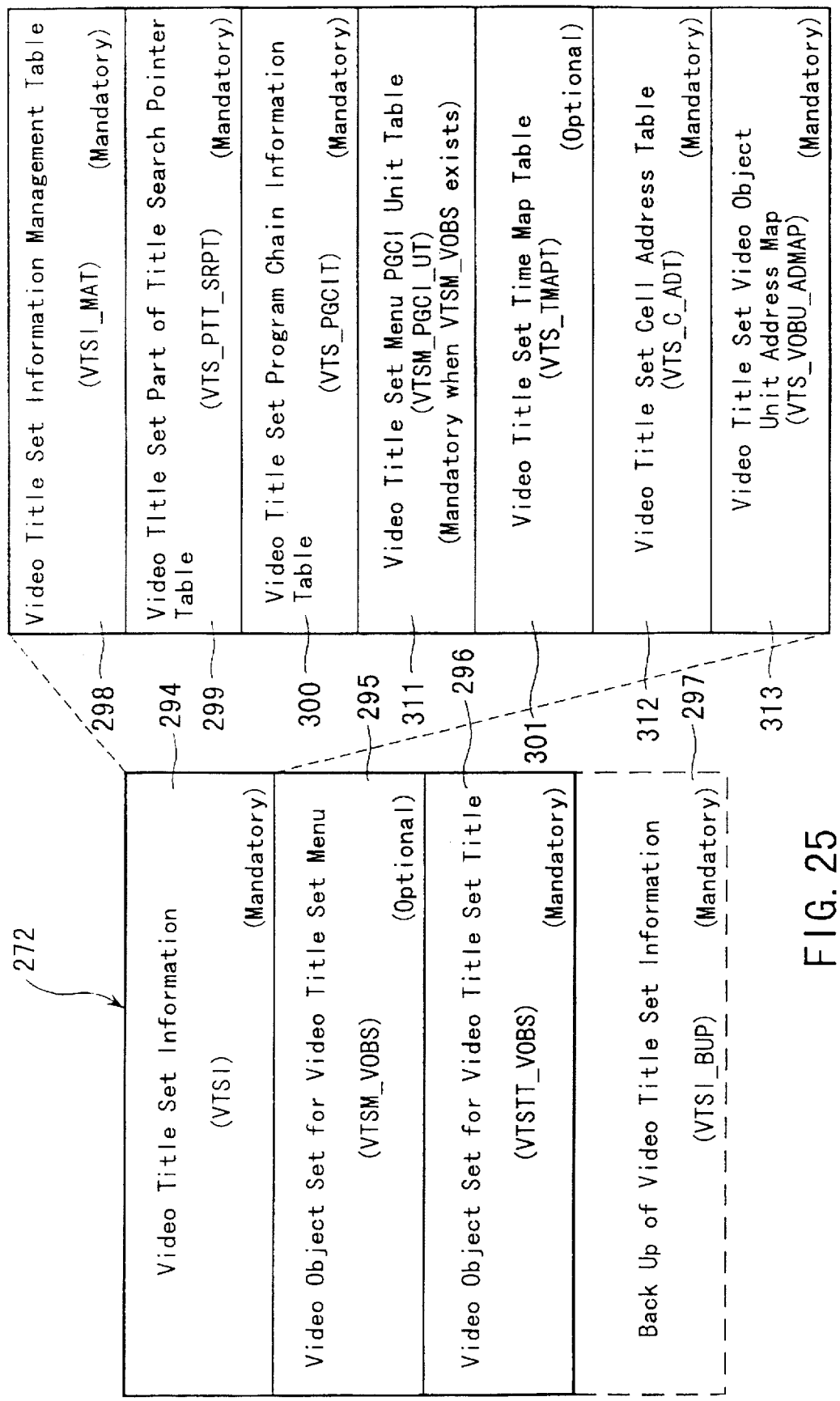
FIG. 25 shows the structure of the video title set shown in FIG. 7.

The video title set information (VTSI) 294 consists of seven tables 298, 299, 300, 301, 311, 312, 313 as shown in FIG. 25. These seven tables 298, 299, 300, 301, 311, 312, 313 are forced to align with the boundaries between logical sectors. The video title set information management table (VTSI_MAT) 298, a first table, is a mandatory table, in which the size of the video title set (VTS) 272, the start address of each piece of information in the video title set (VTS) 272, and the attributes of the video object sets (VOBS) 282 in the video title set (VTS) 272 are written.

The video title set part-of-title search pointer table (VTS_PTT_SRPT) 299, a second table, is mandatory table, in which part of the selectable video titles, that is, program chains (PGC) or programs (PG) contained in the selectable video title set 272, are written according to the number that the user has entered from the key/display section 4. Entering the desired one of the entry numbers listed in the pamphlet coming with the optical disk 10 from the key/display section 4, the user can watch the video, starting with the section in the story corresponding to the entered number. The part of the selectable video title can be arbitrarily determined by title suppliers.

The video title set program chain information table (VTS_PGCIT) 300, a third table, is a mandatory table, in which the VTS program chain information (VTS_PGCI), or information on VTS program chains, is written.

The video title set menu PGCI unit table (VTSM_PGCI_UT) 311, a fourth table, is a mandatory item, when the video object set (VTSM_VOBS) 295 for video title set menus is provided. In the table, information on program chains for reproducing the video title set menu (VTSM) provided for each language is written. By referring to the video title set menu PGCI unit table (VTSM_PGCI_UT) 311, a program chain for the specified language in the video object set (VTSM_VOBS) 295 can be acquired and reproduced as a menu.

The video title set time search map table (VTS_MAPT) 301, a fifth table, is an optional table provided as the need arises, in which information on the recording location of the video data in each program chain (PGC) in the title set 272 to which the map table (VTS_MAPT) 301 belongs is written for a specific period of time of playback display.

The video title set cell address table (VTS_C_ADT) 312, a sixth table, is a mandatory item, in which the address of each cell 284 constituting all the video objects 283 or the address of each cell piece constituting cells is written in the order in which the identification numbers of the video objects are arranged. Here, a cell piece is a piece constituting a cell. Cells undergo an interleaving process in cell pieces and are arranged in a video object 283.

The video object title set video object unit address map (VTS_VOBU_ADMAP) 313, a seventh table, is a mandatory item, in which the start addresses of all the video object units 285 in the video title set are written in the order of arrangement.

Next, the video title information manager table (VTSI_MAT) 298 and video title set program chain information table (VTS_PGCIT) 300 shown in FIG. 25 and a video title set menu PGI unit table (VTSMPGCI_UT) will be described with reference to FIGS. 26 to 42.

FIG. 34 shows the contents of the video title information manager table (VTSI_MAT) 298, in which the video title set identifier (VTS_ID), the size (VTS_SZ) of the video title set 272, the version number (VERN) of the DVD video specification, the category (VTS_CAT) of the video title set 272, and the end address (VTSI_MAT_EA) of the video title information manager table (VTSI_MAT) 298 are written in that order. In the category (VIS_CAT) of the video title set 272, the application field of the video title set 272 is written. If the application field is Karaoke, data to that effect will be written in the category.

Furthermore, in the table (VTSI_MAT) 298, the start address (VTSM_VOBS_SA) of the video object set part-of-title search pointer table (VTSM_VOBS) 295 for the VTS menu (VTSM) and the start address (VTSTT_VOB_SA) of the video object for the title in the video title set (VTS) are written. If the video object set (VTSM_BOBS) 295 for the VTS menu (VTSM) is absent, "00000000h" will be written in the start address (VTSM_VOBS_SA). The end address (VTSI_MAT_EA) of VTSI_MAT is expressed by the number of logical blocks, relative to the first byte in the video title set information management table (VTI_MAT) 294. The start address (VTSM_VOBS_SA) of VTSM_VOBS and the start address (VTSTT_VOB_SA) of VTSTT_VOB are expressed by logical blocks (RLBN) relative to the first logical block in the video title set (VTS) 272.

Furthermore, in the table (VTSI_MAT) 298, the start address (VTS_PTT_SRPT_SA) of the video title set information part-of-title search pointer table (VTS_PTT_SRPT) 299 is represented by the number of blocks, relative to the first byte in the video title set information (VTSI) 294. Furthermore, in the table (VTSI_MAT) 298, the start address (VTS_PGCIT_SA) of the video title set program chain information table (VTS_PGCIT) 300 and the start address (VTS_PGCI_UT_SA) of the PGCI unit table (VTS_PGCI_UT) 311 of video title set menus are represented by the number of blocks, relative to the first byte in the video title set information (VTSI) 294, and the start address (VTS_MAPT_SA) of the time search map table (VTS_MAPT) 301 in the video title set (VTS) is represented by sectors, relative to the first logical sector in8 the video title set (VTS) 272. Similarly, the VTS address table (VTS_C_ADT) 312 and the address map (VTS_VOBU_ADMAP) 313 for VTS_VOBU are written in logical sectors, relative to the first logical sector in the video title set (VTS) 272.

Written in the table (VTSI_MAT) 298 are the video attribute (VTSM_V_ATR) of the video object set (VTSM_VOBS) 295 for the video title set menu (VTSM) in the video title set (VTS) 272, the number of audio streams (VTSM_AST_Ns), the attributes (VTSM_AST_ATR) of the audio streams, the number of sub-picture streams (VTSM_SPST_Ns), and the attributes (VTSM_SPST_ATR) of the sub-picture streams. Similarly, further written in the table (VTSI_MAT) 298 are the video attribute (VTS_V_ATR) of the video object set (VTSM_VOBS) 296 for the video title (VTSTT) for the video title (VTS) in the video title set (VTS) 272, the number of audio streams (VTS_AST_Ns), the attributes (VTS_AST_ATR) of the audio streams, the number of sub-picture streams (VTS_SPST_Ns), and the attributes (VTS_SPST_ATR) of the sub-picture streams. Additionally, the attribute (VTS_MU_AST_ATR) of the multichannel audio stream in the video title set (VTS) is written in the table (VTSI_MAT) 298.

A maximum of eight streams are prepared for the audio stream, and a maximum of 32 streams are prepared for the sub-picture stream. The attribute for each stream is described. In the sub-picture stream attribute (VTS_SPST_ATR), information indicating that the type of the sub-picture is a language or not is described. If the category (VTS_CAT) of the video title set 272 is karaoke, streams of lyric lines of various languages such as English, Japanese or other language can be prepared as the sub-picture stream. Generally, if the category (VTS_CAT) is karaoke, information indicating that the type of the sub-picture is a language is described in the sub-picture stream attribute (VTS_SPST_ATR).

Next, the audio stream attribute is explained with reference to FIG. 35. In the audio stream attribute (VTSM_AST_ATR) of the video object set (VTSM_VOBS) 295 for VTSM and the audio stream attribute (VTS_AST_ATR) of the video object set (VTST_VOBS) 296 for the video title set title (VTSTT), almost the same attribute information as the audio stream attribute (VMGM_AST_ATR) of the video object (VMGM_VOBS) for the video manager menu is written. Specifically, in the attribute (VTSM_AST_ATR) of the audio stream in the VTS menu video object set (VTSM_VOBS) 295, as shown in FIG. 27, bit number b63 to bit number b48 are allocated to the audio coding mode, reservation, audio type, audio application ID, quantization, sampling frequency, reservation, and the number of audio channels, and bit number b47 to bit number b0 are left empty for reservation for later use. In the attribute (VTS_AST_ATR) for the audio stream for the video title set title (VTST), as shown in FIG. 35, bit number b63 to bit number b48 are allocated to the audio coding mode, expansion of multichannel, audio type, audio application ID, quantization, sampling frequency, reservation, and the number of audio channels, and bit number b47 to bit number b40 and bit number b39 to bit number b32 are allocated to specific codes; bit number b31 to bit number b24 are for reservation for specific codes; bit number b23 to bit number b8 are left empty for reservation for later use; and bit number b8 to b0 are allocated to application information. Here, if the VTS menu video object set (VTSM_VOBS) 295 is absent, or if no audio stream is present in the video object set, "0" will be written in each bit, starting at bit number b63 down to bit number b0.

In both of the attributes (VTSM_AST_ATR, VTS_AST_ATR) of the audio streams for VTSM and VTST, bit numbers b63, b62, b61 are allocated to the audio coding mode. When "000" is written for the audio coding mode, this means that the audio data has been coded according to Dolby AC-3 (a trademark of Dolby Laboratories Licensing Corporation). When "010" is written for the audio coding mode, this means that the audio data is compressed without any expanded bit stream under MPEG-1 or MPEG-2. When "011" is written for the audio coding mode, this means that the audio data is compressed with an expanded bit stream under MPEG-2. When "100" is written for the audio coding mode, this means that the audio data is coded by linear PCM. For the audio data, the other numbers are for reservation for later use.

At a frame rate (which is written in VTSM_V_ATR and VTS_V_ATR) at which a single frame is drawn at a horizontal frequency of 60 Hz using 525 scanning lines, in the video data attribute, Dolby AC-3 ("000" in bit numbers b63, b62, b61) or linear PCM ("100" in bit numbers b63, b62, b61) is to be set. At a frame rate (which is written in VTSM_V_ATR and VTS_V_ATR) at which a single frame is drawn at a horizontal frequency of 50 Hz using 625 scanning lines, in the video data attribute, MPEG-1 or MPEG-2 ("010" or "011" in bit numbers b63, b62, b61) or linear PCM ("100" in bit numbers b63, b62, b61) is to be set. In the audio coding mode of the VTST audio stream attribute (VTS_AST_ATR), expansion of multichannel is written in bit number b60. When bit number b60 contains "0", this means that the multichannel audio stream attribute (VTS_MU_AST_ATR) of VTS related to audio streams is invalid. When bit number b60 contains "1", this means linking to the multichannel audio stream attribute (VTS_MU_AST_ATR) of VTS related to audio streams.

The audio type is written in bit numbers b59 and b58. When the audio type is not specified, "00" will be written in these bit numbers. When a language, or speech, is specified, "01" will be written in these bit numbers. The other numbers are for reservation. The ID of an audio application field is written in bit numbers b57 and b56. When the ID is not specified, "00" will be written in these bit numbers; when karaoke is specified, "01" is written in these bit numbers; when surround is specified, "10" is written in these bit numbers; and the other numbers are for reservation.

The quantization of audio data is written in bit numbers b55 and b54. When bit numbers b55, b54 contain "00", this means the audio data quantized in 16 bits; when bit numbers b55, b54 contain "01", this means the audio data quantized in 20 bits; when bit numbers b55, b54 contain "10", this means the audio data quantized in 24 bits; and when bit numbers b55, b54 contain "11", this means that the quantization is not specified. Here, when the audio coding mode is set to linear PCM ("100" in bit numbers b63, b62, b61), no specification of quantization ("11" in bit numbers b55, b54) is written. The audio data sampling frequency Fs is written in bit numbers b53 and b52. When the sampling frequency Fs is 48 kHz, "00" is written in these bit numbers; when the sampling frequency Fs is 96 kHz, "01" is written in these bit numbers; and the other numbers are for reservation.

The number of audio channels is written in bit numbers b66 to b64. When bit numbers b50, b49, 48 contain "000", this means a single channel (monaural); when bit numbers b50, b49, 48 contain "001", this means two channels (stereo); when bit numbers b50, b49, 48 contain "010", this means three channels; when bit numbers b50, b49, 48 contain "011", this means four channels; when bit numbers b50, b49, 48 contain "100", this means five channels; when bit numbers b50, b49, 48 contain "101", this means six channels; when bit numbers b50, b49, 48 contain "110", this means seven channels; and when bit numbers b50, b49, 48 contain "111", this means eight channels.

Specific codes are to be written in b47 to b40 and b39 to b32. When the type of audio stream is language, or speech, the code for the language determined in ISO-639 is written in these bit locations in the form of a language symbol. When the type of audio stream is not language or speech, the locations are for reservation.

The number (VTS_AST_Ns) of VTS audio streams is set in the range of 0 to 8. Thus, eight VTS audio stream attributes (VTS_AST_ATR) are prepared in accordance with the number of streams that can be set. Specifically, areas for the VTS audio stream attributes (VTS_AST_Ns) of VTS audio stream #0 to VTS audio stream #7 are provided. When the number of VTS audio streams is less than 8 and some attributes have no corresponding audio streams, the VTS audio stream attributes (VTS_AST_Ns) corresponding to the absent audio streams shown in FIG. 27 have "0" in all bits.

The audio application field from the bit number b7 to the bit number b0 is used as a reservation area which is not particularly specified, but if "01" is described in the bit numbers b73 and b72 and it is clear that ID of the audio application field is karaoke, the number of channels is limited to a maximum number of five channels and the channel assignment mode is described. The channel assignment mode is different for respective coding modes (AC_3, MPEG-1, MPEG-2, linear PCM) described in the bit numbers b63, b62, b61 and the assignment is determined for each assignment mode. Further, in the audio application field, information indicating that it is an audio stream containing introduction by a master of ceremonies or not, or information indicating solo or duet is described.

In the attribute (VTS_MU_AST_ATR) of the multi-channel audio stream of the video title set (VTS), the attributes of multichannel audio stream #0 to multichannel audio stream #7 are written. In each multichannel audio stream attribute (VTS_MU_AST_ATR), the contents (e.g., karaoke or surround) of the audio channel, an audio mixing scheme, etc. are written.

Figure 28:
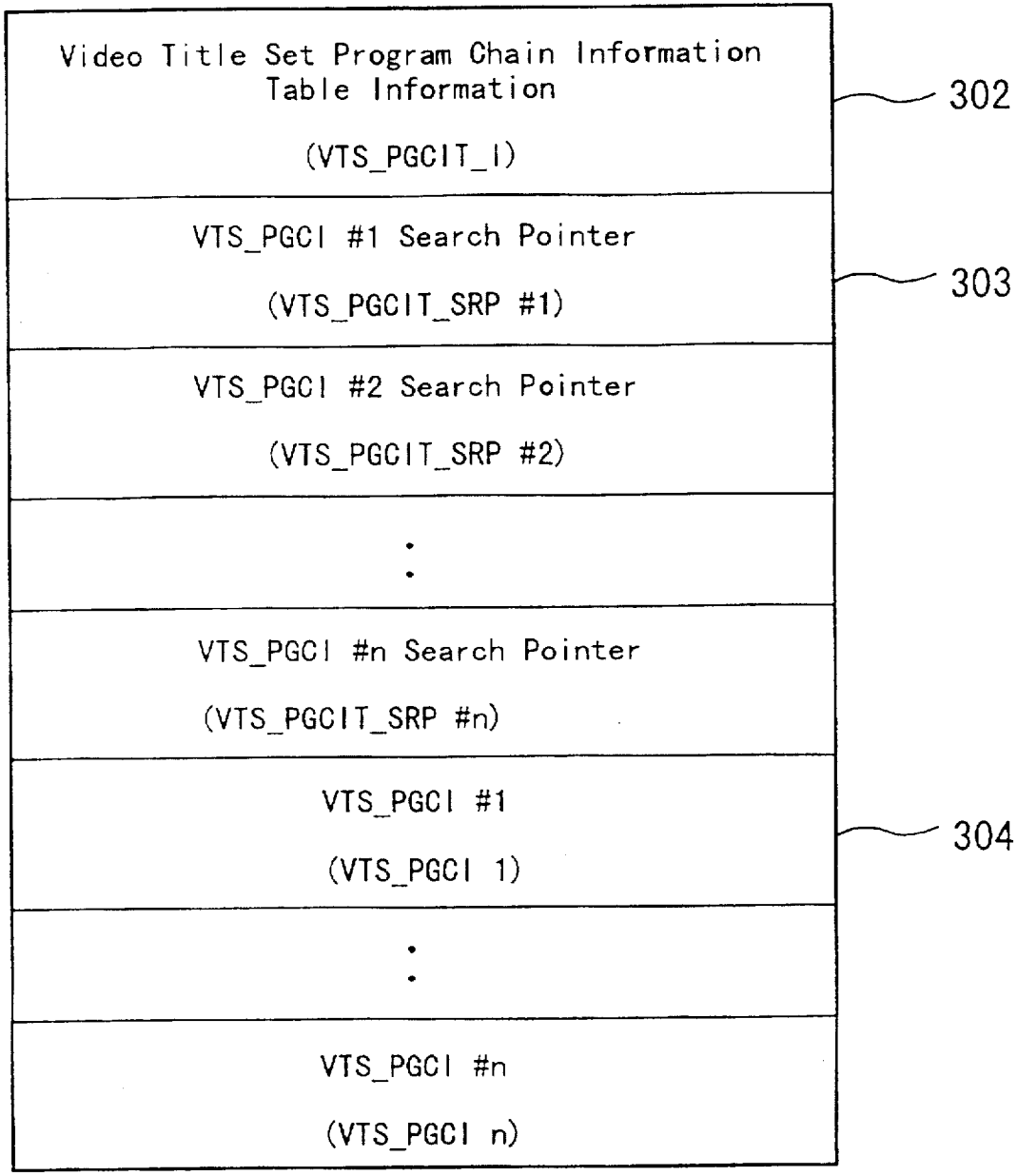
FIG. 28 shows the structure of the video title set program chain information table (VTS_PGCIT) of FIG. 25.

The VTS program chain information table (VTS_PGCIT) 300 of FIG. 25 has a structure as shown in FIG. 28. In the information table (VTS_PGCIT) 300, information (VTS-PGCIT) on the VTS program chains (VTS_PGC) is written, the first item of which is information (VTS_PGCIT_I) 302 on the information table (VTS_PGCIT) 300 of VTS program chains (VTS_PGC). In the information table (VTS_PGCIT) 300, the information (VTS_PGCIT_I) 302 is followed by as many VTS_PGCI search pointers (VTS_PGCIT_SRP) 303 used to search for VTS program chains (VTS_PGC) as the number (from #1 to #n) of VTS program chains in the information table (VTS_PGCIT) 300. At the end of the table, there are provided as many pieces of information (VTS_PGCI) 304 on the respective VTS program chains (VTS_PGC) as the number (from #1 to #n) of VTS program chains (VTS_PGC).

The information (VTS_PGCIT_I) 302 in the VTS program chain information table (VTS_PGCIT) 300, as shown in FIG. 31, contains the number (VTS_PGC_Ns) of VTS program chains (VTS_PGC) and the end address (VTS_PGCIT_EA) of the table information (VTS_PGCIT_I) 302 expressed by the number of bytes, relative to the first byte of the information table (VTS_PGCIT) 300.

Furthermore, as shown in FIG. 38, the VTS_PGCIT search pointer (VTS_PGCIT_SRP) 303 contains the category (VTS_PGC_CAT) of the program chains (VTS_PGC) in the video title set (VTS) 272 and the start address (VTS_PGCI_SA) of the VTS_PGC information (VTS_PGCI) expressed by the number of bytes, relative to the first byte of the VTS_PGC information table (VTS_PGCIT) 300. Here, the VTS_PGC category (VTS_PGC_CAT) contains, for example, data indicating whether an entry program chain (Entry PGC) is the first one to be reproduced or the type of the application field of program chains. Usually, an entry program chain (PGC) is written before program chains (PGC) that are not entry program chains (PGC). Additionally, Karaoke has been written as the type of the application field of the program claims.

The PGC information (VTS_PGCI) 304 in the video title set contains four items as shown in FIG. 31. In the PGC information (VTS_PGCI) 304, program chain general information (PGC_GI) 305, a mandatory item, is first arranged, followed by at least three items 306, 307, 308, that are made mandatory only when there is an video object. Specifically, contained as the three items in the PGC information (VTS_PGCI) 304 are a program chain program map (PGC_PGMAP) 306, a cell playback information table (C_PBIT) 307, and a cell position information table (C_POSIT) 308.

As shown in FIG. 32, the program chain general information (PGC_GI) 305 contains the category (PGCI CAT) of program chains (PGC), the contents (PGC_CNT) of program chains (PGC), and the playback time (PGC_PB_TIME) of program chains (PGC). Written in the category (PGCI_CAT) of PGC are whether the PGC can be copied or not and whether the programs in the PGC are played back continuously or at random and the type of the application field of program chains. If the application field of the program chains is Karaoke, data indicating Karaoke will be written as the type.

The contents (PGC_CNT) of PGC contain the description of the program chain structure, that is, the number of programs, the number of cells, etc. The playback time (PGC_PB_TIME) of PGC contains the total playback time of the programs in the PGC. The playback time is the time required to continuously play back the programs in the PGC, regardless of the playback procedure.

Furthermore, the program chain general information (PGC_GI) 305 contains PGC sub-picture stream control (PGC_SPST_CTL), PGC audio stream control (PGC_AST_CTL), and PGC sub-picture pallet (PGC_SP_PLT). The PGC sub-picture stream control (PGC_SPST_CTL) contains the number of sub-pictures usable in the PGC. The PGC audio stream control (PGC_AST_CTL) likewise contains the number of audio streams usable in the PGC. The PGC sub-picture pallet (PGC_SP_PLT) contains a set of a specific number of color pallets used in all of the sub-picture streams in the PGC.

Furthermore, the PGC general information (PGC_GI) 305 contains the start address (PGC_PGMAP_SA_SA) of the PGC program map (PGC_PGMAP_SA), the start address (C_PBIT_SA) of the cell playback information table (C_PBIT) 307 and the start address (C_POSIT_SA) of the cell position information table (C_POSIT) 308. Both of the start addresses (C_PBIT_SA and C_POSIT_SA) are represented by the number of logical blocks, relative to the first byte in the VTS_PGC information (VTS_PGCI).

The program chain program map (PGC_PGMAP) 306 is a map showing the arrangement of the programs in the PGC of FIG. 33. In the map (PGC_PGMAP) 306, the entry cell numbers (ECELLN), the start cell numbers of the individual programs, are written in ascending order as shown in FIGS. 34 and 35. In addition, program numbers are allocated, starting at 1, in the order in which the entry cell numbers are written. Consequently, the first entry number in the map (PGC_PGMAP) 306 must be #1.

The cell playback information table (C_PBIT) 307 defines the order in which the cells in the PGC are played back. In the cell playback information table (C_PBIT) 307, pieces of the cell playback information (C_PBIT) are written consecutively as shown in FIG. 35. Basically, cells are played back in the order of cell number. The cell playback information (C_PBIT) contains a cell category (C_CAT) as playback information (P_PBI) as shown in FIG. 36. Written in the cell category (C_CAT) are a cell block mode indicating whether the cell is one in the block and if it is, whether the cell is the first one, a cell block type indicating whether the cell is not part of the block or is one in an angle block, and an STC discontinuity flag indicating whether the system time clock (STC) must be set again. Here, a cell block is defined as a set of cells with a specific angle. The change of the angle is realized by changing the cell block. Taking baseball as example, the changing from an angle block of shooting scenes from the infield to an angle block of shooting scenes from the outfield corresponds to the change of the angle.

Further written in the cell category (C_CAT) are a cell playback mode indicating whether the contents of the cell are played back continuously or made still at one video object unit (VOBU) to another in the cell, and cell navigation control indicating whether the picture is made still after the playback of the cell or indicating the rest time.

As shown in FIG. 36, the playback information (P_PBI) in the cell playback information table (C_PBIT) 307 contains the cell playback time (C_PBTM) representing the total playback time of the PGC. When the PGC has an angle cell block, the playback time of the angle cell number 1 represents the playback time of the angle block. Further written in the cell playback information table (C_PBIT) 307 are the start address (C_FVOBU_SA) of the first video object unit (VOBU) 285 in the cell expressed by the number of logical sectors, relative to the first logical sector in the video object unit (VOBU) 285 in which the cell is recorded and the start address (C_LVOBU_SA) of the end video object unit (VOBU) 285 in the cell expressed by the number of logical sectors, relative to the first logical sector in the video object unit (VOBU) 285 in which the cell is recorded.

The cell position information table (C_POSI) 308 specifies the identification numbers (VOB_ID) of the video objects (VOB) in the cell used in the PGC and the cell identification number (C_ID). In the cell position information table (C_POSI), pieces of cell position information (C_POSI) corresponding to the cell numbers written in the cell playback information table (C_PBIT) 307 as shown in FIG. 37 are written in the same order as in the cell playback information table (C_PBIT). The cell position information (C_POSI) contains the identification numbers (C_VOB_IDN) of the video object units (VOBS) 285 in the cell and the cell identification number (C_IDN) as shown in FIG. 38.

Further, the structure of the video title set PGCI unit table (VTSM_PGCI_UT) 311 shown in FIG. 31 is explained with reference to FIGS. 39 to 44. The video title set PGCI unit table (VTSM_PGCI_UT) 311 has substantially the same structure as the VMGM_PGCI unit table 280 shown in FIG. 15. That is, in the VMGM_PGCI unit table (VTSM_PGCI_UT) 311, VTS menu PGCI unit table information (VTSM_PGCI_UTI) 350 is first described as shown in FIG. 40, then VTS menu language unit search pointers (VMGM_LU_SRP) 351 of a necessary number n corresponding to the number n of languages are successively described, and the VTS menu language unit (VTSM_LU) 352 searched for by the search pointer is described.

Figures 39, 40, 41:
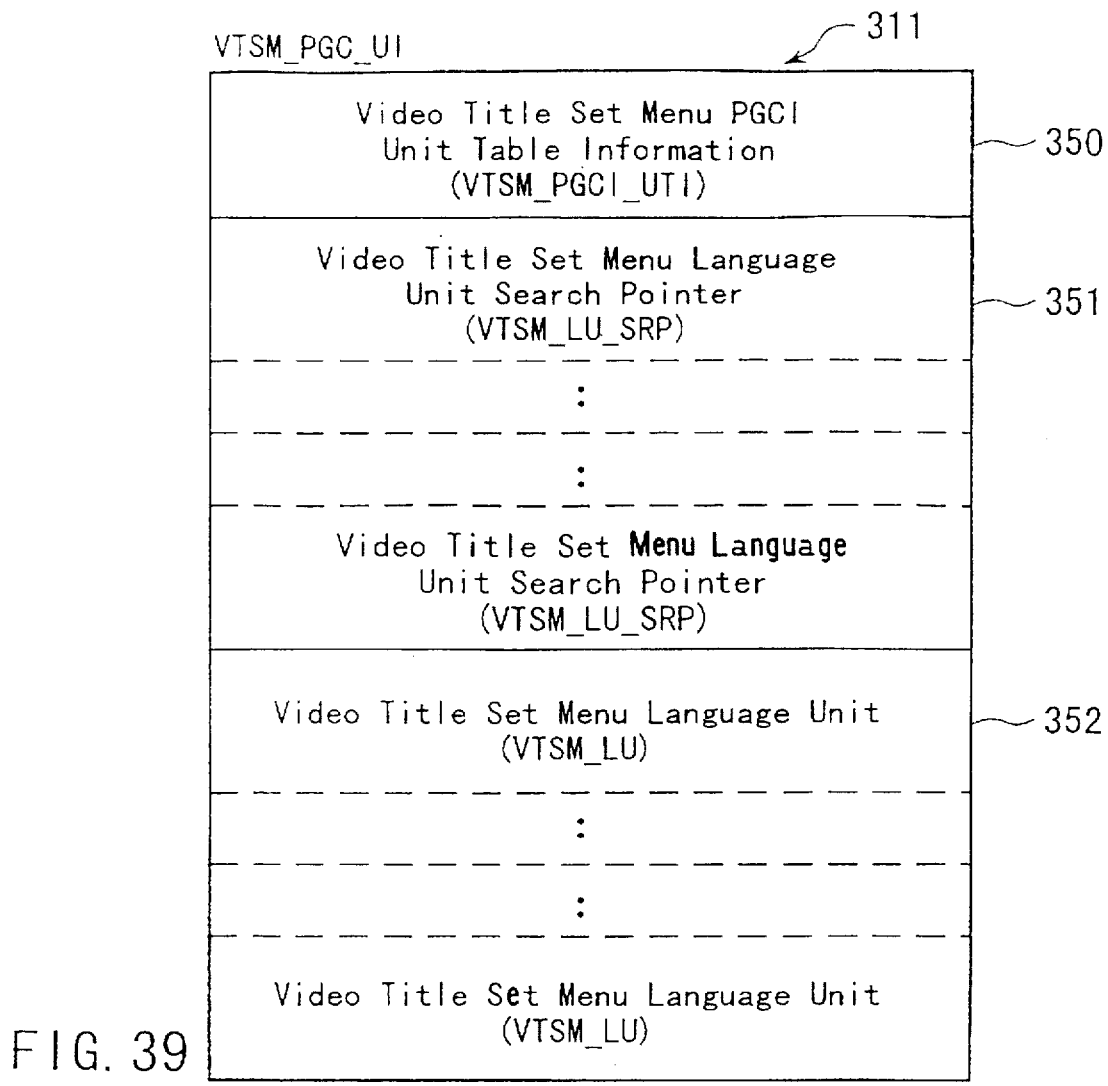
FIG. 39 shows the structure of a video title set menu PGC unit table shown in FIG. 25.
FIG. 40 shows the contents and parameters of video title set PGCI unit table information shown in FIG. 39.
FIG. 41 shows the contents and parameters of a video title set language search pointer shown in FIG. 39.

In the VTS menu PGCI unit table information (VTSM_PGCI_UTI) 350, the number (VTSM_LU_Ns) of VTSM language units (VTSM_LU) and the end address (VTSM_PGCI_UT_EA) of the VTSM_PGCI unit table (VMGM_PGCI_UT) 311 are described as shown in FIG. 40. In each of n video manager menu language unit search pointers (VTSM_LU_SRP) 351 prepared for respective languages, the language code (VTSM_LCD) of the VTS menu and the start address (VTSM_LU_SA) of the VTS menu (VTSM) language unit (VTSM_LU) 252 are described as shown in FIG. 41. The end address (VTSM_PGCI_UT_EA) of VTSM_PGCI_UT 280 and the start address (VTSM_LU_SA) of VTSM_LU 352 are described by use of the logical block number from the head byte of the VTSM_PGCI unit table (VTSM_PGCI_UT) 311.

Figures 42, 43, 44:
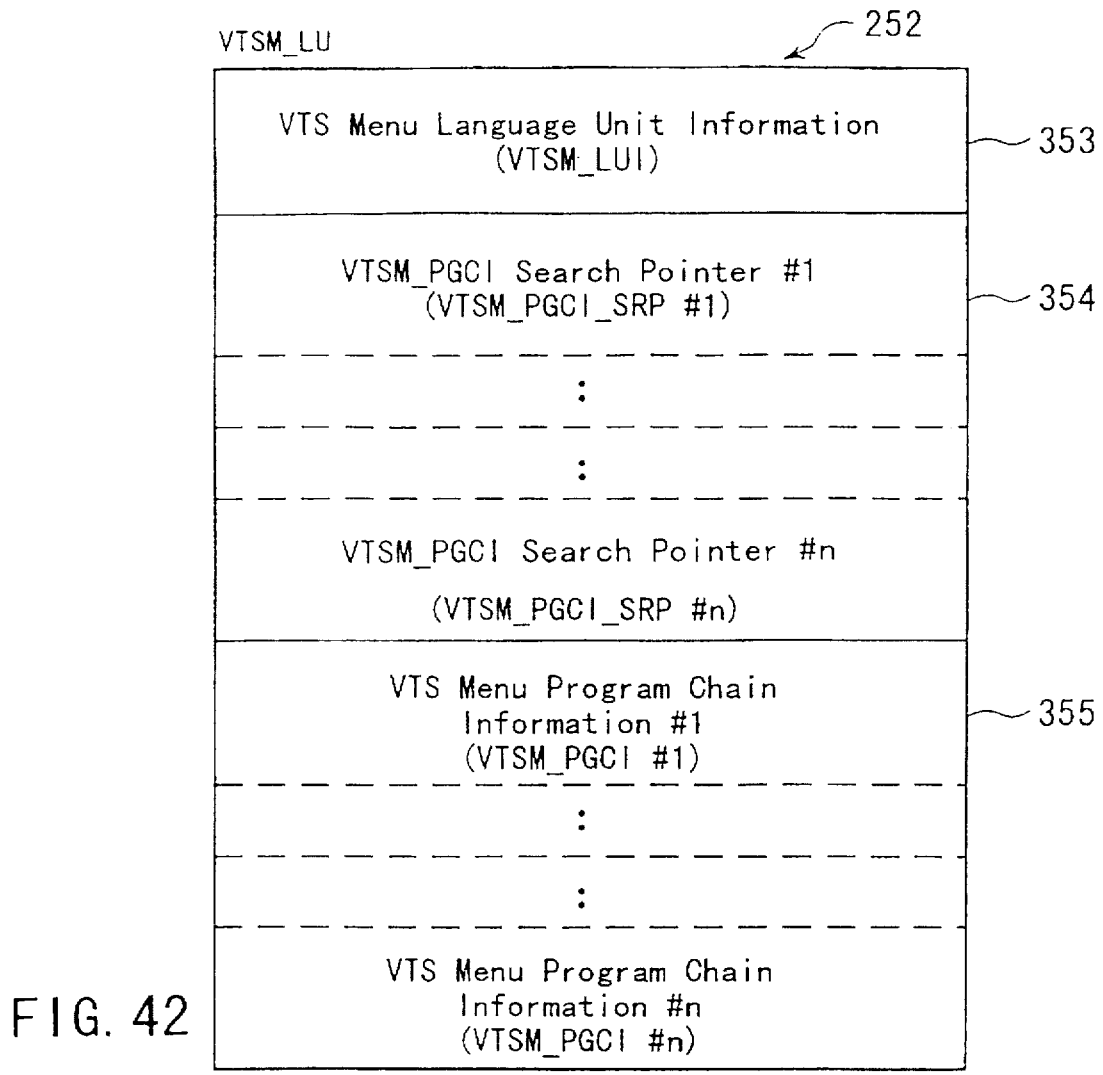
FIG. 42 shows the structure of a video title set language unit shown in FIG. 39.
FIG. 43 shows the contents and parameters of video title set menu language unit information shown in FIG. 42.
FIG. 44 shows the contents and parameters of a video title set PGCI search pointer shown in FIG. 42.

In each of n VTSM language units (VTSM_LU) 352 prepared for respective languages, VTSM menu language unit information (VTSM_LUI) 353 and VTSM_PGCI search pointers (VTSM_PGCI_SRP) 354 of a number corresponding to the number of menu program chains are provided as shown in FIG. 42, and VTSM_PGC information items (VTSM_PGCI) 355 searched for by the search pointers and corresponding in number to the menu program chains are provided as shown in FIG. 42.

In each language unit information (VTSM_LUI) 353, the number (VMGM_PGCI_Ns) of VMGM_PGCIs and the end address (VTSM_LUI_EA) of the language unit information (VTSM_LUI) are described as shown in FIG. 44. Further, in the VTSM_PGCI search pointer (VTSM_PGCI_SRP), the VTSM_PGC category (VTSM_PGC_CAT) and the start address (VTSM_PGCI_SA) of VTSM_PGCI are described as shown in FIG. 44. The end address (VTSM_LUI_EA) of VTSM_LUI and the start address (VTSM_PGCI_SA) of VTSM_PGCI are described by the relative logical block number from the head byte of VTSM_LU. As the VTSM_PGC category (VTSM_PGC_CAT), information indicating that the program chain is an entry program chain or title menu is described.

As explained with reference to FIG. 9, a cell 284 is a set of video object units (VOBU) 285. A video object unit (VOBU) 285 is defined as a pack train starting with a navigation (NV) pack 286. Therefore, the start address (C_FVOBU_SA) of the first video object unit (VOBU) 285 in a cell 284 is the start address of the NV pack 286. As shown in FIG. 45, the NV pack 286 consists of a pack header 320, a system header 321, and two packets of navigation data, i.e., a presentation control information (PCI) packet 116 and a data search information (DSI) packet 117. As many bytes as shown in FIG. 45 are allocated to the respective sections so that one pack may contain 2048 bytes corresponding to one logical sector. The NV pack is placed immediately in front of the video pack containing the first data item in the group of pictures (GOP). Even when the object unit 285 contains no video pack, an NV pack is placed at the head of the object unit containing audio packs or/and sub-picture packs. As with an object unit containing video packs, even with an object unit containing no video pack, the playback time of the object unit is determined on the basis of the unit in which video is reproduced.

Here, GOP is determined in the MPEG standard and is defined as a data train constituting a plurality of screens as explained earlier. Specifically, GOP corresponds to compressed data. Expanding the compressed data enables the reproduction of a plurality of frames of image data to reproduce moving pictures. The pack header 320 and system header 321 are defined in the MPEG 2 system layer. The pack header 320 contains a pack start code, a system clock reference (SCR), and a multiplex rate. The system header 321 contains a bit rate and a stream ID. The packet header 312, 314 of each of the PCI packet 326 and DSI packet 327 contains a packet start code, a packet length, and a stream ID as determined in the MPEG2 system layer.

As shown in FIG. 46, another video, audio, or sub-picture pack 288, 289, 280, or 291 consists of a pack header 120, packet header 121, and a packet 122 containing the corresponding data as determined in the MPEG2 system layer. Its pack length is determined to be 2048 bytes. Each of these packs is aligned with the boundaries between logical blocks.

The PCI data (PCI) 313 in the PCI packet 316 is navigation data used to make a presentations or to change the contents of the display, in synchronization with the playback of the video data in the VOB unit (VOBU) 285. Specifically, as shown in FIG. 47, the PCI data (PCI) 313 contains PCI general information (PCI_GI) as information on the entire PCI and angle information (NSMLS_ANGLI) as each piece of jump destination angle information in angle change. The PCI general information (PCI_GI) contains the address (NV_PCK_LBN) of the NV pack (NV_PCK) 286 in which the PCI 313 is recorded as shown in FIG. 48, the address being expressed in the number of blocks, relative to the logical sector of VOBU 285 in which the PCI 313 is recorded. The PCI general information (PCI_GI) contains the category (VOBU_CAT) of VOBU 285, the start playback time (VOBU_S_PTM) of VOBU 285, and the end playback time (VOBU EPTM) of VOBU 285. Here, the start PTS (VOBU_SPTS) of VOBU 285 indicates the playback start time (start presentation time) of the video data in the VOBU 285 containing the PCI 313. The playback start time is the first playback start time in the VOBU 285. Normally, the first picture corresponds to the playback start time of I picture (intra-picture) in the MPEG standard. The end PTS (VOBU_EPTS) in the VOBU 285 indicates the playback end time (end presentation time) of the VOBU 285 containing the PCI 313.

Figure 53:
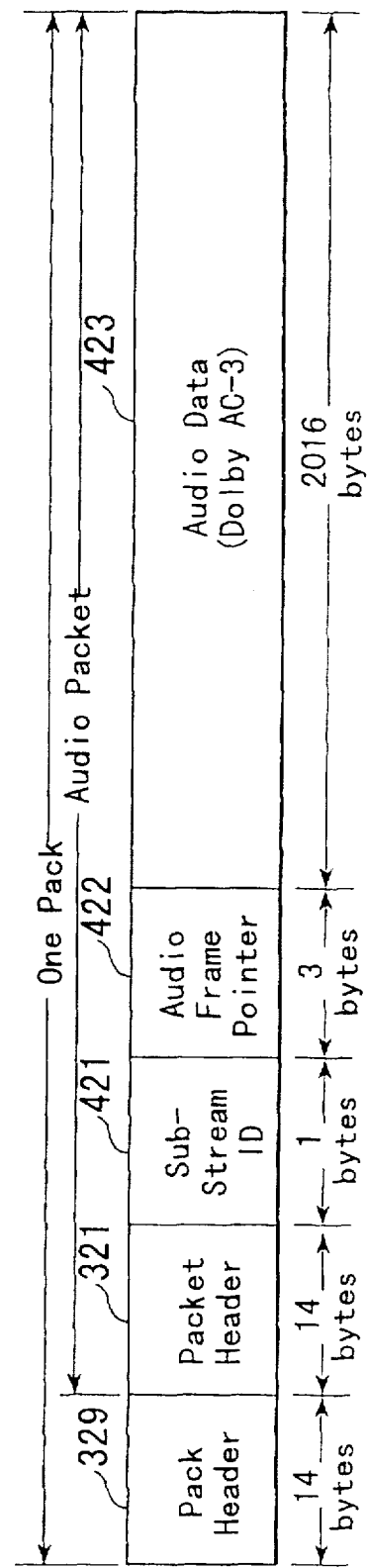
FIG. 53 is a conceptual diagram to help explain the structure of an audio pack shown in FIG. 52.

DSI data (DSI) 315 in the DSI packet 317 shown in FIG. 53 is navigation data used to search for the VOB unit (VOBU) 285. The DSI data (DSI) 315 contains DSI general information (DSI_GI), seamless information (SML PBI), angle information (SML_AGLI), address information (NV_PCK_ADI) on a navigation pack, and synchronizing playback information (SYNCI) as shown in FIG. 50.

The DSI general information (DSI_GI) contains information about the entire DSI 315. Specifically, as shown in FIG. 50, the DSI general information (DSI_GI) contains the system clock reference (NV_PCK_SCR) for the NV pack 286. The system clock reference (NV_PCK_SCR) is stored in the system time clock (STC) built in each section of FIG. 4. On the basis of the STC, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NV pack (NV_PCK) 286 containing the DSI 315 expressed by the number of logical sectors (RLSN), relative to the first logical sector in the VOB set (VOBS) 282 containing the DSI 315, and the address (VOBU_EA) of the last pack in the VOB unit (VOBU) 285 containing the DSI 315 expressed by the number of logical sectors (RLSN), relative to the first logical sector in the VOB unit (VOBU).

Furthermore, the DSI general information (DSI_GI) contains the end address (VOBU_IP_EA) of the V pack (V_PCK) 288 containing the last address of the first I picture in the VOBU expressed by the number of logical sectors (RLSN), relative to the first logical sector in the VOB unit (VOBU) containing the DSI 315, and the identification number (VOBU_IP_IDN) of the VOBU 283 containing the DSI 315 and the identification number (VOBU_C_IDN) of the cell in which the DSI 315 is recorded.

The navigation pack address information of DSI contains the addresses of a specified number of navigation packs. Video fast-forward etc. are effected, referring to the addresses. The synchronizing information (SYNCI) includes address information on the sub-pictures and audio data reproduced in synchronization with the playback start time of the video data in the VOB unit (VOBU) containing DSI 325. Specifically, as shown in FIG. 51, the start address (A_SYNCA) of the target audio pack (A_PCK) 291 is expressed by the number of logical sectors (RLSN), relative to the NV pack (NV_PCK) 286 in which DSI 325 is recorded. When there are more than one audio stream (8 audio streams maximum), as many pieces of synchronizing information (SYNCI) as there are audio streams are written. Furthermore, the synchronizing information (SYNCI) includes the address (SP_SYNCA) of the NV pack (NV_PCK) 286 of the VOB unit (VOBU) 285 containing the target audio pack (SP PCK) 291, the address being expressed by the number of logical sectors (RLSN), relative to the NV pack (NV_PCK) 286 in which DSI 325 is recorded. When there are more than one sub-picture stream (32 sub-picture streams maximum), as many pieces of synchronizing information (SYNCI) as there are sub-picture streams are written.

As described earlier, a music-only video title set may include video packs and sub-picture packs in addition to audio packs or may not include video packs or sub-picture packs. When video packs are included in a music-only video title set, not only moving pictures but also still pictures may be stored in a video pack. Furthermore, a karaoke video title set may be composed simply of audio packs and sub-picture packs in which data on the words of songs have been recorded or may be composed of video packs, audio packs, and sub-picture packs as a video title set is. Even when a music-only video title set includes no video pack, the audio data is reproduced on the basis of VOBU 285 using GOP as a unit shown in FIG. 9. Namely, even if there is no video data, the audio data is reproduced using the video data playback time as a reference, provided that video data is present.

Figure 52:
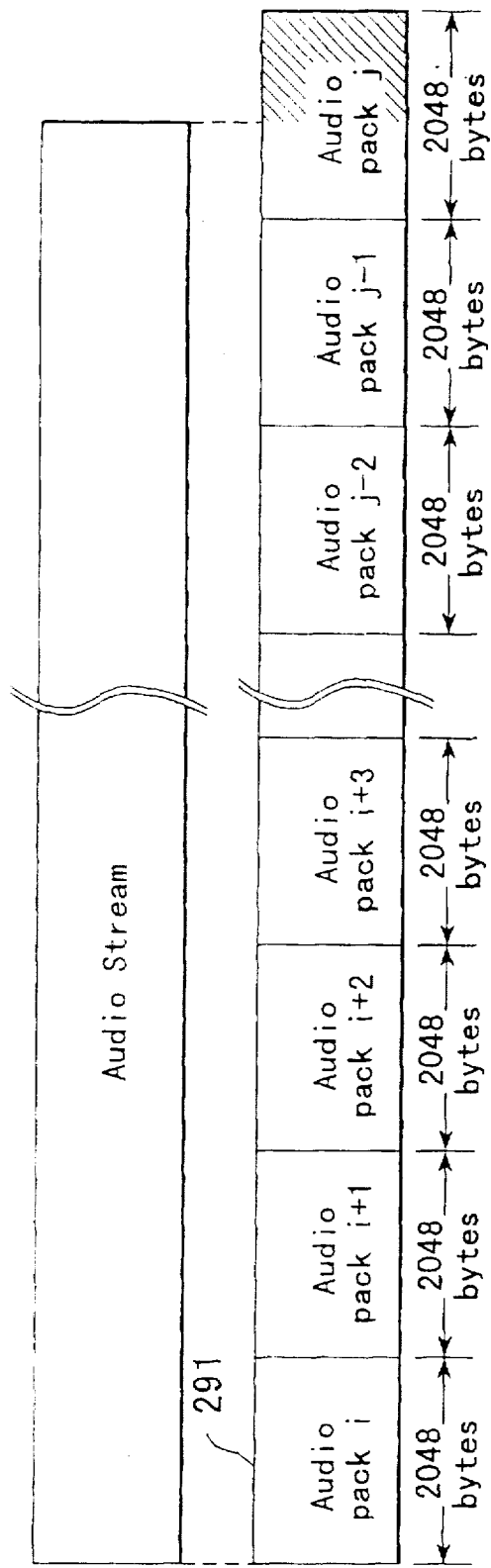
FIG. 52 is an explanatory diagram of the structure of an audio stream acting as audio data in a music file.

In a music-only video title set, an audio stream is composed of audio pack i to audio pack j arranged as shown in FIG. 52. Each audio pack 291 is made up of a pack header 320 in which synchronizing information on packs has been stored and audio packets 331 in that order. At the head of the audio packets 331, a packet header 321 is positioned. In the packet header 321, a stream id indicating what the pack is intended for has been written. In the stream id, whether it is a video stream, an MPEG audio stream, or a private stream is written. In the case of Dolby AC-3, private stream 1 is written. In a Dolby AC-3 and linear PCM packets, a substream ID 421 has been written following the packet header 321. In the substream ID 421, the contents of private stream 1 is written and whether it is a linear stream or a Dolby AC-3 stream is written. In the case of Dolby AC-3, a private stream is written as stream id and an AC-3 stream is written as substream ID. Specifically, in the case of audio packets in an MPG audio stream, "11000*b" or "11010*b" is written in the packet header 320 as stream_id that means audio packets for MPEG. In the case of audio packets in a linear PCM and AC-3 audio stream, "1011101b" is written in the packet header 320 as stream_id that means audio packets for linear PCM and AC-3. Furthermore, in sub_ stream_id provided in audio packets for linear PCM, "100100*b" is written as stream_id that means audio packets for linear PCM. In sub_stream_id provided in audio packets of AC-3, "10000*b" is written as stream_ id that means audio packets for AC-3. In the above explanation, "***" in the stream_id or sub_stream_id indicates Decoding Audio stream number in the range from 0 to 7.

Figure 54:
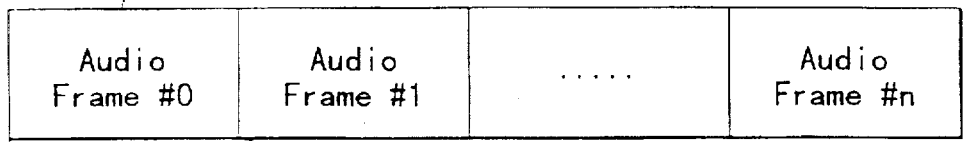
FIG. 54 is a conceptual diagram of the structure of audio data shown in FIG. 53.

Furthermore, in audio packets for linear PCM and AC-3, the substream ID is followed by an audio frame pointer 422. As shown in FIG. 54, audio data 423 consists of a large number of audio frames #0 to #n arranged in that order. The first frame to be accessed is specified by the audio frame pointer 422.

Each of the audio frames #0 to #n in the audio data 423 is made up of a frame header 424 and frame data 425 as shown in FIG. 54. The frame header 424 corresponds to the synchronizing information header SI of a synchronizing frame and bit stream information BSI in the Dolby AC-3 standard. Similarly, the frame data corresponds to six coded audio blocks AB1 to AB5 of a synchronizing frame, auxiliary data AUX, and error sensing word CRC in the Dolby AC-3 standard. In the AC-3 standard, the synchronizing information on the frame is written in the synchronizing information header SI of the synchronizing frame. The bit stream information BSI contains coded audio stream use, the number of audio stream channels, the type of audio streams, and a parameter that specifies a mixing level at which surround audio streams are to be subjected to down-mixing. Specifically, the audio stream use is written as a bit stream mode (bsmod) in which a parameter indicating whether the audio stream use is in the surround mode or special use mode, such as karaoke, is expressed in three bits. As explained earlier, the parameter is sensed by the mode sensor 163 of FIG. 3 and the reproduction route is set in the surround mode or special use mode. Furthermore, a parameter indicating that the audio data transmitted through the audio channels, respectively, correspond to any one of the combinations of the left channel content, right channel content, center channel content, left surround channel content, and right surround channel content L, C, R, LS, and RS to be supplied to the speakers 8L, 8C, 8R, 8LS, and 8RS, respectively. On the basis of the parameter, a reproducing operation is executed according to the channel contents in the reproduction route. In addition, a parameter indicating whether the surround channel contents LS and RS are to be subjected to mixing, i.e., whether the mixing level is equivalent to zero or not in down-mixing and a mixing ratio is written. On the basis of the parameter, the concrete coefficient set in the surround mixing coefficient generator 167 of FIG. 3 has been selected and given to the down mixer 161.

Figure 56:
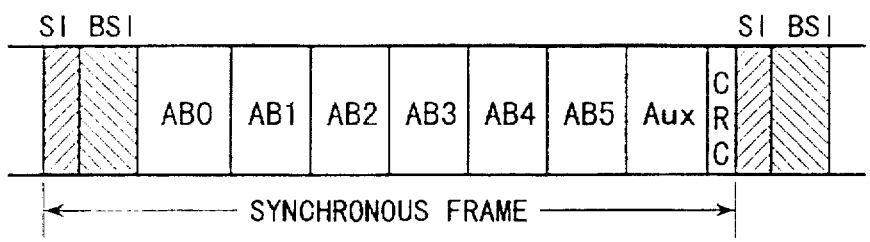
FIG. 56 shows the description of audio coding mode in the bit stream information of FIG. 55.

A parameter for an audio channel in the transmission route for special use, particularly karaoke use, written in bit stream information BSI has an audio coding mode as shown in FIG. 56. The audio coding mode (acmod) is expressed in three bits. It changes to signal C in the surround mode and gives a normally used first-type accompanying sound A1 selectively made unused. It changes to signal LS and signal RS in the surround mode and gives a normally unused second-type accompanying sounds A2, A2-1, A2-2 selectively used. Mode "010" specifies that the transmission route has two main channels and no subchannels, that is, a left channel L and a right channel R. In mode "010", for example, audio data on accompaniment such as orchestra is recorded as main audio signals in audio frame data 425 in the left channel L and right channel R. Mode "011" specifies that the transmission route has three main channels and no subchannel (a total of three channels), that is, the left and right channels L, R and a first-type accompanying sound channel A1. In these channels L, A1, R, for example, audio data on accompaniment such as orchestra and guide melody are recorded as main audio signals as audio data frame data 425 in the audio frame 426. Mode "100" specifies that the transmission route has two main channels and a subchannel (a total of three channels), that is, the left and right channels L, R and a second-type accompanying sound channel A2. In these channels L, R, A2, for example, accompaniment, such as orchestra, as a main audio signal, and a vocal as a sub-audio signal, are recorded as audio data frame data 425 in the audio frame 426. Mode "101" specifies that the transmission route has three main channels and a subchannel (a total of four channels), that is, the left and right channels L, R, a first-type accompanying sound channel A1, and a second-type accompanying sound channel A2. In these channels L, A1, R, A2, for example, audio data on accompaniment such as orchestra and guide melody as main audio signals and a vocal as a sub-audio signal are recorded as audio data frame data 425 in the audio frame 426. Mode "110" specifies that the transmission route has two main channels and two subchannels (a total of four channels), that is, the left and right channels L, R, second-type accompanying sound channels A2-1, A2-2. In these channels L, R, A2-1, A2-2, for example, accompaniment, such as orchestra, as a main audio signal and a female vocal and a male vocal as sub-audio signals are recorded as audio data frame data 425 in the audio frame 426. Mode "111" specifies that the transmission route has three main channels and two subchannels (a total of five channels), that is, the left and right channels L, R, a first-type accompanying sound channel A1, and second-type accompanying sound channels A2-1, A2-2. In these channels L, A1, R, A2-1, A2-2, for example, audio data on accompaniment, such as orchestra, and guide melody as main audio signals and a female vocal and a male vocal as sub-audio signals are recorded as audio data frame data 425 in the audio frame 426.

Next, the operation of taking out audio streams complying with the Dolby AC-3 standard from the optical disk 10 having the logical formats shown in FIGS. 7 to 48 and reproducing the surround data or karaoke data will be described by reference to FIG. 4. In FIG. 4, the solid line arrows indicate data buses and the broken line arrows indicate control buses.

With the optical disk apparatus of FIG. 4, when the power supply is turned on and an optical disk 10 is loaded, the system CPU section 50 reads the initial operation program from the system ROM/RAM 52 and operates the disk drive section 30. Then, the disk drive section 30 starts to read the data from the lead-in area 27 and then from the volume and file structure area 70 next to the lead-in area 27 determining a volume structure and a file structure in accordance with ISO-9660 or UDF. Specifically, to read the data from the volume and file structure area 270 located in a specific position on the optical disk 10 set in the disk drive section 30, the system CPU section 50 gives a read instruction to the disk drive section 30 to read the contents of the volume and file structure area 270, and stores the data temporarily in the data RAM section 56 via the system processor section 54. The system CPU section 50 extracts information about the recording position and recording size of each file and management information necessary for other managing actions via the path table and directory record stored in the data RAM section 56, and transfers and stores these pieces of information in specific locations in the system ROM/RAM section 52.

Then, the system CPU section 50 acquires a video manager 271 composed of files, starting with file number 0, by reference to the information about the recording position and recording capacity of each file in the system ROM/RAM section 52. Specifically, referring to the recording position and recording capacity of each file acquired from the system ROM/RAM section 52, the system CPU section 50 gives a read instruction to the disk drive section 30, acquires the positions and sizes of a plurality of files constituting the video manager 271 existing on the root directory, reads the video manager 271, and stores it in the data RAM section 56 via the system processor section 54.

Figure 57:
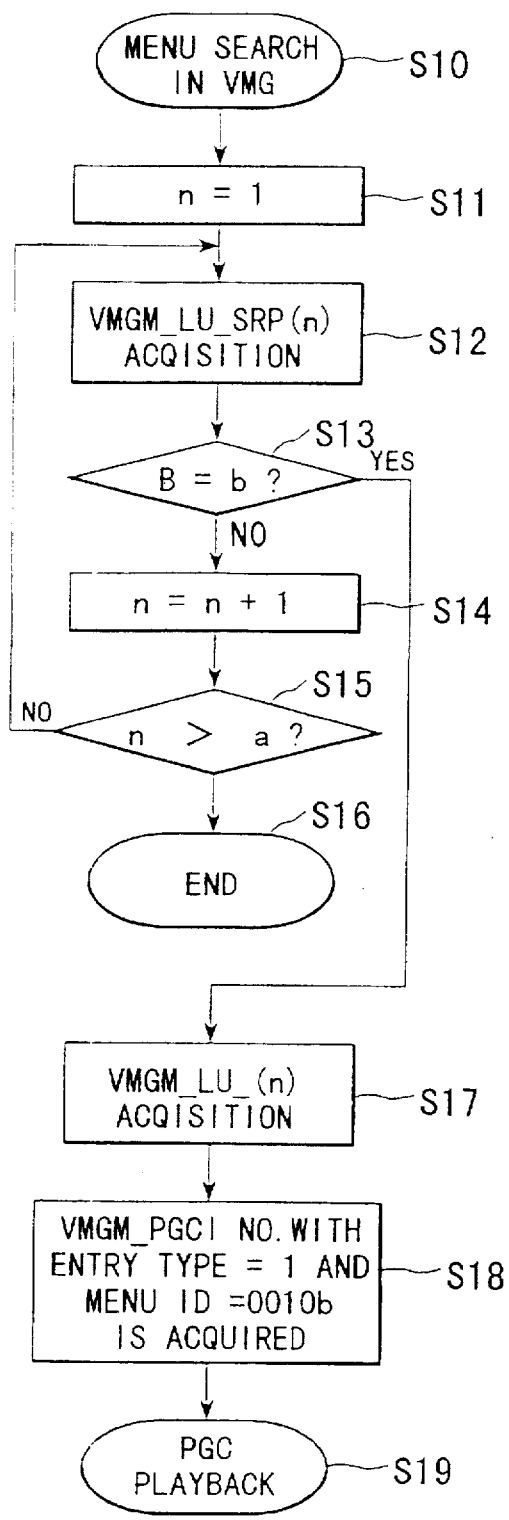
FIG. 57 is a flowchart for illustrating the retrieving operation of the video manager menu.

Now, the operation effected until the video manager menu for selection of karaoke is displayed is explained with reference to FIG. 57. When the menu search process is started as shown in the step S10, the volume manager information management table (VMGI_MAT) 278 which is the first table of the video manager 271 is searched. By the searching operation, the start address (VMGM PGCI_UT_SA) of the VMGM_PGCI unit table (VMGM_PGCI_UT) 280 for the video manager menu (VMGM) is acquired. The VMGM_PGCI unit table 280 is acquired, the number (a) of language units (VMGM_LU_Ns) of the video manager is derived from the table information (VMGM_PGCI_UTI) of the table (VMGM_PGCI_UT) 280, and as shown in the step S11, acquisition of the search pointer (VMGM_LU_SRP) of the first #1 (n=1) VMGM_LU is determined. Then, the search pointer (VMGM_LU_SRP) of VMGM_LU is acquired. Next, it is determined in the step S13 whether the language code (=b) (VMGM_LCD) described in the search pointer (VMGM_LU_SRP) of VMGM_LU coincides with the language code (=B) specified in the reproducing apparatus, that is, the default language code. If the language codes do not coincide with each other, the number of the search pointer is incremented (n=n+1) as shown in the step S12 and whether the incremented number n exceeds the number (a) of the language units (VMGM_LU_Ns) of the video manager menu or not is determined. When the number n is set larger than the number (a) of the language units (VMGM_LU_Ns) of the video manager menu, the retrieving operation for the video manager menu (VMGM) is terminated as shown in the step S16. When the number n is smaller than the number (a) of the language units (VMGM_LU_Ns) of the video manager menu, the process returns to the step S12, then the n-th VMGM_LU search pointer (VMGM_LU_SRP) is acquired and the steps S13 to S15 are effected again.

If it is determined in the step S13 that the language code (=b) (VMGM_LCD) described in the search pointer (VMGM_LU_SRP) of VMGM_LU coincides with the language code (=B) specified in the reproducing apparatus, that is, the default language code, a VMGM language unit (VMGM_LU) 252 corresponding to the language code described in the search pointer (VMGM_LU_SRP) of VMGM_LU is acquired as shown in the step S17. The number (VMGM_PGCI_Ns) of VMGM_PGCIs is derived from VMGM language unit information (VMGM_LUI). Next, the VMGM_PGC category (VMGM_PGC_CAT) is acquired from the VMGM_PGCI search pointer (VMGM_PGCI_SRP) 254 as shown in the step S18. Therefore, the VMGM_PGC number corresponding to the menu ID (="0001" or "0010") and corresponding to the entry type (=1) is acquired from the VMGM_PGC category (VMGM_PGC_CAT). The menu ID (="0001" or "0010") corresponds to the VMGM language menu or VMGM title menu. The VMGM_PGC start address corresponding to the acquired VMGM_PGC number is acquired from the VMGM_PGCI search pointer (VMGM_PGCI_SRP), and corresponding PGC is acquired from the VMGM video object set (VMGM_VOBS) 276 and PGC is reproduced as shown in the step S19.

Therefore, a VMG menu shown in FIG. 58 is displayed as one example. With the above menu, one of the video title set containing collections of hit songs sung by singers, in this example, Beatles hit song collection and Elvis Presley hit song collection (1-a, 1-b) and the video title set corresponding to the karaoke thereof, in this example, Beatles karaoke hit song collection and Elvis Presley karaoke hit song collection (2-a, 2-b) can be selected. When the karaoke hit song collections (by singers) are selected by operating a corresponding key on the key operating and displaying section 4 according to the menu, the menu of the video title set for karaoke is reproduced according to the flowchart shown in FIG. 59.

At the time of reproduction of the video manager menu, the system CPU section 50 acquires the stream numbers of video, audio, sub-picture for volume menu described in the information management table (VMGI_MAT) 78 of the volume manager (VMGI) 75 and attribute information items thereof and parameters for reproduction of the video manager menu are set into the video decoder section 58, audio decoder section 60 and sub-picture decoder section 62 based on the attribute information. Further, the video processing section 201, audio processing section 202, audio mixing section 203 and sub-picture reproduction processing section 207 in the D/A and reproduction processing section 64 are set according to the attribute information.

Figure 59:
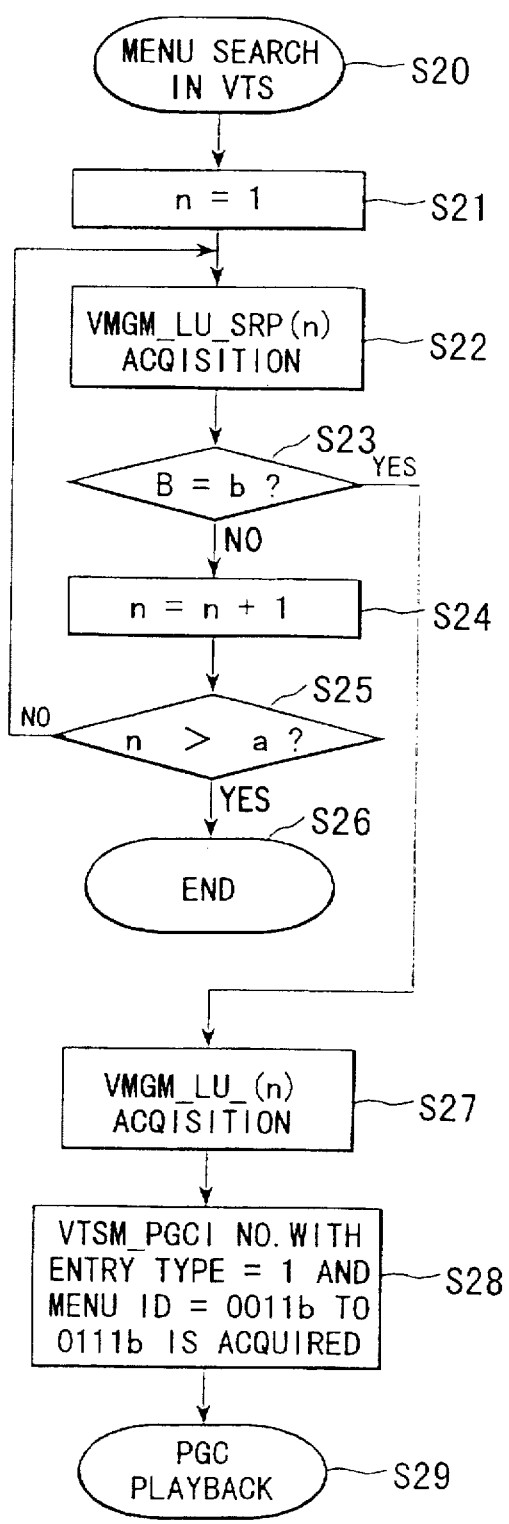
FIG. 59 is a flowchart for illustrating the retrieving operation of the video title set menu.

When the searching operation for the video title set menu is started as shown in the step S20 of FIG. 59, the title set search pointer table (TT_SRPT) 279 is transferred to a preset location of the system ROM & RAM section 52 and stored therein by the above searching operation. Next, the system CPU section 50 acquires the end address of the title search pointer table (TT_SRPT) 279 from the title search pointer table information (TSPTI) 292 and acquires a video title set number (VTSN), program chain number (PGCN) corresponding to an entry number and the start address (VTS_SA) of the video title set from the title search pointer (TT_SRP) 293 corresponding to the entry number from the key operating and displaying section 4. The system CPU section 50 acquires a target title set from the start address (VTS_SA) of the title set.

Next, video title set information (VTSI) 294 of the title set is acquired from the start address (VTS_SA) of the video title set 272 shown in FIG. 13. The end address (VTSI_MAT_EA) of the video title set information management table (VTSI_MAT) 298 shown in FIG. 26 is acquired from the management table (VTSI_MAT) 298 of video title set information of the video title set information (VTSI) 294. Further, based on the stream numbers (VTS_AST_Ns, VTS_SPST_Ns) of audio and sub-picture data and attribute information items (VTS_V_ATR, VTS_A_ATR, VTS_SPST_ATR) of video, audio and sub-picture data, the respective portions of the reproducing apparatus shown in FIG. 4 are set according to the attributes thereof. That is, the video processing section 201, audio processing section 202, audio mixing section 203 and sub-picture reproduction processing section 207 in the D/A and reproduction processing section 64 are set according to the attribute information thereof. Further, it is determined that the video title set is karaoke based on the VTS category (VTS_CAT) and the respective portions of the reproducing apparatus are set for karaoke reproduction.

The start address (VTSM_PGCI_UT_SA) of the VTSM_PGCI unit table (VTS_PGCI_UT) 300 for the video title set menu (VTSM) is acquired from the video title set information management table (VTSI_MAT) 298 by the searching operation. Therefore, the VTSM_PGCI unit table 300 is acquired and the number (a) of video title menu language units (VTSM_LU_Ns) is acquired from the table information (VTS_PGCI_UTI) 300, and acquisition of the first #1 (n=1) VTSM_LU search pointer (VTSM_LU_SRP) 351 is determined as shown in the step S21. The search pointer (VMGM_LU_SRP) 351 of VMGM_LU 352 is acquired as shown in the step S22. Whether the language code (=b) (VTSM_LCD) described in the search pointer (VMGM_LU_SRP) 351 of VMGM_LU 352 coincides with the language code (=B) specified in the reproducing apparatus, that is, the default language code or not is determined as shown in the step S23. If the language codes do not coincide with each other, the number of the search pointer is incremented (n=n+1) as shown in the step S24 and whether the incremented number n exceeds the number (a) of the language units (VTSM_LU_Ns) of the video title set menu or not is determined. When the number n is set larger than the number (a) of the language units (VTSM_LU_Ns) of the video title set menu, the retrieving operation for the video title set menu (VTSM) is terminated as shown in the step S26. When the number n is smaller than the number (a) of the language units (VTSM_LU_Ns) of the video title set menu, the process returns to the step S22, then the n-th VTSM_LU search pointer (VTSM_LU_SRP) 351 is acquired and the steps S23 to S25 are effected again.

If it is determined in the step S23 that the language code (=b) (VTSM_LCD) described in the search pointer (VMGM_LU_SRP) 351 of VTSM_LU coincides with the language code (=B) specified in the reproducing apparatus, that is, the default language code, the VTSM language unit (VTSM_LU) 352 corresponding to the language code described in the search pointer (VMGM_LU_SRP) 351 of VTSM_LU is acquired as shown in the step S27. Then, the number (VTSM_PGCI_Ns) of VTSM_PGCIs is acquired from the VMGM language unit information (VTSM_LUI). Next, as shown in the step S28, a VTSM_PGC category (VTSM_PGC_CAT) is acquired from the VTSM_PGCI search pointer (VTSM_PGCI_SRP) 354. Therefore, a VTSM_PGC number corresponding to the menu ID (="0001" or "0010") and corresponding to the entry type (=1) is acquired from the VTSM_PGC category (VTSM_PGC_CAT). The menu ID (="0001" or "0010") corresponds to the VTSM language menu or VTSM title menu. The start address (VTSM_PGC_SA) of VTSM_PGC corresponding to the acquired VTSM_PGC number is acquired from the VTSM_PGCI search pointer (VTSM_PGCI_SRP), and corresponding PGC is acquired from the VTSM video object set (VTSM_VOBS) 276 and PGC is reproduced as shown in the step S29.

Therefore, a VTS menu shown in FIG. 60 is displayed as one example. The above menu provides a video title set, in this example, a video title set corresponding to an Elvis Presley karaoke hit song collection and one of the program chains (PGCs) of the first to n-th hit songs can be selected. When a karaoke song is selected by operating a corresponding key on the key operating and displaying section 4 according to the menu, a sub-menu, for example, a menu for selecting lyric lines as shown in FIG. 61 is displayed. That is, since 32 sub-picture streams are prepared as the sub-picture as explained before, the karaoke provider can prepare lyric lines of various languages such as English, Japanese, German, French and display the sub-picture of corresponding language in synchronism with the music by use of synchronizing information (SYNCI) shown in FIG. 51. Further, a menu for selecting one of the eight audio streams can be prepared as another sub-menu. That is, the audio stream containing only the musical performance, the audio stream containing the musical performance to which a guide melody is attached, or the audio stream containing the musical performance together with the partner's voice of a duet can be selected. When one of the selectable items is selected from the menu, a program chain corresponding to the selected song is reproduced.

When the menu (VTSM) for the video title set (VTS) is simple in structure, the start address (VTSM_VOB_SA) of the video object set (VTSM_VOB) 295 for menu of the video title set is acquired from the video title set information management table (VTSI_MAT) 298 shown in FIG. 26 and the menu of the video title set is displayed by the video object set (VTSM_VOB) 295.

Figure 62:
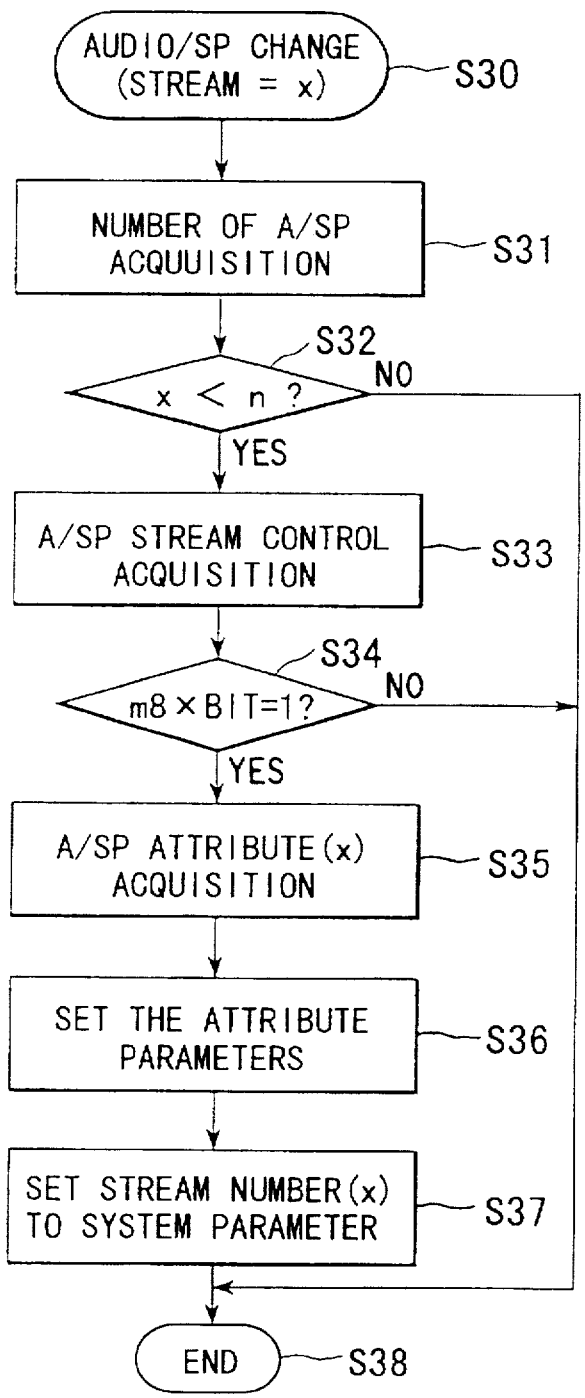
FIG. 62 is a flowchart for illustrating the selecting operation of the audio stream and sub-picture stream.

The sub-picture stream and audio stream are changed according to the flowchart shown in FIG. 62. First, selection of the sub-picture stream or audio stream or change thereof is specified on the menu as shown in the step S30. In this example, it is supposed that the X-th stream is specified. After the specification, the number (n) of audio streams or the number (n) of sub-picture streams is acquired from VTS_AST_Ns or VTS_SPST_Ns of the VTS management table (VTS_MAT) 298 in the video title set which is now selected as shown in the step S31. Whether the selected X-th stream is smaller than the number (n) of the streams is determined as shown in the step S32. If the number X of the selected stream is larger than the number n of the streams, it is determined that a corresponding stream is not present and the stream selecting operation is interrupted. If the number X of the selected stream is smaller than the number n of the streams, PGCI_AST_CTL or PGCI_SPST_CTL is acquired as audio or sub-picture stream control information on a stream which is available in the selected PGC from the PGCI general information (PGCI_GI) 305 corresponding to the selected PGC as shown in the step S33. If the selected stream of the number X is not contained in the m available streams as shown in the step S34, it is determined that a corresponding stream is not present and the stream selecting operation is interrupted. If the selected stream of the number X is contained in the m available streams as shown in the step S34, the audio stream attribute (VTS_AST_SPST) or sub-picture stream attribute (VTS_SPST_SPST) of the selected stream of the number X is acquired as shown in the step S35. According to the acquired attribute, attribute parameters are set as shown in the step S36. Next, the stream number X is set as a system parameter as shown in the step S37. If the stream number is thus specified, the operation of selecting and reproducing a specific stream is terminated as shown in the step S38.

When a program chain, that is, a concrete song is specified on the key operating and displaying section 4, a target program chain is searched for according to the following procedure. The searching procedure for the program chain is not limited to the program chain for the titles in the video title set and the same procedure can be used for searching for the program chain for the menu in a case where the menu is constructed by the program chains in a relatively complicated form. The start address of the program chain information table (VTS_PGCIT) 300 in the video title set (VTS) shown in FIG. 26 which is described in the management table (VTSI_MAT) 298 of the video title set information (VTSI) 294 is acquired and information (VTS_PGCIT_I) 302 of the VTS program chain information table shown in FIG. 28 is fetched. The number (VTS_PGC_Ns) of the program chains shown in FIG. 27 and the end address (VTS_PGCIT_EA) of the table 300 are acquired from the information (VTS_PGCIT_I) 302.

When the number of the program chain is specified by means of the key operating and displaying section 4, the category (VTS_PGCIT_CAT) of the program chain shown in FIG. 30 and the start address of the VTS_PGC information 104 corresponding to the search pointer (VTS_PGCIT_SRP) 303 are acquired from the VTS_PGCIT search pointer (VTS_PGCIT_SRP) 303 shown in FIG. 28 and corresponding to the specified number. Based on the category of the program chain, it is determined that a corresponding program chain is karaoke. Further, the program chain general information (PGC_GI) shown in FIG. 31 is read out by use of the start address (VTS_PGCI_SA). The category of the program chain (PGC) is also acquired by use of the general information (PGC_GI). Further, reproduction time (PGC_CAT, PGC_PB_TIME) is acquired by use of the general _information (PGC_GI), and the start addresses (C_PBIT_SA, C_POSIT_SA) of the cell reproducing information table (C_PBIT) and cell position information table (C_POSIT) 108 described in the general information (PGC_GI) are acquired. Further, an identifier (C_VOB_IDN) for the video object and a cell identifier number (C_IDN)s shown in FIG. 46 are acquired as cell position information (C_POSI) shown in FIG. 37 from the start address (C_PBIT_SA).

Further, cell reproducing information (C_PBI) shown in FIG. 36 is acquired from the start address (C_POSIT_SA), and the start address (C_FVOBU_SA) of the first VOBU 85 and the start address (C_LVOBU_SA) of the last VOBU in the cell of FIG. 36 described in the reproduction information (C_PBI) are acquired and a target cell is searched for. The cell reproducing order is set by sequentially determining the reproducing cells 284 by referring to the map of programs of FIG. 33 in the PGC program map (PGC_PGMAP) 306 shown in FIG. 31. The thus determined data cells 284 of the program chain are sequentially read out from the video object set 296 and input to the data RAM section 56 via the system processor section 54. The data cell 284 is supplied to and decoded by the video decoder section 58, audio decoder section 60 and sub-picture decoder section 62, subjected to the signal conversion by the D/A and reproduction processing section 64, and an image is _reproduced on the monitor section 6 and sounds are reproduced from the speaker sections 8, 9.

Next, the operation at the time when the audio stream signals shown in FIGS. 13 to 16 in the special-use mode, particularly the karaoke mode, have been transferred from the system processor section 54, will be explained in further detail by reference to FIG. 3.

In the system processor section 54, the pack header 320 for data management is cut off from an audio pack 291 and the audio packet is taken out. To decode the audio data 423, the packet header 321, substream ID 421, and audio frame pointer 422 are cut off from the audio packet. The audio frames 426 constituting the audio data 423 are inputted to the decoder section 60 of FIG. 4 one after another. The audio frame data 425 composed of audio blocks AB0 to AB5 complying with the AC-3 standard and contained in the inputted audio frame data 426 are decoded simultaneously and converted into, for example, 5-channel audio signals. The converted audio signals pass through the down mixer 161 and are inputted to the D/A converter 160, which converts them into analog data.

The bit stream information BSI conforming to the AC-3 standard contained in the frame header 424 is sensed at the mode sensor 163. If the mode of the audio frame is found to be the surround mode from the bit stream mode (bsmod) in the sensed bit stream information BSI, visual indications of the surround mode will appear on the display unit 169 as shown in FIG. 63A. Additionally, the contents of channels will be displayed according to the audio code mode (acmod) in the bit stream information BSI. In this mode, the audio signal of the corresponding channel contents will be reproduced from the corresponding speaker. For example, when the surround mode is on and 5-channel speakers 8L, 8C, 8R, 8LS, and 8RS for reproducing surround are connected, 5-channel audio signals L, C, R, RS, and LS are not subjected to down-mixing at the down mixer 64, but are amplified and reproduced at the 5-channel speakers 8L, 8C, 8R, 8LS, and 8RS.

If the sensed bit stream information BSI indicates the surround mode and only 2-channel speakers 8L and 8R are connected to the system, the 5-channel audio signals L, C, R, RS, and LS will be subjected to down-mixing at the down mixer 64. At this time, the parameter related to mixing written in the bit stream information BSI is read by the control circuit 168, which generates a default mixing signal as explained earlier. On the basis the parameter, the surround mixing coefficient generator 167 generates a specific mixing coefficient and supplies it to the down mixer 161, which produces a mixing signal corresponding to the mixing coefficient.

Figure 64:
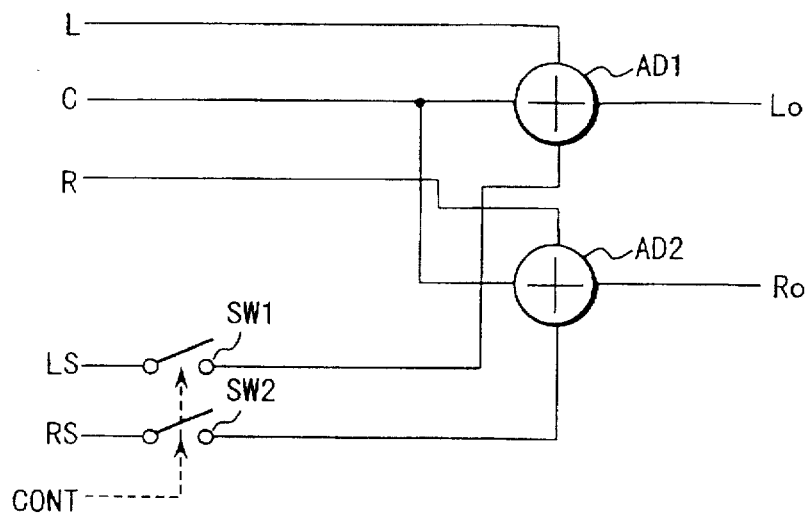
FIG. 64 is a block diagram of the surround mixing coefficient generator of FIG. 3 with a pictorial representation of the down-mixer's function.

FIG. 64 shows an example of down-mixing with a specific mixing coefficient in the surround mode. The circuit shown in FIG. 64 corresponds to the down mixer 161. In FIG. 64, the output side of an adder AD1 is connected to a left output channel Lo and its input side is supplied with a left and center channel audio signals L and C. It is also supplied with a left surround channel audio signal LS via a switch SW1. The output side of an adder AD2 is connected to a right output channel Ro and its input side is supplied with a right and center channel audio signals R and C. It is also supplied with a right surround channel audio signal RS via a switch SW2.

When a default mixing signal has been generated by the control circuit, the circuit of FIG. 64 is brought into an operating state. If the parameter related to mixing and written in the bit stream information BSI is of bits concerning the first specific mixing coefficient, the control circuit 168 will generate a control signal Cont for closing the switches SW1 and SW2, thereby closing the switches SW1 and SW2. As a result, the left output channel Lo and right output channel will output the following:

$$Lo=L+0.7C+0.7LS$$

$$Ro=R+0.7C+0.7RS$$

If the parameter related to mixing and written in the bit stream information BSI is of bits concerning the second specific mixing coefficient, the control circuit 168 will generate a control signal Cont for opening the switches SW1 and SW2, thereby opening the switches SW1 and SW2. As a result, the left output channel Lo and right output channel will output the following:

$$Lo=L+0.7C$$

$$Ro=R+0.7C$$

When the sensed bit stream information BSI indicates the special use mode, such as karaoke use, the 5-channel audio signals are subjected to down-mixing according to the select signal from the input section 164 at which one of the choices appearing on the display unit 169 has been selected. In the special-use mixing mode, the surround mixing coefficient generator 167 is kept in an inoperative state and the special-use mixing coefficient generator 165 is kept in an operative state. On the basis of the control signals Ucont-1, UCont-2 generated at the control circuit 168 according to the choice selected at the input section 164, the 5-channel audio signals undergo down-mixing. Specifically, when it is found from the bit stream mode (bsmod) of the sensed bit stream information BSI that the mode of the audio frames is the special mode, indications of the special mode appear on the display unit 169 as shown in FIG. 63B. In addition, on the basis of the audio code mode (acmod) of the bit stream information BSI, the contents of the channels is displayed. Such mode representation enables the reproduction of special use according to the user's liking.

Figure 65:
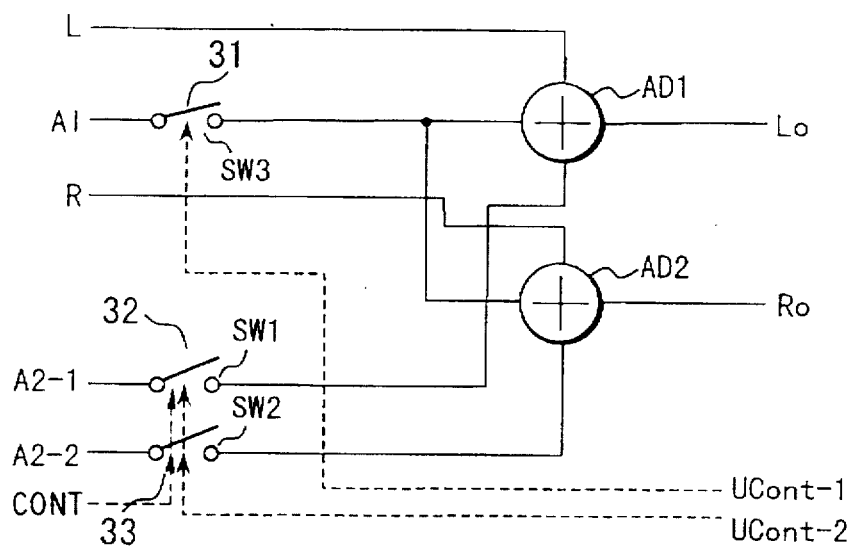
FIG. 65 is a block diagram of the special-use mixing coefficient generator of FIG. 3 with a pictorial representation of the down-mixer's function.

FIG. 65 shows an example of down-mixing in the first special-use mixing mode. The circuit of FIG. 65 also corresponds to the down mixer 161.

In FIG. 65, the output side of an adder AD1 is connected to a left output channel Lo and its input side is supplied with a left audio signal L. It is also supplied with a second-type accompanying sound A2-1 and a first-type accompanying sound A1 via switches SW1 and SW3, respectively. The output side of an adder AD2 is connected to a right output channel Ro and its input side is supplied with a right channel audio signal R. It is also supplied with a second-type accompanying sound A2-2 and a first-type accompanying sound A1 via a switch SW2 and the switch SW3, respectively.

Figure 55:
FIG. 55 is a conceptual diagram of the structure of frame data shown in FIG. 54.

When the mode signal written in the bit stream information BSI of FIG. 55 indicates the special-use mode, the user is allowed to decide whether the accompanying sound A1 should be used or not. Specifically, on the display unit 169, a choice for use/no use of accompanying sound A1, A2-1, or A2-2 appear as shown in FIGS. 63A and 63B. By selecting the choice at the input section 164, the control circuit 168 generates control signals Ucont-1 and Ucont-2. It is apparent that in the circuit of FIG. 65, the user may change the switches SW1, SW2, and SW3 manually instead of generating the control signals UCont-1 and Ucont-2. As seen from FIG. 63A, in the special-use mode, or karaoke, the accompanying sound A1 corresponds to the first-type accompanying sound to the user and is a normally used audio signal that can be selectively made unused. The accompanying sounds A2-1, A2-2 correspond to the second-type accompanying sound to the user and are a normally unused audio signal that can be selectively used. These rules have been specified on the maker side and are basic. Although the accompanying sounds A2-1, A2-2, correspond to the second-type accompanying sound, they may be specified in advance on the maker side as normally used audio signals that can be selectively made unused to the user.

When the control signal Cont has made the switches SW1 and SW2 open in a normal mode, the accompany sound A1 of the first-type can be reproduced and the accompanying sound A2-1, A2-2 of the second type can not be reproduced. However, in a selective use mode, when the control signal UCont-1 is supplied to the switch SW3 which has been closed, the switch SW3 is opened and the accompany sound A1 of the first-type is prevented from being reproduced. In the selective use mode, when the control signal UCont-2 is supplied to selected one or both of the switches SW1 and SW2 which have been opened by the control signal Cont, the one or both of the switch SW1 and SW2 are closed and the selected one or both of the accompany sounds A2-1 and A2-2 of the first-type can be reproduced.

While in the above embodiment, the 5-channel system has been explained, the present invention may be applied to a more than 5 channel system or a less than 5 channel system. As long as in the special mode, a system transmits not only a normally used first-type accompanying sound selectively made unused, using part of the channels that transmit the signals outputted from the front speakers in the special mode, but also a normally unused second-type accompanying sound selectively used, using at least part of the channels that transmit the surround signals, the present invention may be applied to this system. In this embodiment, the system may transmit only the normal used first-type accompanying sound with the left and right channel audio signals L, R. The system also may transmit only the normal unused second type accompanying selectively used with the left and right channel audio signals L, B.

Figure 66:
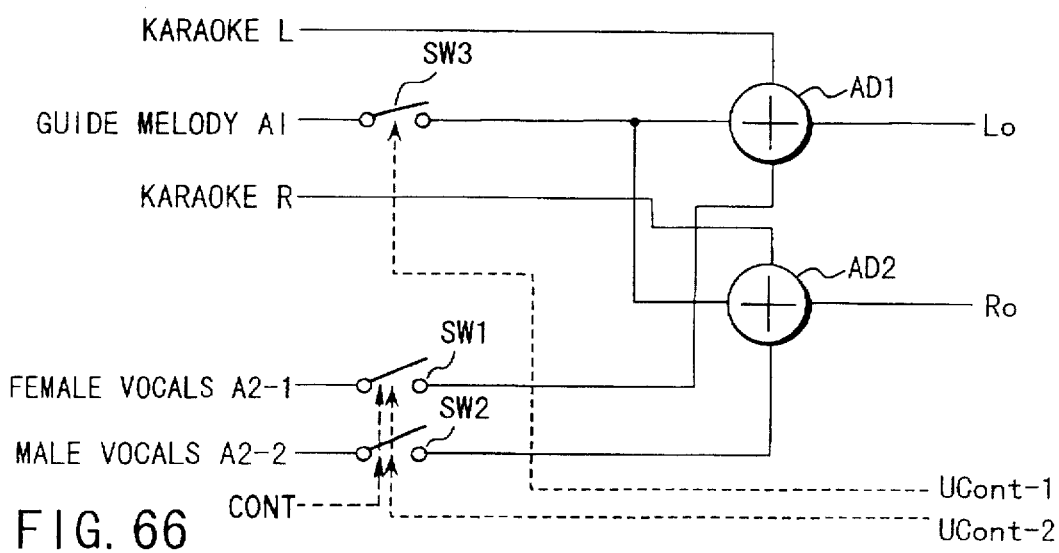
FIG. 66 shows an example of applying the circuit function of FIG. 65 to a duet karaoke system.

FIG. 66 shows an example of applying the special-use mode of FIG. 65 to karaoke duet vocals. As main signals, the karaoke L signal and karaoke R signal recorded or edited in stereo are allocated to the left and right channels and then transmitted, respectively. Female vocals and male vocals are allocated to two channels as accompanying sounds A2-1 and A2-2. As the accompanying sound A1, melody lines serving as a guide when the user sings vocals transmitted in the accompanying sounds A2-1, A2-2, are transmitted. While in this embodiment, a woman's voice melody and a man's voice melody are mixed and transmitted via a single channel, they may be allocated to six channels and transmitted via the individual channels.

Since the accompanying sound A1 is normally reproduced, the user, when enjoying karaoke, sings vocals by himself or herself, while listening to the reproduced sound. Since the accompanying sounds A2-1, A2-2 are normally unused, or not reproduced, the audio signals of vocals are not reproduced, when the user enjoys karaoke. In contrast, for practice, it is effective to practice singing a song, while listening to a vocal a professional singer sings. In this case, the normally unused A2 is reproduced. Using this as a good example, the user can practice singing the song.

If the user has practiced sufficiently and no longer needed the guide melody, the user can make the normally used A1 unused and enjoy karaoke to the same accompaniment as that of a professional singer.

Furthermore, for example, when the user is a man, he practices, listening to only male vocal of accompanying sound A2-2. After he has practiced sufficiently, then, he can enjoy a duet with the vocal of the professional singer, reproducing only female vocal of accompanying sound A2-2. Of source, when the user and a partner sing in practice, they can enjoy karaoke, while listening to the main signal's karaoke L and R and mixing their vocals. When the number of vocals is one, a single vocal channel is used.

Figure 67:
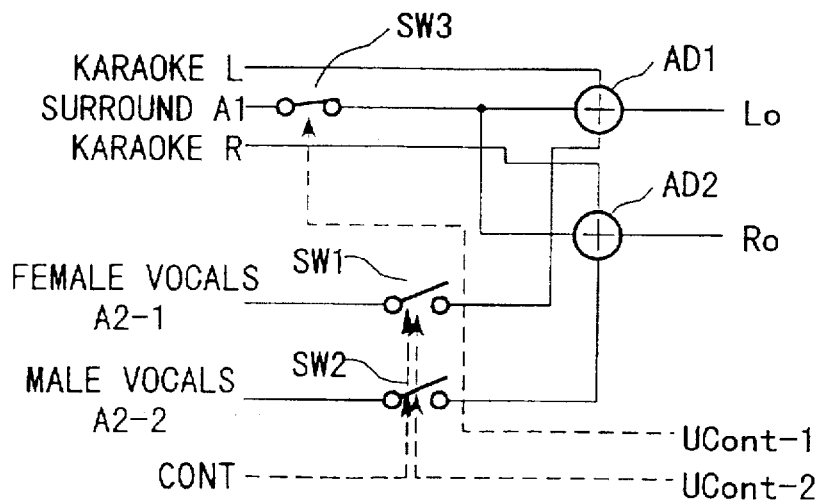
FIG. 67 shows an example of applying the circuit function of FIG. 65 to a surround karaoke system.
Figure 68:
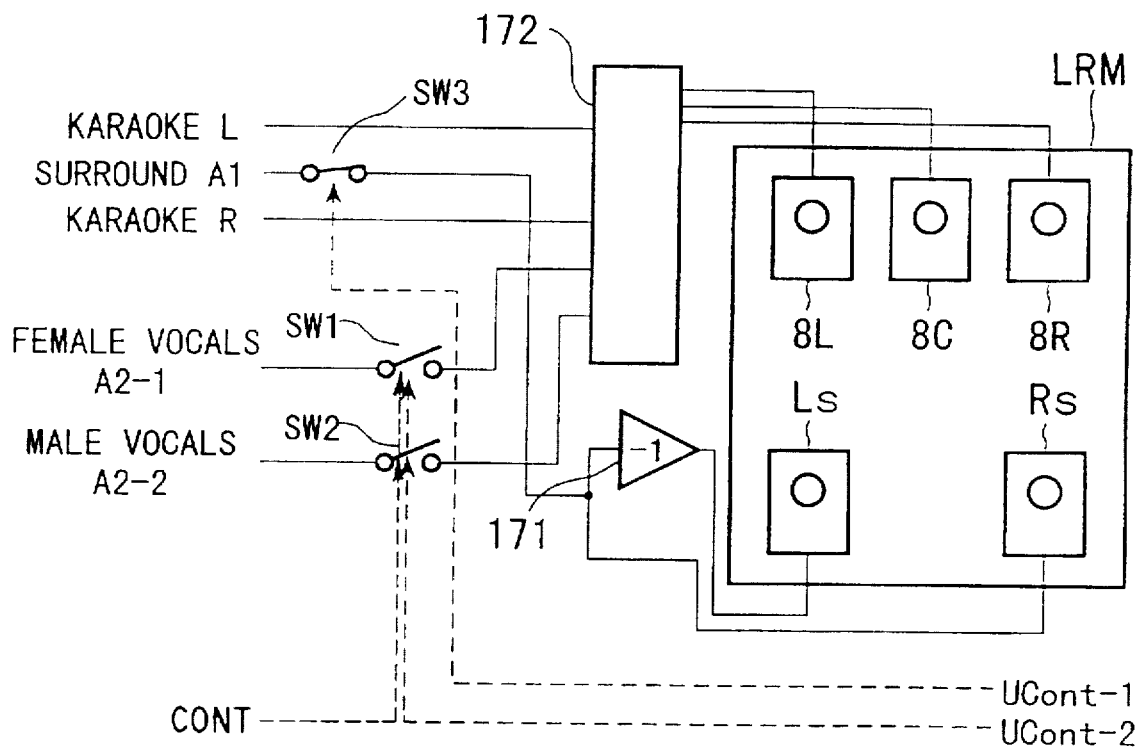
FIG. 68 shows an example of applying the circuit function of FIG. 65 to a surround 5-channel karaoke system.

FIG. 67 shows an example of applying the special-use mode of FIG. 65 to karaoke. In this example, the karaoke sound corresponding to the center channel is used as surround sound in a normally reproduced signal. FIG. 68 shows an example of reproducing sound from the 5-channel speakers 8L, 8C, 8R, 8LS, and 8RS after down-mixing in the reproduction route of FIG. 65. Because the surround signals are reproduced at the back speakers 8LS and 8RS, this produces the effect of making richer the karaoke sound reproduced at the front. FIG. 68 shows an example of 5-channel reproduction. The present embodiment of the special-use mode is especially effective in this example of 5-channel reproduction. The surround signal is divided into two; one is inverted in phase by an inversion amplifier 171.

The other one and the inverted one are supplied to the speakers 8LS and 8RS, which reproduce sound. This enables the sound to be heard from the right and left without positioning the balance in the middle between two speakers as when signals of the same level and same phase are applied to the speakers. As a result, not only the stereo karaoke sound reproduced at the front speakers 8L, 8R but also a spurious echo suitably spread in a hall can be produced within a listening room LRM. Usually, the user can enjoy mixing his or her own voice, while reproducing karaoke with such a hall echo.

When the transmitted vocals are reproduced for practice, they are mixed to 3 channel again at the down mixer 172 and are reproduced from the front speakers 8L, 8C, and 8R.

Down-mixing are determined by, for example, the following equations:

$$L = \text{karaoke } L + a \times \text{female vocal}$$

$$C = b \times \text{female vocal} + b \times \text{male vocal}$$

$$R = \text{karaoke } R + a \times \text{male vocal}$$

Figures 69, 70:
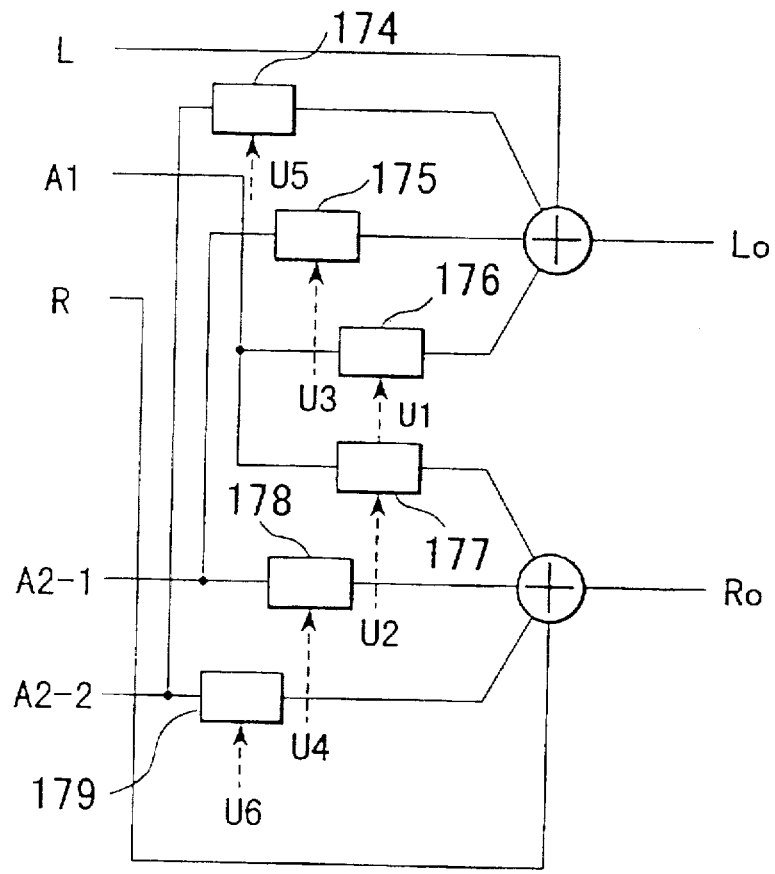
FIG. 69 shows an example of changing of mixing coefficients in the circuit function of FIG. 65.
FIG. 70 shows examples of the coefficients shown in FIG. 69.

FIG. 69 shows an example of bringing the circuit of FIG. 65 into the special-use mode 2. In mode 2, the balance of user playback sound can be set more freely. The accompanying sound A1 is distributed by constant multipliers 176 and 177 to channels Lo and Ro. Furthermore, the accompanying sounds A2-1, A2-2 are distributed by constant multipliers 175, 174 and 178, 179 to channels Lo and Ro. The coefficients of the constant multipliers are determined by control signals U1, U2, U3, U4, U5, and U6 given by the user as shown in FIG. 70. These control signals may be given by reading the inputs from the input section 164 at the control circuit 168 and supplying them in a suitable signal form. The user may control directly by means of a variable resistor or a switch.

In the system of FIG. 69, when the default value at the time of turning on the power is set, the accompanying sound A1 is reproduced and the accompanying sound A2 is not reproduced in the default state by setting the default values of the constant multipliers 176, 177 to specific values and the default values of the constant multipliers 174, 175, 178, 179 to zero. By controlling the constant multipliers 174 to 179 this way, the balance of reproduced sound can be controlled freely.

To apply the system of FIG. 69 to karaoke, the accompanying sound A1 is determined to be a normally reproduced signal, such as guide melody or surround components, as described earlier, and the accompanying sounds A2-1, A2-2 is determined to be a vocal signal explained earlier.

FIG. 70 shows a table listing coefficients suitable for reproducing duet in the system of FIG. 69. Four combinations of coefficient U1 to U6 have been determined beforehand so that one of the combinations can be specified by changing four positions by a known method. Hereinafter, explanation will be given, providing that accompanying sound A1 is guide melody, accompanying sound A2-1 is female vocal, and accompanying sound A2-2 is male vocal.

Coefficients U1 and U2 are determined to be 0.707 so that guide melody may be put in the center in any position. Position 1 is the default position. In this case, coefficients U3 to U6 are determined to be 0.000 so that vocals may not be reproduced as described earlier. Position 2 to position 4 are optional positions. In this case, vocals are reproduced for practice. Position 2 is for reproducing only female vocals. In this position, the right speaker in the middle reproduces sound. This position is used to practice a woman's voice, while listening to female vocals. In addition, in this position, the male user sings while reproducing the female voice, thereby enjoying a duet with the reproduced sound. Position 3 is for reproducing only male vocals. In this position, the left speaker in the middle reproduces sound. This position is used to practice a man's voice, while listening to male vocals. In addition, in this position, the female user sings while reproducing the male voice, thereby enjoying a duet with the reproduced sound. Position 4 is for reproducing female vocals and male vocals. In this position, a woman's voice is reproduced from the right speaker in the middle and a man's voice is reproduced from the left speaker in the middle. This positions a sound image as if a man and a woman were standing side by side and singing a duet, producing the same effect as listening to a duet in a concert.

Even in a case where the accompanying sound A1, accompanying sounds A2-1, A2-2 allocated as the special-use mode are reproduced in a conventional reproducing apparatus, when the control signal Cont allocated on the transmission side has been set so that channels Ls, Rs may not be reproduced, the accompanying sound A1 corresponding to C channel is reproduced and the accompanying sounds A2-1, A2-2 are not reproduced, with the result that no problem arises even with the conventional apparatus.

When the control signal allocated on the transmission side indicates the special mode, making the coefficient of the down mixer open to the reproduction side not only enables product design on the basis of a creative mind in manufacturing reproducing apparatuses but also allows the user to make adjustments according to his or her liking on the basis of the function of the reproducing apparatus used. Namely, by controlling each coefficient, it is possible not only to balance the playback sound volume but also to place the sound image in the desired position or move it to the desired place.

The balancing of playback sound volume is the act of, for example, reproducing the vocals at a high volume at the beginning of practice, turning down the vocal volume as the user is getting good at singing the song, and finally enabling the user to sing by himself or herself without the reproduced vocals. By turning down the volume of guide melody completely, the user can sing as a professional singer does.

Furthermore, for example, when the user sings a duet with a reproduced vocal, he or she can position his or her voice to the right of the stage and the reproduced partner's sound image next to him or her. In this way, changing the positions produce various singing situations. Specifically, by limiting the reproduction of accompanying sounds uniformly with the conventional reproducing apparatus, this helps prevent the user from getting mixed up. In the special mode, unnecessary restrictions on the things ranging from the design of the reproducing apparatus to instructions to teach the user how to use the apparatus are canceled, making it possible to make a plan or adjustment as desired.

While in the above embodiment, the cases where representations appear on the display unit 169 as shown in FIGS. 63A and 63B have been explained, a dedicated sub-display unit capable of displaying what are shown in FIGS. 63A and 63B may be provided additionally. For example, the sub-display unit may be realized by providing an LED display section capable of displaying the mode or a liquid-crystal section in the reproducing apparatus. Additionally, the representations on the sub-display unit may be displayed on the CRT that outputs the words and background image of karaoke. The representations may be switched between the CRT and the sub-display unit. Furthermore, the mode selection items on the sub-display unit may not be always displayed on the CRT at every playback of karaoke, when the various mode is previously set.

Next, a method of creating video and music data in the logical formats shown in FIGS. 7 to 48 and recording the video and music data onto an optical disk 10 and a recording system to which the recording method is applied will be explained by reference to FIGS. 71 to 76.

Figure 71:
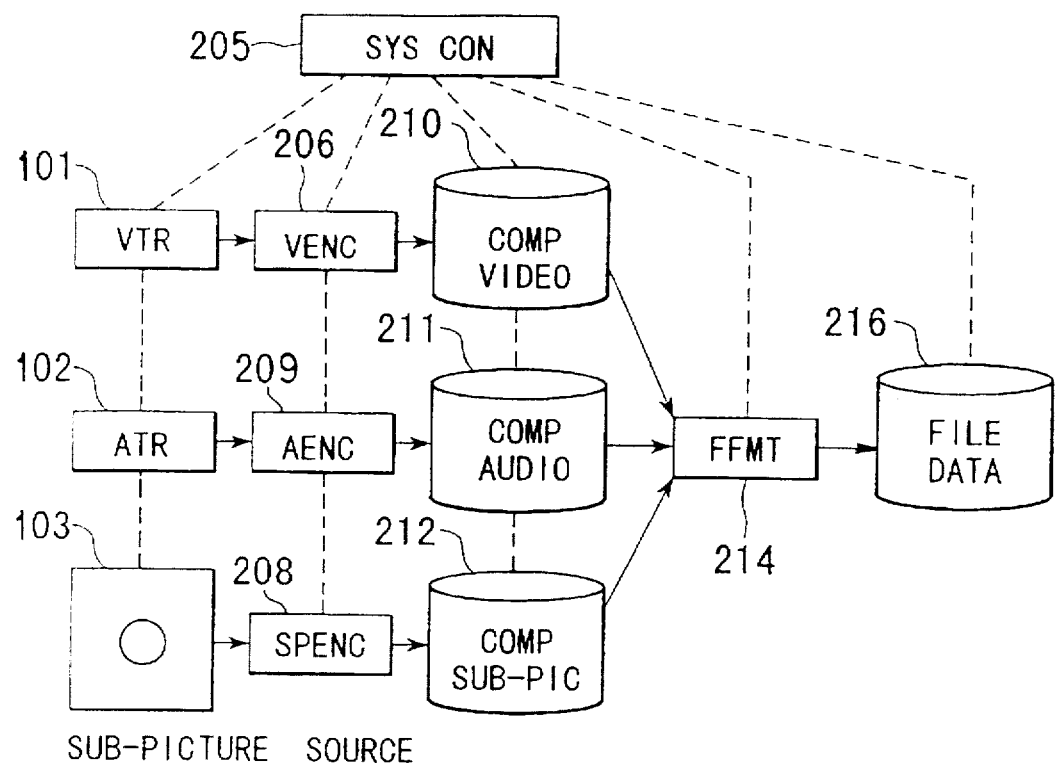
FIG. 71 is a block diagram of an encoder system that creates video files by encoding the video data.

FIG. 71 shows an encoder system that creates a video file 88 of a title set 84 whose video data is encoded. In the system of FIG. 71, for example, a videotape recorder (VTR) 101, an audio tape recorder (ATR) 102, and a sub-picture source 103 are used as sources of the main video data, audio data, and sub-picture data. Under the control of a system controller (Sys con) 205, they create the main video data, audio data, and sub-picture data, which are supplied to a video encoder (VENC) 206, an audio encoder (AENC) 209, and a sub-picture encoder (SPENC) 208, respectively. Under the control of the system controller (Sys con) 205, these encoders 206, 209, and 208 perform A/D conversion of the main video data, audio data, and sub-picture data and encode them by the respective compression schemes. The encoded main video data, audio data, and sub-picture data (Comp Video, Comp Audio, Comp Sub-pict) are stored in memories 210, 211, and 212. The main video data, audio data, and sub-picture data (Comp Video, Comp Audio, Comp Sub-pict) are outputted to a file formatter (FFMT) 214 under the control of the system controller (Sys con) 205, which converts them so that they may have a file structure of video data for the system as explained earlier. Then, under the control of the system controller (Sys con) 205, the setting conditions for each data item and the management information including attributes are stored in a memory 216 in the form of files.

Explained next will be a standard flow of an encoding process in the system controller (Sys con) 205 that creates a file from video data.

According to the flow of 73, the main video data and audio data are encoded and the encoded main video data and audio data (Comp Video, Comp Audio) are supplied. Specifically, when the encoding process is started, as shown in step S270 of FIG. 73, the parameters necessary for encoding the main video data and audio data are set. Part of the set parameters are stored in the system controller (Sys con) 205 and at the same time, are used at the file formatter (FFMT) 214. As shown in step S271, the main video data is pre-encoded using the parameters and the optimum distribution of the amount of codes is calculated. Then, on the basis of the code amount distribution obtained in the pre-encoding, the main video data is encoded as shown in step S272. At the same time, the audio data is also encoded at step S272. As shown in step in S273, if necessary, the main video data is partially encoded again and the re-encoded portion of the main video data is replaced with the old one. Through the series of steps, the main video data and audio data are encoded. Furthermore, as shown in steps S274 and S275, the sub-picture data is encoded and the encoded sub-picture data (Comp Sub-pict) is supplied. Namely, the parameters necessary for encoding the sub-picture data are set. As shown in step S274, part of the parameters are stored in the system controller (Sys con) 205 and used in the file formatter (FFMT) 214. On the basis of the parameters, the sub-picture data is encoded. By the process, the sub-picture data is encoded.

Figure 73:
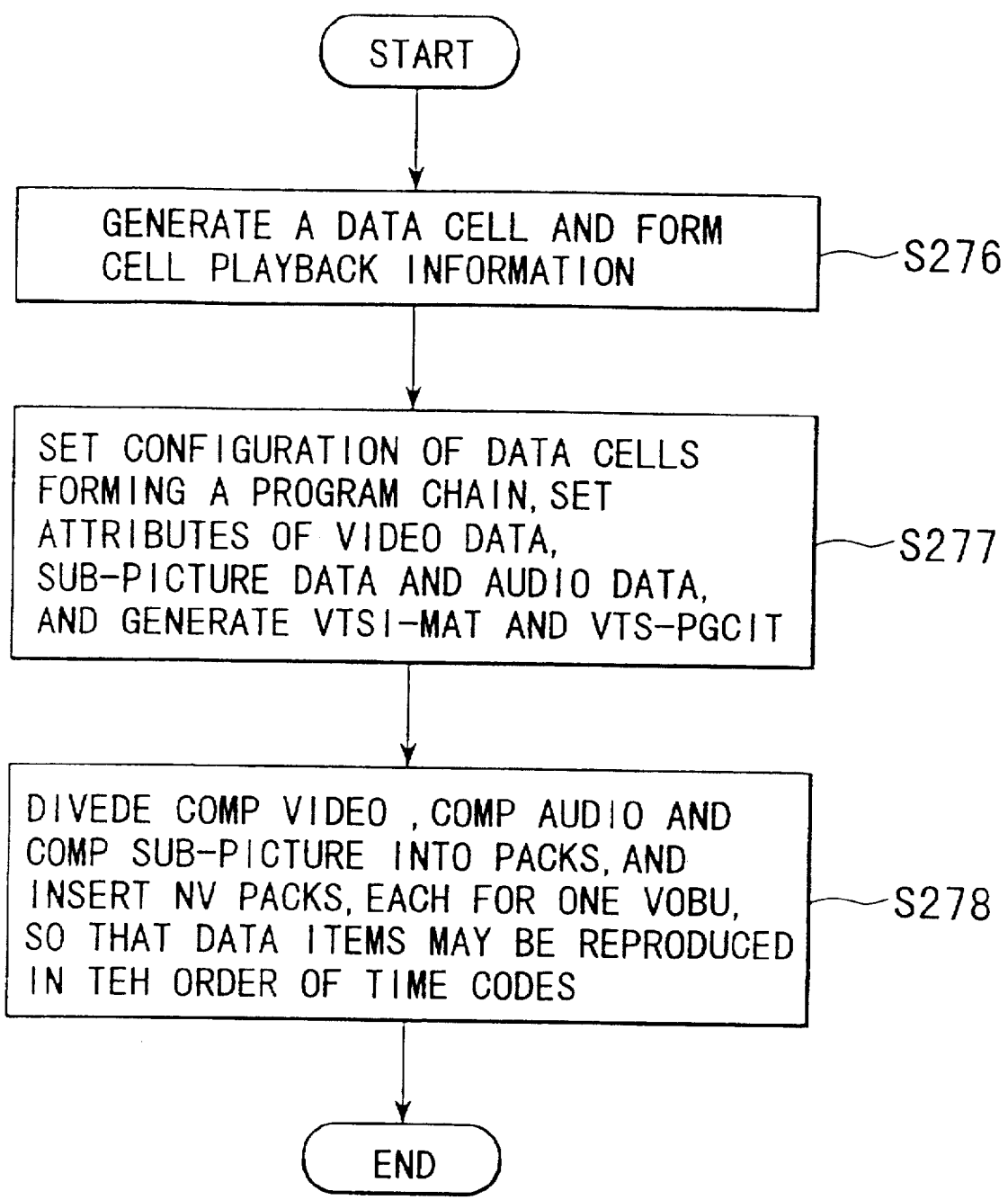
FIG. 73 is a flowchart for combining the main video data, audio data, and sub-picture data that have been encoded in the flow of FIG. 72 and creating a video data file.

According to the flow of FIG. 73, the encoded main video data, audio data, and sub-picture data (Com Video, Com Audio, Comp Sub-pict) are combined and converted so as to form a video data title set structure as explained in FIGS. 7 and 25. Specifically, as shown in step S276, a cell is set as the smallest unit of the video data and cell playback information on the cell (C_PBI) is created. Then, as shown in step S277, the structure of the cells constituting a program chain and the main video, sub-picture, and audio attributes (the information obtained in encoding the respective data items are used part of these attributes) are set. Then, as shown in FIG. 33, video title set information management table information (VTSI_MAT) 278 including information on program chains and a video title set program chain table (VTS_PGCIT) 300 are created. At this time, as the need arises, a video title set direct access pointer table (VTS_DAPT) is also created. The encoded main video data, audio data, and sub-picture data (Com Video, Comp Audio, Comp Sub-pict) are subdivided into specific packs. An NV pack is placed at the head of each VOBU so that playback can be effected in the order of time code of each data item. With the NV packs arranged this way, each data cell is positioned so that a video object (VOB) may be composed of a plurality of cells as shown in FIG. 6. A set of such video objects is formatted into the title set structure.

In the flow of FIG. 73, the program chain information (PGI) is obtained in the process of step S277 by using the database in the system controller (Sys con) 205 or entering data again as the need arises.

Figure 74:
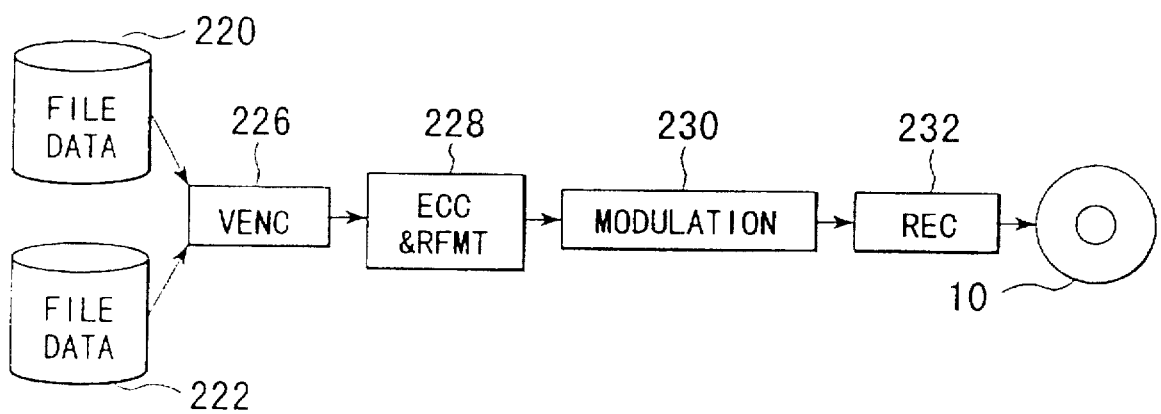
FIG. 74 is a block diagram of a disk formatter system used to record a formatted video file on an optical disk.
Figure 72:
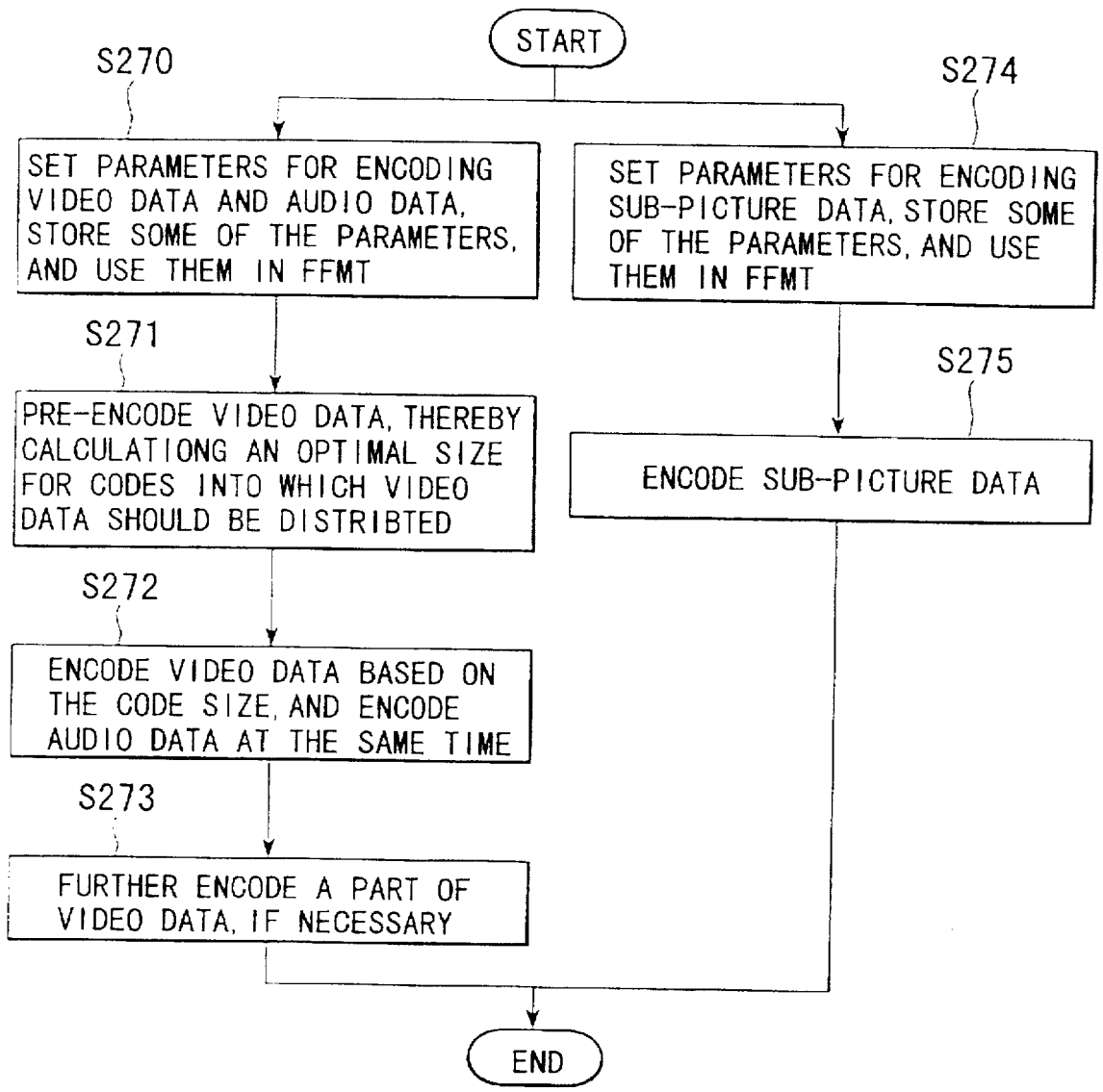
FIG. 72 is a flowchart for the encoding process of FIG. 66.

FIG. 74 shows a disk formatter system that records on an optical disk the title set formatted as described above. In the disk formatter system of FIG. 74, the memories 220, 222 in which the created title set is stored supply these file data items to a volume formatter (VFMT) 226. The volume formatter (VFMT) 226 extracts the management information from the title sets 284, 286, produces a video manager 71, and create the logic data to be recorded on the disk 10 in the arrangement of FIG. 15. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

Figure 75:
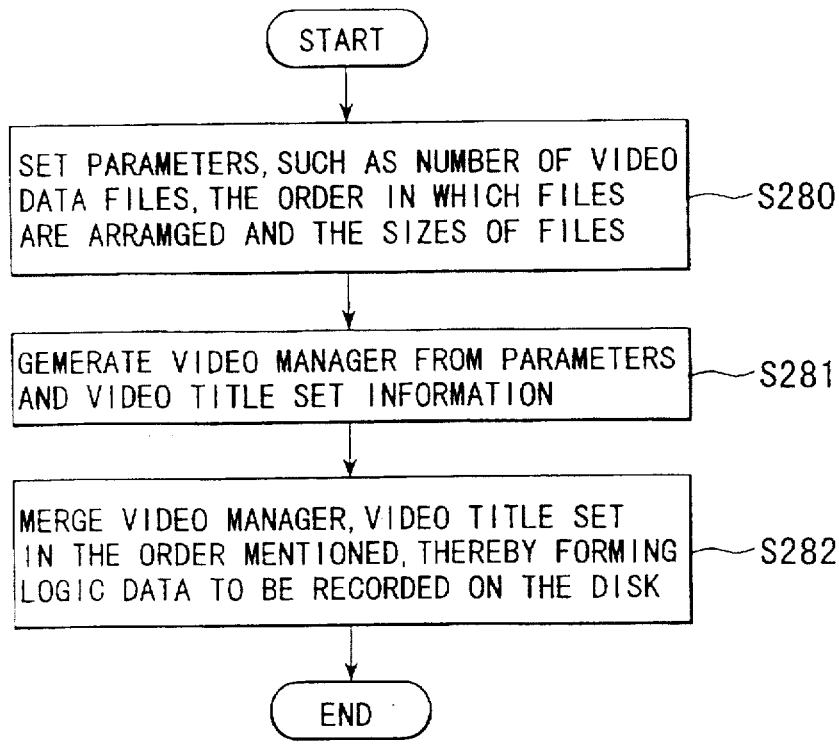
FIG. 75 is a flowchart for creating logic data to be recorded on the disk in the disk formatter of FIG. 69.

A standard flow for creating the aforementioned disk will be described by reference to FIGS. 66 and 67. FIG. 75 shows the flow of creating the logic data to be recorded on the disk 10. Specifically, as shown in step S280, parameter data items, including the number of video data files, their arrangement, and the size of each video data file, are set first. Next, as shown in step S281, a video manager 71 is created from the set parameters and the video title set information 281 in each video title set 72. Thereafter, as shown in step S282, the video manager 71 and video title set 72 are arranged in that order according to the corresponding logical block number, thereby creating the logic data to be recorded on the disk 10.

Figure 76:
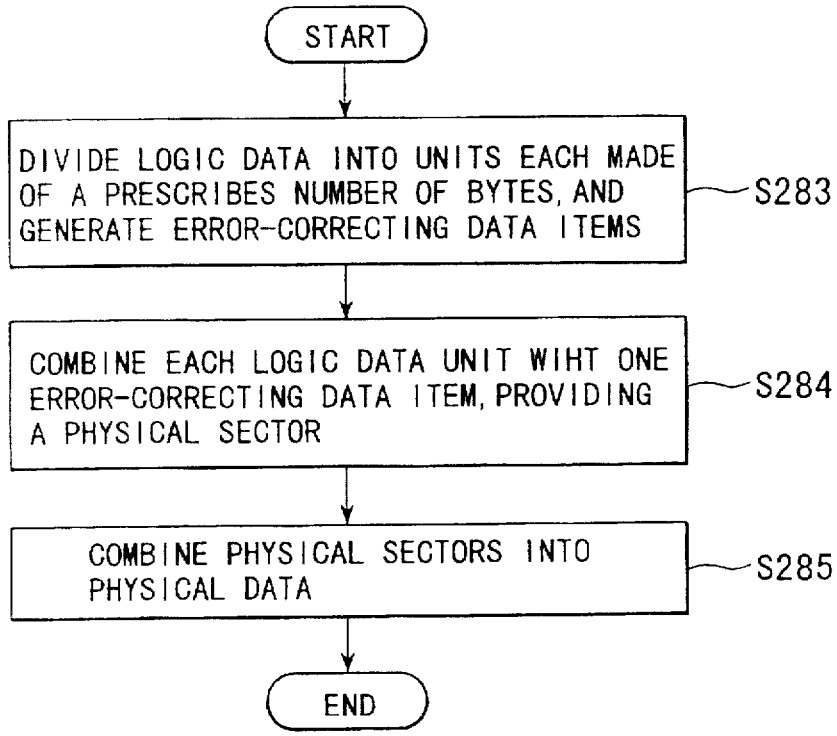
FIG. 76 is a flowchart for creating from logic data physical data to be recorded on the disk.

Thereafter, the flow of creating the physical data to be recorded on the disk as shown in FIG. 76 is executed. Specifically, as shown in step S283, the logic data is divided into units of a specific number of bytes, thereby forming error correction data. Next, as shown in step S284, the logic data divided into units of a specific number of bytes are combined with the created error correction data to form physical sectors. Thereafter, as shown in step S285, physical data is created by combining physical sectors. In this way, the modulating process based on certain rules is performed on the physical data created in the flow of FIG. 76, thereby forming the recording data. Thereafter, the recording data is recorded on the disk 10.

In the above embodiment, the optical disk of high-density recording type is explained as the recording medium, but this invention can be applied to another recording medium other than the optical disk, for example, this invention can also be applied to a magnetic disk or another type of recording medium on which data can be recorded with physically high recording density.

According to this invention, a system suitable for a high-density disk formed on the assumption that it is used for karaoke can be provided.

With the present invention, a system that transmits surround sound using a plurality of transmission channels, can maintain compatibility easily with a surround system, when the plurality of channels are applied to special use, such as karaoke, not being limiting to surround use.

Furthermore, the system of the invention can reproduce audio in various representation forms according to the demands of the user in such a manner that it can reproduce the transmitted audio data according to the user's selection or mix the audio data items according to the user's selection.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording medium comprising:
   a data area comprising a karaoke audio signal, the karaoke audio signal including a karaoke identifier, an accompaniment signal and at least one of a first type of sub-audio signal and a second type of sub-audio signal, wherein a format of the karaoke audio signal includes:
   the accompaniment signal assigned to a first channel, the first channel corresponding to a main audio channel under a surround audio format,
   the first type of sub-audio signal assigned to a second channel, the second channel corresponding to a center audio channel under the surround audio format, and
   the second type of sub-audio signal assigned to a third channel, the third channel corresponding to a surround channel under the surround audio format.

2. The recording medium of claim 1, wherein:
   the first channel corresponds to a first main audio channel under the surround audio format, which includes the first main audio channel and a second main audio channel.

3. The recording medium of claim 1, wherein:
   the third channel corresponds to a first surround channel under the surround audio format, which includes the first surround channel and a second surround channel.

4. The recording medium of claim 1, wherein:
   the first type of sub-audio signal includes a melody signal serving as a guide; and
   the second type of sub-audio signal includes at least one of a vocal signal and an instrument signal.

5. A recording medium comprising a data area in which audio signal is recorded, wherein:
   the audio signal includes a karaoke identifier, left and right accompaniment signals and at least one of a first type of sub-audio signal that is used at normal times and a second type of sub-audio signal that is used at special times, the accompaniment signals being assigned to first and second channels corresponding to left and right main audio channels determined in a surround audio format, the first type of sub-audio signal, if present, being assigned to a third channel corresponding to a center audio channel determined in the surround audio format, and the second type of sub-audio signal, if present, being assigned to a fourth channel corresponding to a surround channel determined in the surround audio format.

6. The recording medium of claim 5, wherein:
   the second type of sub-audio signal is reproduced as a vocal; and
   the first type of sub-audio signal is reproduced as a melody line which acts as a guide for singing with a accompaniment sound reproduced from the accompaniment signal.

7. The recording medium of claim 5, wherein:
   the karaoke audio signals include another second type of sub-audio signal, used at special times and assigned to a fifth channel corresponding to the other surround audio channel determined in the surround format.

8. The recording medium of claim 5, wherein:
   one of the sub-audio signals is reproduced as a first vocal; and
   another one of the sub-audio signal is reproduced as a second vocal.

9. The recording medium of claim 5, wherein:
   the first type of sub-audio signal includes a surround audio signal for the accompaniment signal.

10. A method of recording an audio signal onto a data area of a recording medium, comprising:
    preparing a karaoke audio signal which includes a karaoke identifier for identifying that the audio signal is the karaoke audio signal, left and right accompaniment signals and at least one of a first type of sub-audio signal that is used at normal times and a second type of sub-audio signal that is used at special times; and
    assigning the accompaniment signals to first and second channels corresponding to left and right main audio channels determined in a surround audio format, the first type of sub-audio signal, if present, to a third channel corresponding to a center audio channel determined in the surround audio format, and the second type of sub-audio signal, if present, to a fourth channel corresponding to a surround channel determined in the surround audio format.

11. The recording method of claim 10, wherein:
    the second type of sub-audio signal is reproduced as a vocal; and
    the first type of sub-audio signal is reproduced as a melody line which acts as a guide for singing with an accompaniment should reproduced from the accompaniment signal.

12. The recording method of claim 10, wherein:
    the karaoke audio signals include another second type of sub-audio signal, used at special times and assigned to a fifth channel corresponding to the other surround audio channel determined in the surround format.

13. The recording method of claim 10, wherein:
    one of the sub-audio signals is reproduced as a first vocal; and
    another one of the sub-audio signals is reproduced as a second vocal.

14. The recording method of claim 10, wherein:
    the first type of sub-audio signal includes a surround audio signal for the accompaniment signal.

15. An apparatus for recording an audio signal onto a data area of a recording medium, comprising:

means for preparing a karaoke audio signal which includes a karaoke identifier for identifying that the audio signal is the karaoke audio signal, left and right accompaniment signals and at least one of a first type of sub-audio signal that is used at normal times and a second type of sub-audio signal that is used at special times; and means for assigning the accompaniment signals to first and second channels corresponding to left and right main audio channels determined in a surround audio format, the first type of sub-audio signal, if present, to a third channel corresponding to a center audio channel determined in the surround audio format, and the second type of sub-audio signal, if present, to a fourth channel corresponding to a surround channel determined in the surround audio format.

16. The apparatus of claim 15, wherein:

the second type of sub-audio signal is reproduced as a vocal; and the first type of sub-audio signal is reproduced as a melody line which acts as a guide for singing with a accompaniment sound reproduced from the accompaniment signal.

17. The apparatus of claim 15, wherein:

the karaoke audio signals include another second type of sub-audio signal, used at special times and assigned to a fifth channel corresponding to the other surround audio channel determined in the surround format.

18. The apparatus of claim 15, wherein:

one of the sub-audio signals is reproduced as a first vocal; and another one of the sub-audio signals is reproduced as a second vocal.

19. The apparatus of claim 15, wherein:

the first type sub-audio signal includes a surround audio signal for the accompaniment signal.

* * * * *